(12) United States Patent
Woodgate et al.

(10) Patent No.: US 11,892,718 B2
(45) Date of Patent: Feb. 6, 2024

(54) DIRECTIONAL DISPLAY APPARATUS

(71) Applicant: RealD Spark, LLC, Boulder, CO (US)

(72) Inventors: Graham J. Woodgate, Henley-on-Thames (GB); Michael G. Robinson, Boulder, CO (US)

(73) Assignee: RealD Spark, LLC, Boulder, CO (US)

( * ) Notice: Subject to any disclaimer, the term of this patent is extended or adjusted under 35 U.S.C. 154(b) by 0 days.

(21) Appl. No.: 18/131,322

(22) Filed: Apr. 5, 2023

(65) Prior Publication Data
US 2023/0324729 A1 Oct. 12, 2023

Related U.S. Application Data

(60) Provisional application No. 63/328,624, filed on Apr. 7, 2022.

(51) Int. Cl.
G02F 1/13 (2006.01)
G02F 1/01 (2006.01)
G02F 1/1337 (2006.01)
F21V 8/00 (2006.01)
G02F 1/13363 (2006.01)
G02F 1/1335 (2006.01)

(52) U.S. Cl.
CPC ......... *G02F 1/1323* (2013.01); *G02B 6/0076* (2013.01); *G02F 1/0136* (2013.01); *G02F 1/13363* (2013.01); *G02F 1/133528* (2013.01); *G02F 1/133738* (2021.01); *G02F 1/133746* (2021.01); *G02F 2203/01* (2013.01); *G02F 2203/12* (2013.01)

(58) Field of Classification Search
None
See application file for complete search history.

(56) References Cited

U.S. PATENT DOCUMENTS 3,914,022 A 10/1975 Kashnow
4,059,916 A 11/1977 Tachihara et al.
(Continued)

FOREIGN PATENT DOCUMENTS

CA 2222313 A1 6/1998
CN 1125943 C 10/2003
(Continued)

OTHER PUBLICATIONS

EP-20851155.0 Extended European Search Report of European Patent Office dated Aug. 2, 2023.
(Continued)

*Primary Examiner* — Phu Vu
(74) *Attorney, Agent, or Firm* — Penny L. Lowry

(57) ABSTRACT

A dual view display for an automotive vehicle comprises a spatial light modulator and a polar control retarder comprising a switchable liquid crystal retarder arranged between a first pair of polarisers. The switchable liquid crystal retarder comprises a polarisation-switch retarder and a polar control retarder with an average director that is directed towards an off-axis viewing location. In a first temporal phase of operation, the spatial light modulator and polar control retarder are arranged to direct light comprising a first image towards a first direction and in a second temporal phase of operation to direct light comprising a second image towards a second direction.

26 Claims, 49 Drawing Sheets

(56) References Cited

U.S. PATENT DOCUMENTS

| | | |
|---|---|---|
| 4,586,790 A | 5/1986 | Umeda et al. |
| 4,621,898 A | 11/1986 | Cohen |
| 4,974,941 A | 12/1990 | Gibbons et al. |
| 5,005,108 A | 4/1991 | Pristash et al. |
| 5,035,491 A | 7/1991 | Kawagishi et al. |
| 5,126,882 A | 6/1992 | Oe et al. |
| 5,608,550 A | 3/1997 | Epstein et al. |
| 5,658,490 A | 8/1997 | Sharp et al. |
| 5,671,994 A | 9/1997 | Tai et al. |
| 5,715,028 A | 2/1998 | Abileah et al. |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,852,509 A | 12/1998 | Coleman |
| 5,854,872 A | 12/1998 | Tai |
| 5,894,361 A | 4/1999 | Yamazaki et al. |
| 5,914,760 A | 6/1999 | Daiku |
| 5,997,148 A | 12/1999 | Ohkawa |
| 6,055,103 A | 4/2000 | Woodgate et al. |
| 6,099,758 A | 8/2000 | Verrall et al. |
| 6,144,433 A | 11/2000 | Tillin et al. |
| 6,169,589 B1 | 1/2001 | Kaneko |
| 6,204,904 B1 | 3/2001 | Tillin et al. |
| 6,222,672 B1 | 4/2001 | Towler et al. |
| 6,280,043 B1 | 8/2001 | Ohkawa |
| 6,364,497 B1 | 4/2002 | Park et al. |
| 6,379,016 B1 | 4/2002 | Boyd et al. |
| 6,392,727 B1 | 5/2002 | Larson et al. |
| 6,437,915 B2 | 8/2002 | Moseley et al. |
| 6,731,355 B2 | 5/2004 | Miyashita |
| 6,752,505 B2 | 6/2004 | Parker et al. |
| 6,987,550 B2 | 1/2006 | Takato et al. |
| 7,067,985 B2 | 6/2006 | Adachi |
| 7,072,096 B2 | 7/2006 | Holman et al. |
| 7,163,319 B2 | 1/2007 | Kuo et al. |
| 7,227,602 B2 | 6/2007 | Jeon et al. |
| 7,366,392 B2 | 4/2008 | Honma et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,070,346 B2 | 12/2011 | Maeda et al. |
| 8,098,350 B2 | 1/2012 | Sakai et al. |
| 8,154,686 B2 | 4/2012 | Mather et al. |
| 8,228,476 B2 | 7/2012 | Shibazaki |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 | 6/2013 | Weber et al. |
| 8,646,931 B2 | 2/2014 | Choi et al. |
| 8,801,260 B2 | 8/2014 | Urano et al. |
| 8,848,132 B2 | 9/2014 | O'Neill et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 9,798,169 B2 | 10/2017 | Su et al. |
| 10,054,732 B2 | 8/2018 | Robinson et al. |
| 10,067,726 B2 | 9/2018 | Wakamoto et al. |
| 10,126,575 B1 | 11/2018 | Robinson et al. |
| 10,146,093 B2 | 12/2018 | Sakai et al. |
| 10,216,018 B2 | 2/2019 | Fang et al. |
| 10,288,914 B2 | 5/2019 | Chung et al. |
| 10,303,030 B2 | 5/2019 | Robinson et al. |
| 10,401,638 B2 | 9/2019 | Robinson et al. |
| 10,424,232 B2 | 9/2019 | Schubert et al. |
| 10,488,705 B2 | 11/2019 | Xu et al. |
| 10,527,775 B2 | 1/2020 | Yang et al. |
| 10,627,670 B2 | 4/2020 | Robinson et al. |
| 10,649,248 B1 | 5/2020 | Jiang et al. |
| 10,649,259 B2 | 5/2020 | Lee et al. |
| 10,712,608 B2 | 7/2020 | Robinson et al. |
| 10,802,356 B2 | 10/2020 | Harrold et al. |
| 10,935,714 B2 | 3/2021 | Woodgate et al. |
| 10,948,648 B2 | 3/2021 | Ilhas et al. |
| 10,976,578 B2 | 4/2021 | Robinson et al. |
| 11,016,341 B2 | 5/2021 | Robinson et al. |
| 11,070,791 B2 | 7/2021 | Woodgate et al. |
| 11,079,645 B2 | 8/2021 | Harrold et al. |
| 11,079,646 B2 | 8/2021 | Robinson et al. |
| 11,092,851 B2 | 8/2021 | Robinson et al. |
| 11,099,433 B2 | 8/2021 | Robinson et al. |
| 11,099,448 B2 | 8/2021 | Woodgate et al. |
| 11,237,417 B2 | 2/2022 | Woodgate et al. |
| 11,327,358 B2 | 5/2022 | Robinson et al. |
| 11,366,358 B2 | 6/2022 | Wu et al. |
| 11,442,316 B2 | 9/2022 | Woodgate et al. |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0171793 A1 | 11/2002 | Sharp et al. |
| 2003/0030764 A1 | 2/2003 | Lee |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117792 A1 | 6/2003 | Kunimochi et al. |
| 2003/0169499 A1 | 9/2003 | Bourdelais et al. |
| 2003/0214615 A1 | 11/2003 | Colgan et al. |
| 2003/0222857 A1 | 12/2003 | Abileah |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0223094 A1 | 11/2004 | Hamada et al. |
| 2004/0240777 A1 | 12/2004 | Woodgate et al. |
| 2004/0264910 A1 | 12/2004 | Suzuki et al. |
| 2005/0002174 A1 | 1/2005 | Min et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0213348 A1 | 9/2005 | Parikka et al. |
| 2005/0219693 A1 | 10/2005 | Hartkop et al. |
| 2005/0243265 A1 | 11/2005 | Winlow et al. |
| 2005/0259205 A1 | 11/2005 | Sharp et al. |
| 2005/0270798 A1 | 12/2005 | Lee et al. |
| 2006/0066785 A1 | 3/2006 | Moriya |
| 2006/0082702 A1 | 4/2006 | Jacobs et al. |
| 2006/0098296 A1 | 5/2006 | Woodgate et al. |
| 2006/0146405 A1 | 7/2006 | MacMaster |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262255 A1 | 11/2006 | Wang et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0008471 A1 | 1/2007 | Wang et al. |
| 2007/0024970 A1 | 2/2007 | Lub et al. |
| 2007/0030240 A1 | 2/2007 | Sumiyoshi et al. |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0076406 A1 | 4/2007 | Kodama et al. |
| 2007/0139772 A1 | 6/2007 | Wang |
| 2007/0223251 A1 | 9/2007 | Liao |
| 2007/0268427 A1 | 11/2007 | Uehara |
| 2007/0285775 A1 | 12/2007 | Lesage et al. |

(56) References Cited

U.S. PATENT DOCUMENTS

| | | |
|---|---|---|
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0106689 A1 | 5/2008 | Inoue et al. |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1 | 12/2008 | Fukushima et al. |
| 2009/0009894 A1 | 1/2009 | Chuang |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109381 A1 | 4/2009 | Haruyama |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213147 A1 | 8/2009 | Sagardoyburu et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0014313 A1 | 1/2010 | Tillin et al. |
| 2010/0066960 A1 | 3/2010 | Smith et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0187704 A1 | 7/2010 | Hsu et al. |
| 2010/0205667 A1 | 8/2010 | Anderson et al. |
| 2010/0214324 A1 | 8/2010 | Broughton et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0176089 A1 | 7/2011 | Ishikawa et al. |
| 2011/0241573 A1 | 10/2011 | Tsai et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0020078 A1 | 1/2012 | Chang |
| 2012/0086875 A1 | 4/2012 | Yokota |
| 2012/0120351 A1 | 5/2012 | Kawata |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0170315 A1 | 7/2012 | Fan et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Vinther et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0120817 A1 | 5/2013 | Yoon et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0104147 A1 | 4/2014 | Nakahara et al. |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0185322 A1 | 7/2014 | Liao |
| 2014/0201844 A1 | 7/2014 | Buck |
| 2014/0211125 A1 | 7/2014 | Kurata |
| 2014/0232836 A1 | 8/2014 | Woodgate et al. |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0035872 A1 | 2/2015 | Shima et al. |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293273 A1 | 10/2015 | Chen et al. |
| 2015/0293289 A1 | 10/2015 | Shinohara et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0291358 A1 | 10/2016 | Kikuchi et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0085869 A1 | 3/2017 | Choi et al. |
| 2017/0090103 A1 | 3/2017 | Holman |
| 2017/0090237 A1 | 3/2017 | Kim et al. |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0276960 A1 | 9/2017 | Osterman et al. |
| 2017/0315423 A1 | 11/2017 | Serati et al. |

(56) References Cited

U.S. PATENT DOCUMENTS

| | | |
|---|---|---|
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0011173 A1 | 1/2018 | Newman |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0210253 A1 | 7/2018 | Kashima |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2019/0361165 A1 | 11/2019 | Chang et al. |
| 2020/0026125 A1 | 1/2020 | Robinson et al. |
| 2020/0041839 A1 | 2/2020 | Robinson et al. |
| 2020/0110301 A1 | 4/2020 | Harrold et al. |
| 2020/0159055 A1 | 5/2020 | Robinson et al. |
| 2020/0185590 A1 | 6/2020 | Malhotra et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2021/0033898 A1 | 2/2021 | Woodgate et al. |
| 2021/0116627 A1 | 4/2021 | Tsuji |
| 2021/0149233 A1 | 5/2021 | Robinson et al. |
| 2021/0271121 A1* | 9/2021 | Woodgate ......... G02F 1/133634 |
| 2021/0373382 A1 | 12/2021 | Sakai et al. |

FOREIGN PATENT DOCUMENTS

| | | |
|---|---|---|
| CN | 1690800 A | 11/2005 |
| CN | 1776484 A | 5/2006 |
| CN | 101042449 A | 9/2007 |
| CN | 101256251 A | 9/2008 |
| CN | 101435952 A | 5/2009 |
| CN | 101454712 A | 6/2009 |
| CN | 101518095 A | 8/2009 |
| CN | 101681061 A | 3/2010 |
| CN | 102540544 A | 7/2012 |
| CN | 103109226 A | 5/2013 |
| CN | 103473494 A | 12/2013 |
| CN | 103688211 A | 3/2014 |
| CN | 103988121 A | 8/2014 |
| CN | 104133292 A | 11/2014 |
| CN | 104303085 A | 1/2015 |
| CN | 104321686 A | 1/2015 |
| CN | 104380177 A | 2/2015 |
| CN | 104597661 A | 5/2015 |
| CN | 204740413 U | 11/2015 |
| CN | 105842909 A | 8/2016 |
| CN | 105960609 A | 9/2016 |
| CN | 106104372 A | 11/2016 |
| CN | 106415342 A | 2/2017 |
| CN | 107102460 A | 8/2017 |
| CN | 209171779 U | 7/2019 |
| EP | 1956423 A1 | 8/2008 |
| EP | 2037318 A1 | 3/2009 |
| GB | 2405542 A | 3/2005 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | S58143305 A | 8/1983 |
| JP | H01130783 U | 9/1989 |
| JP | H10268251 A | 10/1998 |
| JP | H11174489 A | 7/1999 |
| JP | 2005316470 A | 11/2005 |
| JP | 2005345799 A | 12/2005 |
| JP | 2006139160 A | 6/2006 |
| JP | 2006201326 A | 8/2006 |
| JP | 2007501966 A | 2/2007 |
| JP | 2007148279 A | 6/2007 |
| JP | 2007273288 A | 10/2007 |
| JP | 2008310271 A | 12/2008 |
| JP | 2009020293 A | 1/2009 |
| JP | 2011103241 A | 5/2011 |
| JP | 2014032953 A | 2/2014 |
| JP | 2014099363 A | 5/2014 |
| KR | 20120011228 A | 2/2012 |
| KR | 20130046116 A | 5/2013 |
| KR | 1020150021937 A | 3/2015 |
| KR | 1020170013915 A | 2/2017 |
| KR | 1020170040565 A | 4/2017 |
| KR | 101990286 B1 | 6/2019 |
| TW | M537663 U | 3/2017 |
| TW | I612360 B | 1/2018 |
| WO | 2005071449 A2 | 8/2005 |
| WO | 2006030702 A1 | 3/2006 |
| WO | 2008001896 A1 | 1/2008 |
| WO | 2008078764 A1 | 7/2008 |
| WO | 2008093445 A1 | 8/2008 |
| WO | 2009008406 A1 | 1/2009 |
| WO | 2009011199 A1 | 1/2009 |
| WO | 2010021926 A2 | 2/2010 |
| WO | 2010143705 A1 | 12/2010 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2017117570 A1 | 7/2017 |
| WO | 2018003380 A1 | 1/2018 |
| WO | 2018035492 A1 | 2/2018 |
| WO | 2017178790 A1 | 10/2018 |
| WO | 2018208618 A1 | 11/2018 |
| WO | 2018221413 A1 | 12/2018 |
| WO | 2019055755 A1 | 3/2019 |
| WO | 2019067846 A1 | 4/2019 |
| WO | 2019090252 A1 | 5/2019 |
| WO | 2019147762 A1 | 8/2019 |
| WO | 2021003383 A1 | 1/2021 |

OTHER PUBLICATIONS

PCT/US2023/017639 International search report and written opinion of the international searching authority dated Jul. 6, 2023.

PCT/US2019/059990 International search report and written opinion of the international searching authority dated Feb. 28, 2020.

PCT/US2019/066208 International search report and written opinion of the international searching authority dated Feb. 27, 2020.

(56) References Cited

OTHER PUBLICATIONS

PCT/US2020/017537 International search report and written opinion of the international searching authority dated Apr. 29, 2020.
PCT/US2020/040686 International search report and written opinion of the international searching authority dated Nov. 20, 2020.
PCT/US2020/044574 International search report and written opinion of the international searching authority dated Oct. 21, 2020.
PCT/US2020/053863 International search report and written opinion of the international searching authority dated Mar. 12, 2021.
PCT/US2020/060155 International search report and written opinion of the international searching authority dated Feb. 5, 2021.
PCT/US2020/060191 International search report and written opinion of the international searching authority dated Feb. 8, 2021.
PCT/US2020/063638 International search report and written opinion of the international searching authority dated Mar. 2, 2021.
PCT/US2020/064633 International search report and written opinion of the international searching authority dated Mar. 15, 2021.
PCT/US2021/029937 International search report and written opinion of the international searching authority dated Aug. 6, 2021.
PCT/US2021/029944 International search report and written opinion of the international searching authority dated Aug. 3, 2021.
PCT/US2021/029947 International search report and written opinion of the international searching authority dated Aug. 10, 2021.
PCT/US2021/029954 International search report and written opinion of the international searching authority dated Aug. 10, 2021.
PCT/US2021/029958 International search report and written opinion of the international searching authority dated Aug. 10, 2021.
PCT/US2021/043435 International search report and written opinion of the international searching authority dated Nov. 1, 2021.
PCT/US2021/043444 International search report and written opinion of the international searching authority dated Nov. 1, 2021.
PCT/US2022/045030 International search report and written opinion of the international searching authority dated Jan. 3, 2023.
PCT/US2023/012240 International search report and written opinion of the international searching authority dated Apr. 27, 2023.
PCT/US2023/012243 International search report and written opinion of the international searching authority dated May 10, 2023.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks For Large-Scale Image Recognition", ICLR 2015.
TW107132221 First Office Action dated Apr. 28, 2022.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
Adachi, et al. "P-228L: Late-News Poster: Controllable Viewing-Angle Displays using a Hybrid Aligned Nematic Liquid Crystal Cell", ISSN, SID 2006 Digest, pp. 705-708.
Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
Cheng, et al., "Fast-Response Liquid Crystal Variable Optical Retarder and Multilevel Attenuator," Optical Engineering 52 (10), 107105 (Oct. 16, 2013). (Year: 2013).
Chiu, et al., "Advanced Hyoer-Viewing Angle Controllable LCD", 39-1 / M.- H. Chiu Invited Paper; AUO Technology Center, AU Optronics Corp., Hsinchu, Taiwan, SID 2021 Digest, ISSN 0097-996X/21/5202-0543, pp. 543-545.
CN201680061632.6 Notification of the First Office Action dated Sep. 14, 2021.
CN201780030715.3 Notification of the First Office Action dated Jan. 21, 2020.
CN201880042320.X Notification of the First Office Action dated May 25, 2021.
CN-201880042320.X Notification of the Third Office Action from the Chinese Patent Office dated Dec. 30, 2022.
CN201880073578.6 Notification of the First Office Action dated Aug. 27, 2021.
CN-201980020303.0—Notification of the First Office Action dated Dec. 16, 2021.
CN201980030279.9 Notification of the First Office Action dated Mar. 29, 2022.
CN-201980082757.0 Notification of the 1st Office Action of the Chinese Patent Office dated Dec. 5, 2022.
EP-16860628.3 Extended European Search Report of European Patent Office dated Apr. 26, 2019.
EP-17799963.8 Extended European Search Report of European Patent Office dated Oct. 9, 2019.
EP-18855604.7 Extended European Search Report of European Patent Office dated Jun. 1, 2021.
EP-18857077.4 Extended European Search Report of European Patent Office dated Jun. 16, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
EP19771688.9 Notification of the First Office Action dated Mar. 6, 2023.
EP-19825448.4 Extended European Search Report of European Patent Office dated Mar. 10, 2022.
EP-19881483.2 Extended European Search Report of European Patent Office dated Aug. 5, 2022.
EP-20754927.0 Extended European Search Report of European Patent Office dated Sep. 19, 2022.
EP-20835231.0 Extended European Search Report of European Patent Office dated May 15, 2023.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
JP2019-561773 Non-Final Notice of Reasons for Rejection dated Mar. 22, 2022.
JP2020-509511 Non-Final Notice of Reasons for Rejection dated Jul. 19, 2022.
JP2020-540724 Non-Final Notice of Reasons for Rejection dated Jan. 4, 2023.
JP-2020-540797 Non-Final Notice of Reasons for Rejection from the Japan Patent Office dated Dec. 6, 2022.
JP2020-550747 Non-Final Notice of Reasons for Rejection dated Mar. 29, 2023.
Kalantar, et al. "Backlight Unit With Double Surface Light Emission," J. Soc. Inf. Display, vol. 12, Issue 4, pp. 379-387 (Dec. 2004).
KR10-2020-7010753 Notice of Preliminary Rejection dated Feb. 17, 2023.
Nelkon et al., "Advanced Level Physics", Third edition with SI units, Heinemann Educational Books LTD, London, 1970.
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.

(56) References Cited

OTHER PUBLICATIONS

PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
CN201980056000.4 Notification of the First Office Action dated Nov. 1, 2023.
CN201980056022.0 Notification of the First Office Action dated Oct. 23, 2023.
CN202080020818.3 Notification of the First Office Action dated Oct. 23, 2023.
CN202080059812.7 Notification of the First Office Action dated Oct. 19, 2023.
EP-20872625.7 Extended European Search Report of European Patent Office dated Sep. 20, 2023.
EP-20887527.8 Extended European Search Report of European Patent Office dated Nov. 20, 2023.
JP2021-518864 Non-Final Notice of Reasons for Rejection dated Oct. 24, 2023.

\* cited by examiner

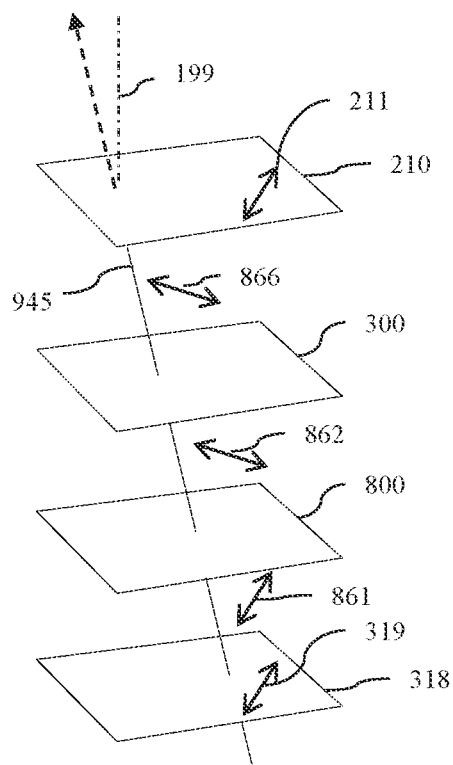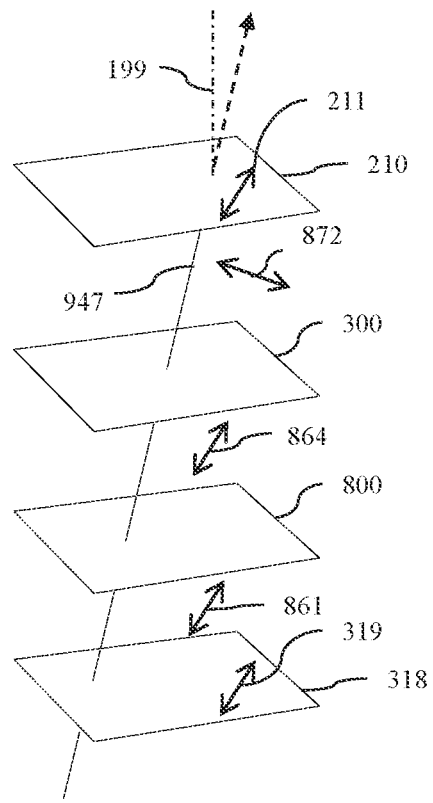
FIG. 3C    FIG. 3D
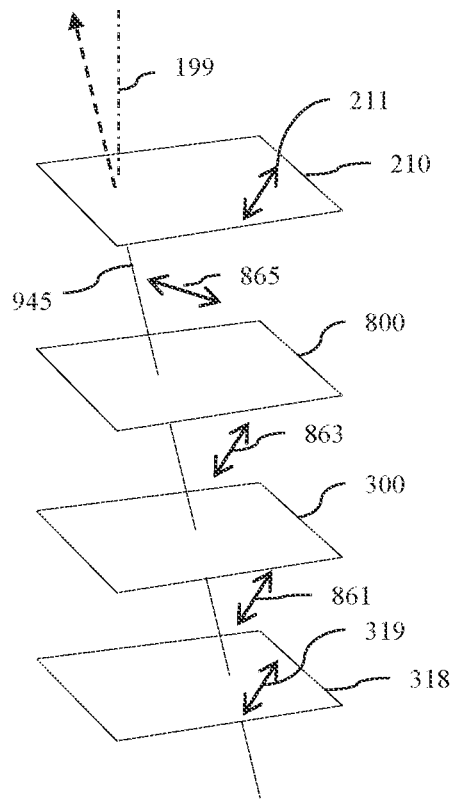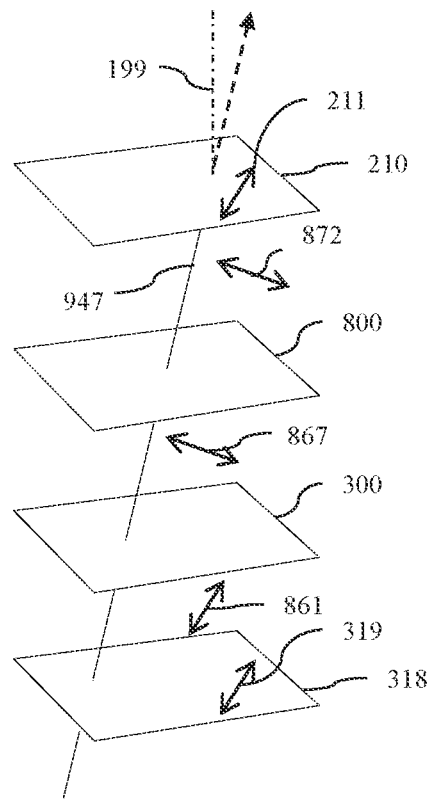
FIG. 3E    FIG. 3F

DIRECTIONAL DISPLAY APPARATUS

TECHNICAL FIELD

This disclosure generally relates to illumination from light modulation devices, and more specifically relates to optical stacks for providing control of illumination for use in display including dual view display, privacy display and night-time display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moire artefacts due to beating with the pixels of the spatial light modulator. The pitch of the micro-louvre may need selection for panel resolution, increasing inventory and cost.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

BRIEF SUMMARY

According to a first aspect of the present disclosure there is provided a display device comprising: a spatial light modulator arranged to output spatially modulated light; a display polariser arranged on a side of the spatial light modulator, the display polariser being a linear polariser; and a view angle control arrangement comprising: an additional polariser arranged on the same side of the spatial light modulator as the display polariser, the additional polariser being a linear polariser; and at least one polar control retarder and a polarisation-switch retarder arranged between the display polariser and the additional polariser, wherein the polarisation-switch retarder is switchable between a first mode in which the polarisation-switch retarder is arranged to output a first polarisation state and to a second mode in which the polarisation-switch retarder is arranged to output a second polarisation state orthogonal to the first polarisation state, and the view angle control arrangement and display polariser have a profile of transmission by angle having a local minimum in a first direction in the first mode and a local minimum in a second direction in the second mode.

A display may be provided with first and second directions in which a low luminance image may be provided. The first low luminance direction may be provided to a user such as the driver of car while a passenger sees a high luminance image. Advantageously cross talk to the driver from the passenger's image may be reduced. The second low luminance direction may be provided to a user such as the passenger of car while a driver sees a high luminance image. Advantageously cross talk to the passenger from the passenger's image may be reduced and image contrast improved for each display user.

The display device may further comprise a control system arranged to control the spatial light modulator and the polarisation-switch retarder, wherein the control system may be arranged to operate in a dual view mode of operation in which the control system, in first temporal phases, controls the spatial light modulator to display a first image and switches the polarisation-switch retarder into the second mode, and, in second temporal phases that are time-multiplexed with the first temporal phases, controls the spatial light modulator to display a second image and switches the polarisation-switch retarder into the first mode. A dual view display may be provided in which in the first phase a user such as a passenger sees a first image and the driver sees the first image with low luminance; and in the second phase a user such as a driver sees a second image and the passenger sees the second image with low luminance. Cross talk between the driver and passenger images may be advantageously reduced. The driver and passenger images are different; for example the passenger may view infotainment content and the driver may see image content that is non-distracting for the safe operation of the vehicle. The security factor of a privacy display may be increased, to advantageously further reduce driver distraction. In other applications, the users may be in a non-automotive setting, for example for sharing different image data on a common display device such as a laptop, monitor, cell phone, tablet, or television.

The control system may be further arranged to operate in a share mode of operation in which the control system, in first temporal phases, controls the spatial light modulator to display a common image and switches the polarisation-switch retarder into the second mode, and, in second temporal phases that are time-multiplexed with the first temporal phases, controls the spatial light modulator to display the common image and switches the polarisation-switch retarder into the first mode. Advantageously the driver and passenger may share the same image with high luminance and contrast.

The control system may be arranged to control the spatial light modulator and the polarisation-switch retarder in the first and second temporal phases in regions of the display device that are scanned across the display device. Cross talk between the different images may advantageously be reduced for at least some regions of the display in comparison to a non-scanned display device. The impulse response of the display may be improved, advantageously achieving increased fidelity of fast moving images.

The polarisation-switch retarder may comprise a layer of liquid crystal material, and the display device may further comprise: two surface alignment layers disposed adjacent to the layer of liquid crystal material of the polarisation-switch retarder and on opposite sides thereof; and an electrode arrangement arranged to apply voltages to the layer of liquid crystal material of the polarisation-switch retarder for switching the polarisation-switch retarder. The polarisation-switch retarder may be conveniently provided in a thin structure with low cost and fast switching response times.

The surface alignment layers disposed adjacent to the layer of liquid crystal material of the polarisation-switch retarder may each be arranged to provide homogenous alignment in the adjacent liquid crystal material. A fast switching polarisation switch may be provided.

The at least one polar control retarder may comprise a passive polar control retarder. The passive polar control retarder may comprise a layer of liquid crystal material that is cured. Thickness, cost, and complexity of the polar control retarder may advantageously be reduced.

The layer of liquid crystal material of the passive polar control retarder may have a homogenous alignment on one side thereof and may have homeotropic alignment on the other side thereof Luminance minima at desirable polar directions may be provided.

The at least one polar control retarder may comprise a switchable liquid crystal retarder comprising a layer of liquid crystal material, and the display device may further comprise: two surface alignment layers disposed adjacent to the layer of liquid crystal material of the switchable liquid crystal retarder and on opposite sides thereof and an electrode arrangement arranged to apply voltages to the layer of liquid crystal material of the switchable liquid crystal retarder. The polar control retarder may be controlled to provide local minima in the dual view mode of operation and wide field of view in the share mode of operation. Advantageously viewing freedom in share mode of operation may be increased. The location of the minima may be controlled in response to measured user locations by means of control of the voltage across the liquid crystal layer of the polar control retarder. Advantageously cross talk may be reduced over an increased range of viewing angles for the display users.

One of the surface alignment layers disposed adjacent to the layer of liquid crystal material of the switchable liquid crystal retarder may be arranged to provide homogenous alignment in the adjacent liquid crystal material, and the other of the surface alignment layers disposed adjacent to the layer of liquid crystal material of the switchable liquid crystal retarder may be arranged to provide homeotropic alignment in the adjacent liquid crystal material. Advantageously first and second minima may be directed to desirable directions and cross talk may be minimised.

The layer of liquid crystal material of the switchable liquid crystal retarder may have a twist. The twist may be in a range from 60° to 120°, preferably in a range from 70° to 90°. Advantageously a share mode with wide viewing angle may be achieved.

At least one of the surface alignment layers disposed adjacent to the layer of liquid crystal material of the switchable liquid crystal retarder may have a pretilt having a pretilt direction with a component in the plane of the layer of liquid crystal material that may be at an acute non-zero angle to the electric vector transmission directions of at least one of the display polariser and the additional polariser in at least part of the display device. Advantageously first and second minima may be directed to desirable directions and cross talk may be minimised.

The at least one polar control retarder may further comprise at least one passive correction retarder. At least one passive correction retarder may have an optical axis in the plane of the passive correction retarder. At least one passive correction retarder may have an optical axis orthogonal to the plane of the passive correction retarder. Correction of residual in-plane and out-of-plane retardance may be provided. Advantageously the location of the polar minima may be provided at desirable directions, and the size of the region of low transmission may be increased.

The view angle control arrangement may further comprise at least one polarisation-rotation retarder arranged between the display polariser and the additional polariser and arranged to rotate the direction of the polarisation state passing therethrough. A spatial light modulator with desirable polariser transmission directions may be achieved. Display luminance when the users are wearing sunglasses may be increased. Display contrast with lateral viewing angle may be increased. Efficiency of transmission of light from a backlight may be increased.

The first direction and the second direction may each be inclined with respect to a direction normal to the plane of the display device. Advantageously a centre console dual view display or privacy display for an automotive vehicle may be provided.

Said display polariser may be an output display polariser arranged on the output side of the spatial light modulator. Advantageously thickness of backlight components may be reduced.

The spatial light modulator may comprise an emissive spatial light modulator arranged to emit the spatially modulated light. Advantageously display thickness may be reduced.

The spatial light modulator may comprise a transmissive spatial light modulator and the display device may further comprise a backlight arranged to illuminate the spatial light modulator. Advantageously a backlight with directional illumination may be provided to reduce cross talk in cooperation with the view angle control arrangements.

The spatial light modulator may comprise a transmissive spatial light modulator and the display device may further comprise a backlight arranged to illuminate the spatial light modulator and said display polariser may be an input display polariser arranged on the input side of the spatial light modulator. Advantageously frontal reflections from components arranged between the spatial light modulator and users may be reduced.

The display device may further comprise: an output display polariser arranged on the output side of the spatial light modulator; a further additional polariser arranged on the output side of the spatial light modulator, the further additional polariser being a linear polariser; and at least one further polar control retarder and a further polarisation-switch retarder arranged between the further additional polariser and the output display polariser. Advantageously cross talk may be reduced.

The display device may further comprise: a further additional polariser arranged on the same side of the spatial light modulator as the additional polariser outside the additional polariser, the further additional polariser being a linear polariser; and at least one further polar control retarder and a further polarisation-switch retarder arranged between the additional polariser and the further additional polariser. Advantageously cross talk and frontal reflections may be reduced.

The backlight may comprise: at least one first light source arranged to provide input light; at least one second light source arranged to provide input light in an opposite direction from the at least one first light source; a waveguide arrangement comprising at least one waveguide, the waveguide arrangement being arranged to receive the input light from the at least one first light source and the at least one second light source and to cause light from the at least one first light source and the at least one second light source to exit from the waveguide arrangement by breaking total internal reflection; and an optical turning film component comprising: an input surface arranged to receive the light exiting from a waveguide through a light guiding surface of the waveguide by breaking total internal reflection, the input surface extending across the plane; and an output surface facing the input surface, wherein the input surface may comprise an array of prismatic elements. Separate illumination directions may be provided to the display device users. Cross talk may advantageously be reduced.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices, Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments and automotive environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 3C is a schematic diagram illustrating an alternative side view of operation of the display of FIG. 2A in the first temporal phase of operation;

FIG. 3D is a schematic diagram illustrating an alternative side view of operation of the display of FIG. 2A in the second temporal phase of operation;

FIG. 3E is a schematic diagram illustrating an alternative side view of operation of an alternative display stacking in the first temporal phase of operation;

FIG. 3F is a schematic diagram illustrating an alternative side view of operation of an alternative display stacking in the second temporal phase of operation;

DETAILED DESCRIPTION

Figure 1A:
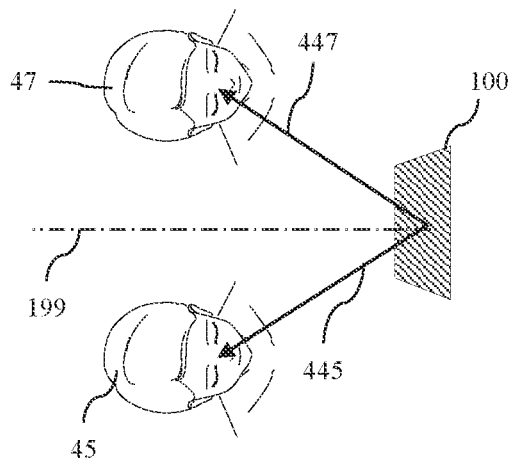
FIG. 1A is a schematic diagram illustrating a top view of a dual view display for use by first and second observers comprising a planar display device.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength that may typically be between 570 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, $\Gamma$, that it imparts on the two polarization components; which is related to the birefringence $\Delta n$ and the thickness d of the retarder by $$\Gamma = 2 \cdot \pi \cdot \Delta n \cdot d / \lambda_0 \qquad \text{eqn. 1}$$

In eqn. 1, $\Delta n$ is defined as the difference between the extraordinary and the ordinary index of refraction, i.e.

$$\Delta n = n_e - n_o \qquad \text{eqn. 2}$$

For a half-wave retarder, the relationship between d, $\Delta n$, and $\lambda_0$ is chosen so that the phase shift between polarization components is $\Gamma = \pi$. For a quarter-wave retarder, the relationship between d, $\Delta n$, and $\lambda_0$ is chosen so that the phase shift between polarization components is $\Gamma = \pi/2$.

The term half-wave retarder herein typically refers to light propagating normal to the retarder and normal to the spatial light modulator.

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP. In the current description, the SOP may be termed the polarisation state.

A linear SOP has a polarisation component with a non-zero amplitude and an orthogonal polarisation component which has zero amplitude, A linear polariser transmits a unique linear SOP that has a linear polarisation component parallel to the electric vector transmission direction of the linear polariser and attenuates light with a different SOP. The term "electric vector transmission direction" refers to a non-directional axis of the polariser parallel to which the electric vector of incident light is transmitted, even though the transmitted "electric vector" always has an instantaneous direction. The term "direction" is commonly used to describe this axis.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective polarisers that are linear polarisers are multilayer polymeric film stacks such as DBEF™ or APF™ from 3M Corporation, or wire grid polarisers such as ProFlux™ from Moxtek. Reflective linear polarisers may further comprise cholesteric reflective materials and a quarter waveplate arranged in series.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plates, i.e. C-plates with a positive $\Delta n$. A 'negative C-plate' refers to a negatively birefringent C-plate, i.e. C-plates with a negative $\Delta n$.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with a retardance $\Delta n \cdot d$ that varies with wavelength $\lambda$ as $$\Delta n \cdot d / \lambda = \kappa \qquad \text{eqn. 3}$$

where $\kappa$ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pretilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer, a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in spatial light modulators typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic-like liquid crystal molecules.

Parallel liquid crystal cell alignment refers to the alignment direction of homogeneous alignment layers being parallel or more typically antiparallel. In the case of pretilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$V=(Y+R)/(Y-K) \qquad \text{eqn. 4}$$

where V is the visual security level (VSL), Y is the luminance of the white state of the display at a snooper viewing angle, K is the luminance of the black state of the display at the snooper viewing angle and R is the luminance of reflected light from the display.

Panel contrast ratio is given as:

$$C=Y/K \qquad \text{eqn. 5}$$

so the visual security level may be further given as:

$$V=(P \cdot Y_{max}+I \cdot \rho/\pi)/(P \cdot (Y_{max}-Y_{max}/C)) \qquad \text{eqn. 6}$$

where: $Y_{max}$ is the maximum luminance of the display; P is the off-axis relative luminance typically defined as the ratio of luminance at the snooper angle to the maximum luminance $Y_{max}$; C is the image contrast ratio; $\rho$ is the surface reflectivity; and I is the illuminance. The units of $Y_{max}$ are the units of I divided by solid angle in units of steradian.

The luminance of a display varies with angle and so the maximum luminance of the display $Y_{max}$ occurs at a particular angle that depends on the configuration of the display.

In many displays, the maximum luminance $Y_{max}$ occurs head-on, i.e. normal to the display. Any display device disclosed herein may be arranged to have a maximum luminance $Y_{max}$ that occurs head-on, in which case references to the maximum luminance of the display device $Y_{max}$ may be replaced by references to the luminance normal to the display device.

Alternatively, any display described herein may be arranged to have a maximum luminance $Y_{max}$ that occurs at a polar angle to the normal to the display device that is greater than 0°. By way of example, the maximum luminance $Y_{max}$ may occur may at a non-zero polar angle and at an azimuth angle that has for example zero lateral angle so that the maximum luminance is for an on-axis user that is looking down onto the display device. The polar angle may for example be 10 degrees and the azimuthal angle may be the northerly direction (90 degrees anti-clockwise from easterly direction). The viewer may therefore desirably see a high luminance at typical non-normal viewing angles.

The off-axis relative luminance, P is sometimes referred to as the privacy level. However, such privacy level P describes relative luminance of a display at a given polar angle compared to head-on luminance, and in fact is not a measure of privacy appearance.

The illuminance, I is the luminous flux per unit area that is incident on the display and reflected from the display towards the observer location. For Lambertian illuminance, and for displays with a Lambertian front diffuser illuminance I is invariant with polar and azimuthal angles. For arrangements with a display with non-Lambertian front diffusion arranged in an environment with directional (non-Lambertian) ambient light, illuminance I varies with polar and azimuthal angle of observation.

Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$V = 1 + I \cdot \rho / (\pi \cdot P \cdot Y_{max}) \qquad \text{eqn. 7}$$

In the present embodiments, in addition to the exemplary definition of eqn. 4, other measurements of visual security level, V may be provided, for example to include the effect on image visibility to a snooper of snooper location, image contrast, image colour and white point and subtended image feature size. Thus the visual security level may be a measure of the degree of privacy of the display but may not be restricted to the parameter V.

The perceptual image security may be determined from the logarithmic response of the eye, such that $$S = \log_{10}(V) \qquad \text{eqn. 8}$$

Desirable limits for S were determined in the following manner. In a first step a privacy display device was provided. Measurements of the variation of privacy level, $P(\theta)$ of the display device with polar viewing angle and variation of reflectivity $\rho(\theta)$ of the display device with polar viewing angle were made using photopic measurement equipment. A light source such as a substantially uniform luminance light box was arranged to provide illumination from an illuminated region that was arranged to illuminate the privacy display device along an incident direction for reflection to a viewer position at a polar angle of greater than 0° to the normal to the display device. The variation $I(\theta)$ of illuminance of a substantially Lambertian emitting lightbox with polar viewing angle was determined by measuring the variation of recorded reflective luminance with polar viewing angle taking into account the variation of reflectivity $\rho(\theta)$. The measurements of $P(\theta)$, $r(\theta)$ and $I(\theta)$ were used to determine the variation of Security Factor $S(\theta)$ with polar viewing angle along the zero elevation axis.

In a second step a series of high contrast images were provided on the privacy display including (i) small text images with maximum font height 3 mm; (ii) large text images with maximum font height 30 mm and (iii) moving images.

In a third step each observer (with eyesight correction for viewing at 1000 mm where appropriate) viewed each of the images from a distance of 1000 mm, and adjusted their polar angle of viewing at zero elevation until image invisibility was achieved for one eye from a position near on the display at or close to the centre-line of the display. The polar location of the observer's eye was recorded. From the relationship $S(\theta)$, the security factor at said polar location was determined. The measurement was repeated for the different images, for various display luminance $Y_{max}$, different lightbox illuminance $I(\theta=0)$, for different background lighting conditions and for different observers.

From the above measurements S<1.0 provides low or no visual security, 1.0≤S<1.5 provides visual security that is dependent on the contrast, spatial frequency and temporal frequency of image content, 1.5≤S<1.8 provides acceptable image invisibility (that is no image contrast is observable) for most images and most observers and S≥1.8 provides full image invisibility, independent of image content for all observers.

In practical display devices, this means that it is desirable to provide a value of S for an off-axis viewer who is a snooper that meets the relationship S≥$S_{min}$, where: $S_{min}$ has a value of 1.0 or more to achieve the effect that the off-axis viewer cannot perceive the displayed image; $S_{min}$ has a value of 1.5 or more to achieve the effect that the displayed image is invisible, i.e. the viewer cannot perceive even that an image is being displayed, for most images and most observers; or $S_{min}$ has a value of 1.8 or more to achieve the effect that the displayed image is invisible independent of image content for all observers.

In comparison to privacy displays, desirably wide angle displays are easily observed in standard ambient illuminance conditions. One measure of image visibility is given by the contrast sensitivity such as the Michelson contrast which is given by:

$$M = (I_{max} - I_{min}) / (I_{max} + I_{min}) \qquad \text{eqn. 9}$$

and so:

$$M = ((Y+R) - (K+R)) / ((Y+R) + (K+R)) = Y - K / (Y + K + 2 \cdot R) \qquad \text{eqn. 10}$$

Thus the visual security level (VSL), V is equivalent (but not identical to) 1/M. In the present discussion, for a given off-axis relative luminance, P the wide angle image visibility, W is approximated as $$W = 1/V = 1/(1 + I \cdot \rho / (\pi \cdot P \cdot Y_{max})) \qquad \text{eqn. 11}$$

The above discussion focusses on reducing visibility of the displayed image to an off-axis viewer who is a snooper, but similar considerations apply to visibility of the displayed image to the intended user of the display device who is typically on-axis. In this case, decrease of the level of the visual security level (VSL) V corresponds to an increase in the visibility of the image to the viewer. During observation S<0.1 may provide acceptable visibility of the displayed image. In practical display devices, this means that it is desirable to provide a value of S for an on-axis viewer who is the intended user of the display device that meets the relationship S≤$S_{max}$, where $S_{max}$ has a value of 0.1.

In the present discussion the colour variation Δε of an output colour ($u_w' + \Delta u'$, $v_w' + \Delta v'$) from a desirable white point ($u_w'$, $v_w'$) may be determined by the CIELUV colour difference metric, assuming a typical display spectral illuminant and is given by:

$$\Delta \varepsilon = (\Delta u'^2 + \Delta v'^2)^{1/2} \qquad \text{eqn. 12}$$

The structure and operation of various directional display devices will now be described. In this description, common elements have common reference numerals. It is noted that the disclosure relating to any element applies to each device in which the same or corresponding element is provided. Accordingly, for brevity such disclosure is not repeated.

A display device 100 suitable for dual view display and/or privacy display will now be described.

FIG. 1A is a schematic diagram illustrating a top view of a dual view display device 100 for use by first and second observers 45, 47 located in directions 445, 447 with respect to the display device 100. The first direction 445 and the second direction 447 are each inclined with respect to a direction 199 normal to the plane of the display device 100.

In operation as a dual view display, it may be desirable to provide a first image that is visible to observer 45 and a second image that is visible to observer 47.

In operation as a privacy display application it may be desirable to provide low visibility and high image security of the image seen by the user 45 to the user 47, who may be a snooper. In a privacy display application, a second image may be provided to achieve reduction of contrast of the first image seen by the snooper, for example a uniform grey image such as a black image, a white image; or may be a camouflage image.

In operation as a night-time display, a high luminance image may be provided to just one of the two users 45, 47. Stray light may be reduced for a given luminance to the display user.

It would be desirable that the luminance of the second image that is seen by the observer 45 is small compared to the luminance of the first image seen by the observer 45. Similarly it would be desirable that the luminance of the first image that is seen by the observer 47 is small compared to the luminance of the second image seen by the observer 47.

It may be desirable to provide a curved dual view or curved privacy display.

Figure 1B:
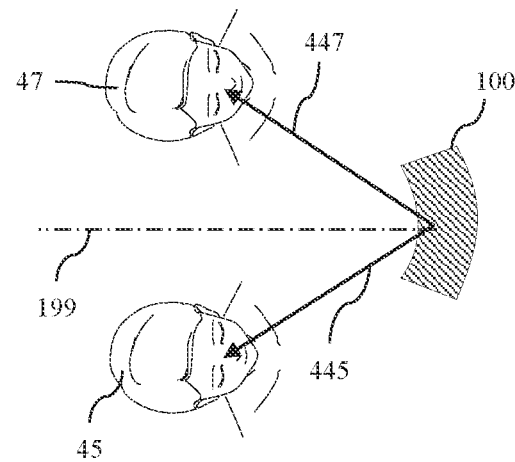
FIG. 1B is a schematic diagram illustrating a top view of a dual view display for use by first and second observers comprising a curved display device.

FIG. 1B is a schematic diagram illustrating a top view of a dual view display device 100 for use by first and second observers 45, 47 comprising a curved display device 100. Features of the embodiment of FIG. 1B not discussed in further detail may be assumed to correspond to the features with equivalent reference numerals as discussed above, including any potential variations in the features.

In a curved display device 100, the first direction 445 and the second direction 447 are each inclined with respect to at least one direction 199 normal to the plane of the display device 100. Advantageously a display may be provided that aesthetically enhances the location of use, such as in a vehicle.

The privacy display and dual view display of the present embodiments may be used for cell phone, laptop, point of sale, monitor, TV, vehicular or other applications.

A switchable dual view display device 100 such as for a vehicle will now be described.

Figure 1C:
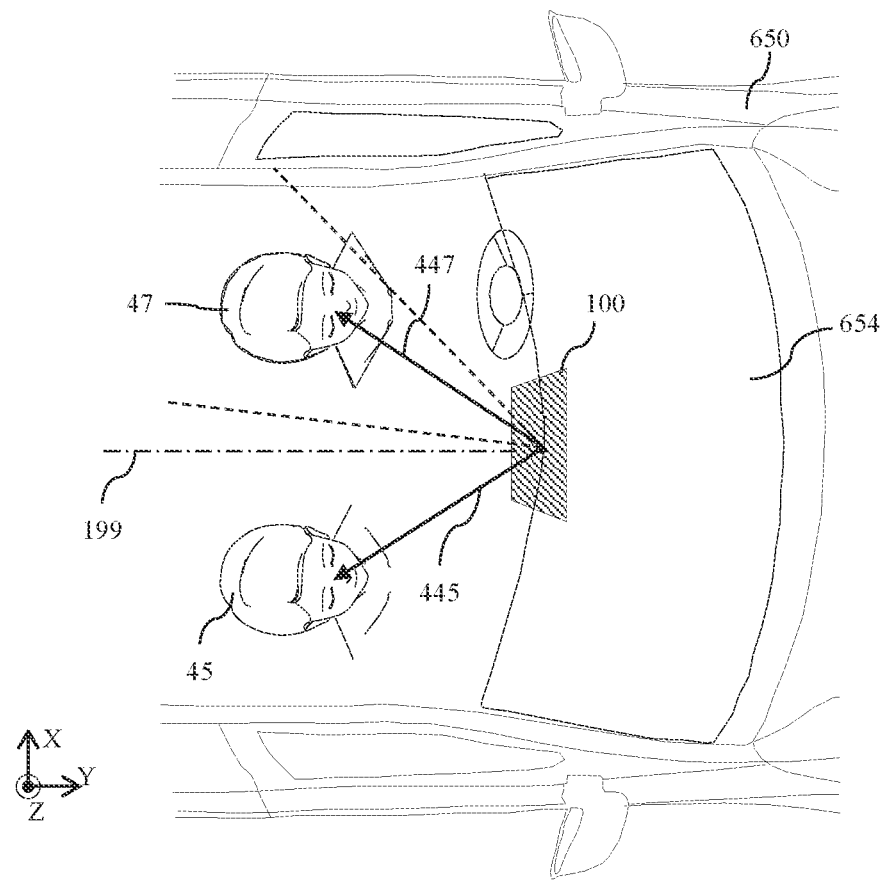
FIG. 1C is a schematic diagram illustrating a top view of a centre stack dual view display for use by a driver and a passenger in an automotive vehicle.

FIG. 1C is a schematic diagram illustrating a top view of a centre stack dual view display device 100 for use by a driver 47 and a passenger 45 in an automotive vehicle 650. Features of the embodiment of FIG. 1C not discussed in further detail may be assumed to correspond to the features with equivalent reference numerals as discussed above, including any potential variations in the features.

Vehicles may include the automotive vehicle 650 of FIG. 1C or trains, boats, and airplanes for example.

Display device 100 is arranged in a centre stack display (CSD) location, with light rays 445, 447 output to the passenger 45 and driver 47 respectively in a left hand drive vehicle 650.

In a first mode of operation that is the dual view mode, the display device 100 is arranged for viewing by the front passenger 45 with information such as infotainment information, to inhibit viewing of said infotainment information by the driver 47 and desirably to provide information such as maps and vehicular status to the driver 47.

It is desirable that the passenger 45 may view information such as entertainment without the image causing distraction to the driver 47, that is the privacy mode refers to a low driver distraction mode. This mode is in comparison with a mode in which the passenger display turns off when the vehicle is in motion to prevent driver distraction. More specifically to minimise the visibility to the driver 47 of distracting images at both the nominal driver position and when the driver leans across towards the display while driving, it is desirable to maximise the security factor S at angles α from the optical axis 199 of greater than 30° and preferably greater than 25° in the direction from the optical axis 199 towards the driver 47. Further it is desirable to achieve a high security factor, S for polar angles at least at angles β from the optical axis 199.

Further in a low stray light function of the privacy mode, it may be desirable to provide an image to the passenger 45 with desirable luminance while reducing the luminance to reflecting and scattering surfaces within the vehicle. Advantageously the brightness of internal surfaces of the vehicle 650 may be reduced during night-time operation, reducing driver distraction. Further, increased area displays may be provided while maintaining desirably low levels of stray illumination within the vehicle 650 cabin.

In a second mode that is the share mode, the display device 100 is arranged for viewing by both passenger 45 and driver 47. Such use may be for occasions when viewing the display content is safe such as when the vehicle is stationary or the content is appropriate such as map or instrument data.

An illustrative structure that can achieve the desirable characteristics of the display device 100 of FIGS. 1A-C will now be described.

Figure 2A:
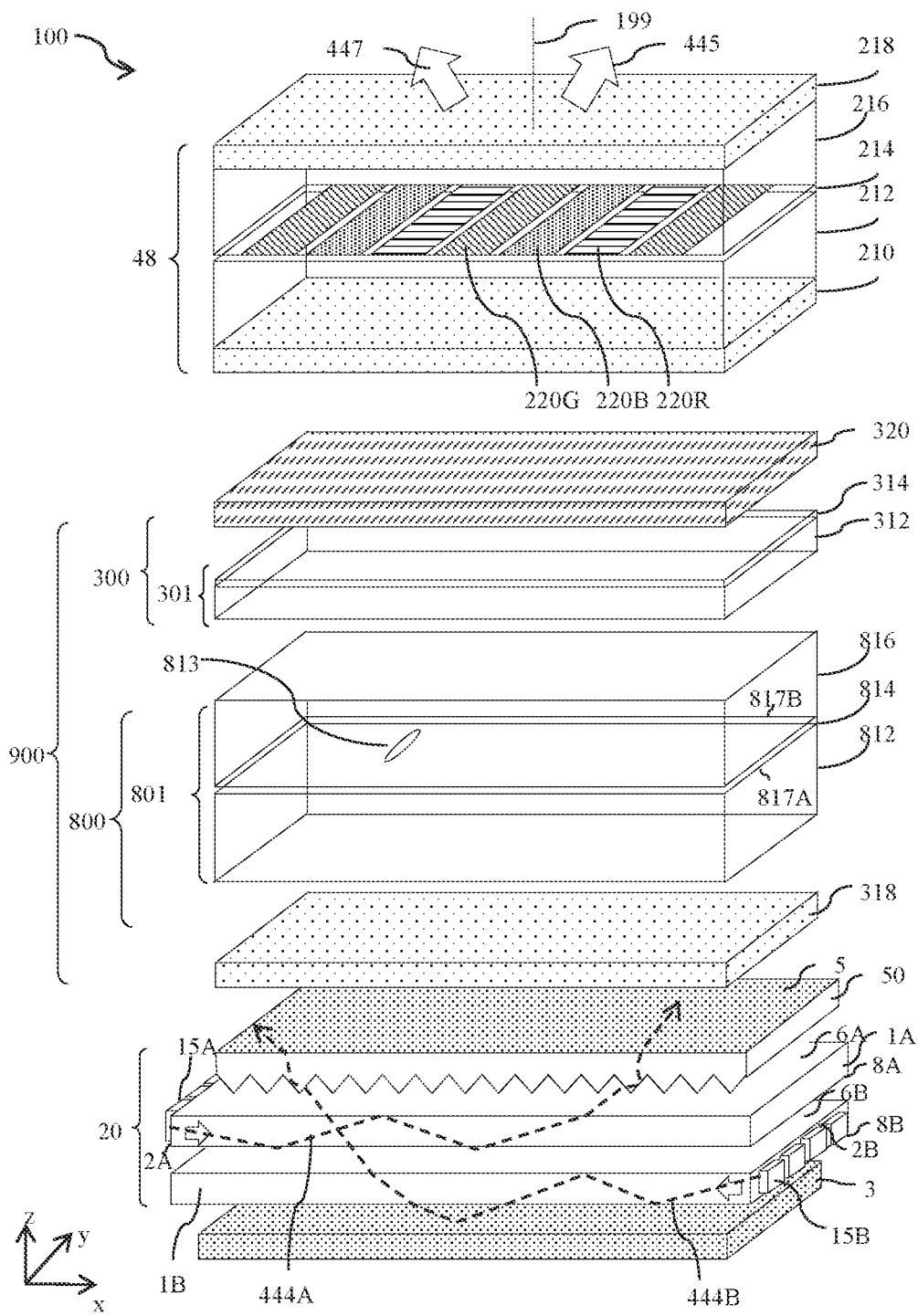
FIG. 2A is a schematic diagram illustrating a side perspective view of a switchable dual view display comprising a transmissive spatial light modulator.

FIG. 2A is a schematic diagram illustrating a side perspective view of a switchable dual view display device 100 comprising a transmissive spatial light modulator 48. Features of the embodiment of FIG. 2A not discussed in further detail may be assumed to correspond to the features with equivalent reference numerals as discussed above, including any potential variations in the features.

Display device 100 comprises a spatial light modulator 48 arranged to output spatially modulated light. In the embodiment of FIG. 2A, the spatial light modulator 48 comprises a transmissive liquid crystal display comprising substrates 212, 216, and liquid crystal layer 214 having red, green and blue pixels 220R, 220G, 220B. The spatial light modulator 48 has an input display polariser 210 and an output display polariser 218 on opposite sides thereof. The output display polariser 218 is arranged to provide high extinction ratio for light from the pixels 220R, 220G, 220B of the spatial light modulator 48. Typical polarisers 210, 218 may be absorbing polarisers such as dichroic polarisers such as an iodine or dye polariser on stretched PVA.

The transmissive spatial light modulator 48 may for example be of a type that is capable of providing fast frame addressing and update rate and a fast electro-optic response including but not limited to a fast twisted nematic (which may be of low thickness to increase further the response speed), a ferroelectric liquid crystal, and a pi-cell or Optically Compensated Bend nematic liquid crystal mode.

The spatial light modulator 48 comprises a transmissive spatial light modulator 48 and the display device 100 further comprises a backlight 20 arranged to illuminate the spatial light modulator 48 and said display polariser 210 is an input display polariser 210 arranged on the input side of the spatial light modulator 48, the display polariser 210 being a linear polariser.

A view angle control arrangement 900 comprising an additional polariser 318 is arranged on the same side of the spatial light modulator 48 as the display polariser 210, the additional polariser 318 being a linear polariser; and at least one polar control retarder 300 and a polarisation-switch retarder 800 arranged between the display polariser 210 and the additional polariser 318.

The polarisation-switch retarder 800 comprises switchable liquid crystal element 801 comprising transparent substrates 812, 816 and a layer 814 of liquid crystal material 813. Two surface alignment layers 817A, 817B are disposed adjacent to the layer 814 of liquid crystal material 813 of the polarisation-switch retarder 800 and on opposite sides thereof.

Polar control retarder 300 may comprise a liquid crystal polar control retarder 301 comprising transparent substrate 312 and a liquid crystal layer 314 as will he described further hereinbelow.

View angle control arrangement 900 may further comprise a passive correction retarder 320 as will be described further hereinbelow.

The backlight apparatus 20 comprises a rear reflector 3 and a waveguide arrangement comprising first and second waveguides 1A, 1B, and optical turning film component 50 and arranged to receive light exiting from the waveguides 1A, 1B and direct through the spatial light modulator 48.

The waveguides 1A, 1B each comprise input ends 2A, 2B arranged between first and second light guiding surfaces 6A, 8A and 6B, 8B respectively.

Light source arrays 15A, 15B are arranged to input input light into the input sides 2A, 2B of waveguides 1A, 1B respectively.

Optical stack 5 may comprise diffusers, and other known optical backlight structures such as recirculating polarisers (not shown). Asymmetric diffusers, that may comprise asymmetric surface relief features for example, may be provided in the optical stack 5 with increased diffusion in the elevation direction in comparison to the lateral direction. Advantageously image uniformity may be increased.

Light turning film component 50 is arranged to direct light from the first and second waveguides 1A, 1B to output directions 445, 447 respectively. The operation of the backlight 20 of FIG. 2A is described further in FIG. 28A hereinbelow.

Figure 2B:
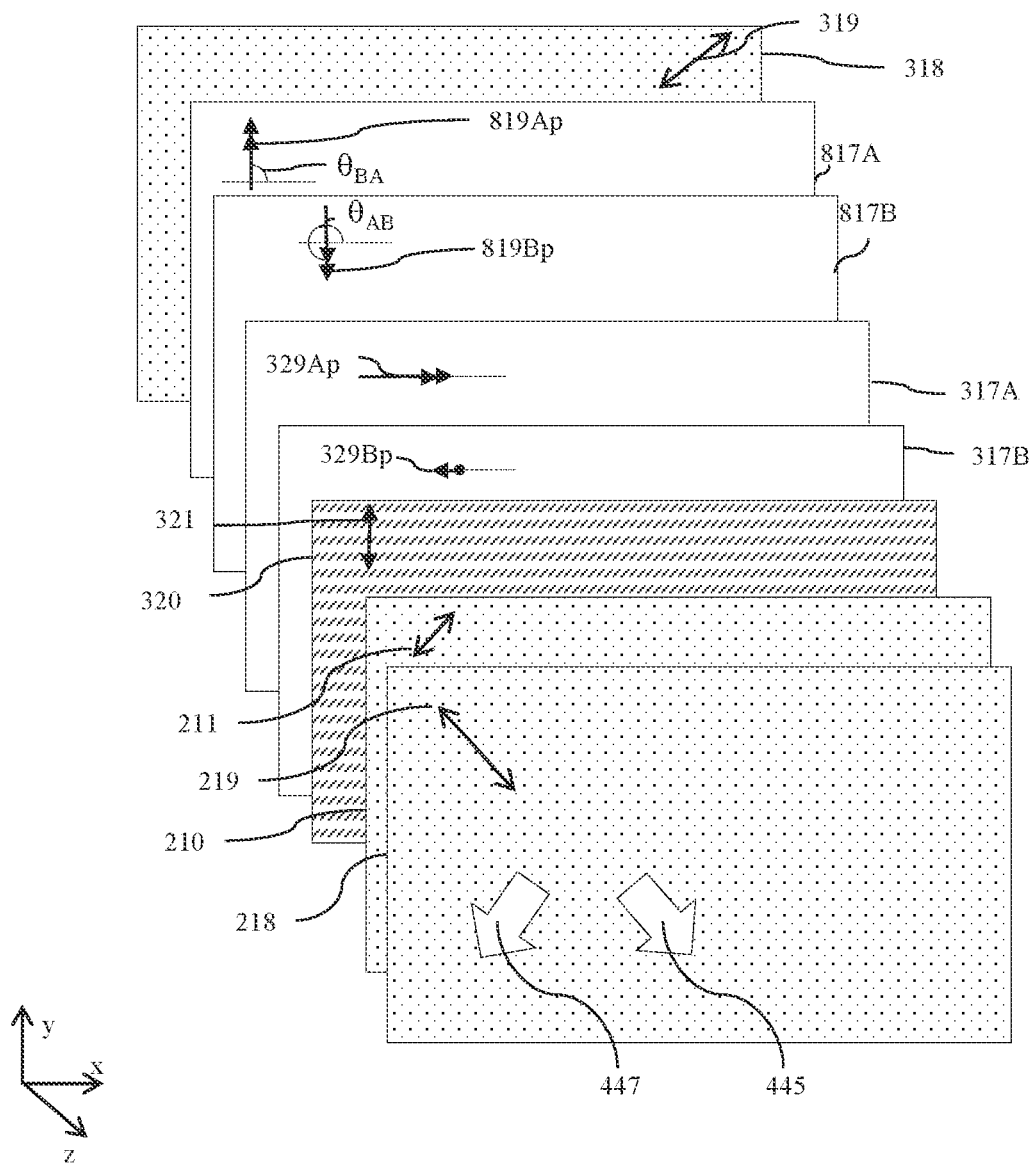
FIG. 2B is a schematic diagram illustrating a front perspective view of alignment orientations for components of the dual view display of FIG. 2A.

Considering FIG. 2B, the electric vector transmission direction 319 of additional polariser 318 is illustrated at 45 degrees from the easterly direction measured in an anti-clockwise direction. The electric vector transmission direction 211 of display polariser 210 is also at 45 degrees, and the electric vector transmission direction 219 of display polariser 218 is at 135 degrees. The spatial light modulator may be a twisted nematic spatial light modulator for example.

The surface alignment layers 817A, 817B disposed adjacent to the layer 814 of liquid crystal material 813 of the polarisation-switch retarder 800 are each arranged to provide homogenous alignment in the adjacent liquid crystal material 813.

The polarisation-switch retarder 800 comprises an alignment layer 817A that provides homogeneous alignment in the adjacent liquid crystal material 813 with an alignment component 819Ap the plane of the alignment layer 817A that is inclined at an angle $\theta_A$ of 90 degrees to the horizontal direction; and an alignment layer 817B that provides homogeneous alignment in the adjacent liquid crystal material 813 with an alignment component 819Bp in the plane of the alignment layer 817B that is inclined at an angle $\theta_B$ of 270 degrees to the horizontal direction.

The polar control retarder 300 has a liquid crystal layer 314 that comprises a first side 317A with homogeneous alignment in the adjacent liquid crystal material 813 with an alignment direction 329 with alignment direction component 329Ap in the plane of the side 317A that is inclined at an angle $\theta_A$ of 0 degrees to the horizontal direction; and a side 317B with homeotropic alignment with an alignment direction component 329Bp in the plane of the side 317B that is inclined at an angle $\theta_B$ of 180 degrees to the horizontal direction. In the embodiment of FIG. 2A the at least one polar control retarder 300 comprises a passive polar control retarder 314.

The passive correction retarder 320 has an optical axis 321 in the plane of the passive correction retarder 320 that is oriented at 90 degrees.

The display device 100 of FIG. 2A may be operated as a dual view display in which image data with high luminance is directed to both of the users 45, 47. Alternatively the display device 100 may be operated as a privacy display wherein only one of the users 45, 47 sees a high luminance image with low security factor and the other user sees an image with high security factor. Alternatively the display device 100 may be operated as a low stray light (night-time) display wherein only one of the users 45, 47 sees a high luminance image and the other user sees a low luminance image, advantageously achieving low stray light in the automotive cabin. The operation of the display device 100 will now be further described.

Figures 2C, 2D:
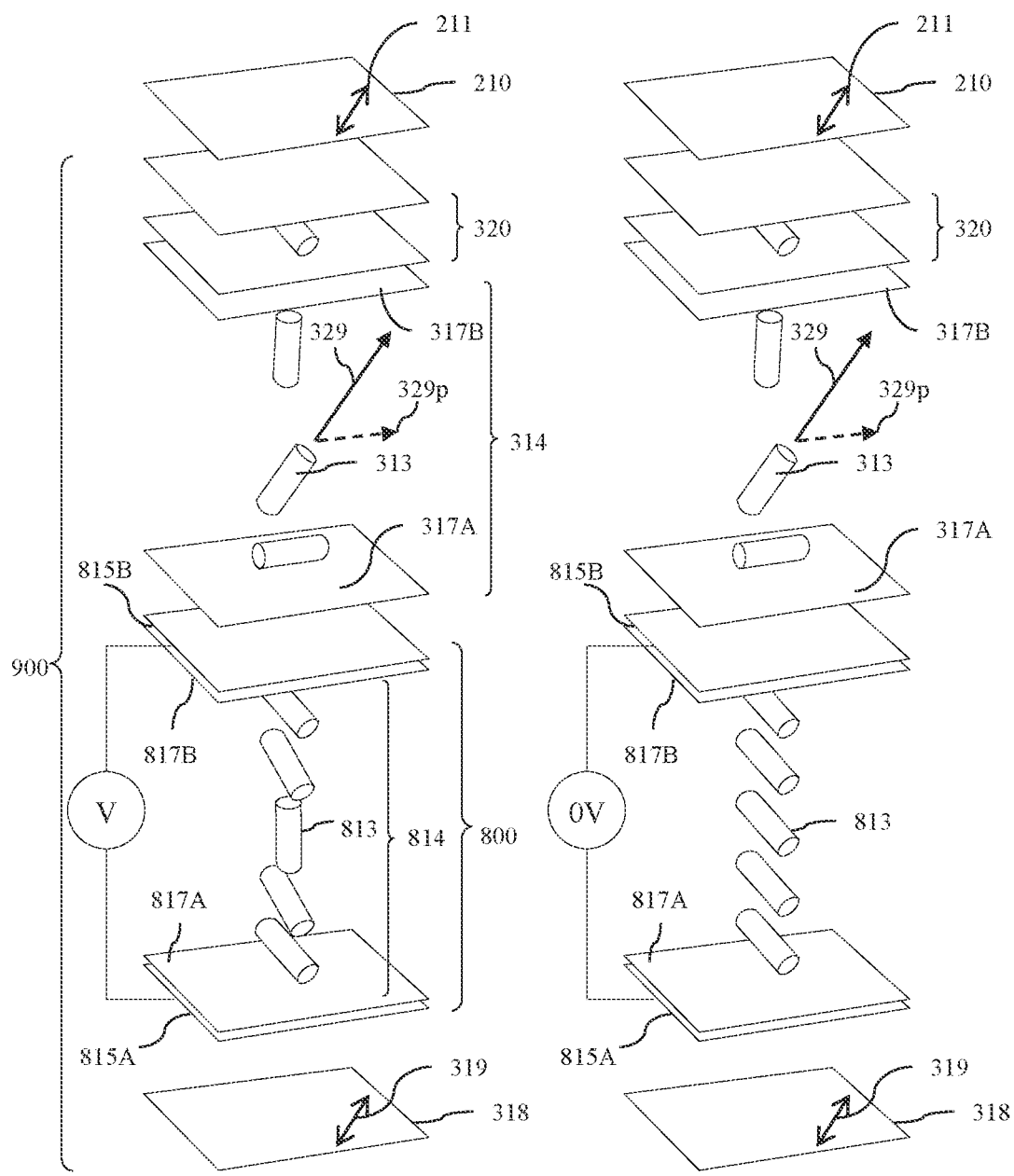
FIG. 2C is a schematic diagram illustrating a front perspective view of a view angle control arrangement of FIG. 2A for a first voltage across the polarisation-switch retarder.
FIG. 2D is a schematic diagram illustrating a front perspective view of a view angle control arrangement of FIG. 2A for a second voltage across the polarisation-switch retarder.

FIG. 2B is a schematic diagram illustrating a front perspective view of alignment orientations for components for use in the display device 100 of FIG. 2A; FIG. 2C is a schematic diagram illustrating a front perspective view of a view angle control arrangement 900 for use in the arrangement of FIG. 2A; and FIG. 2D is a schematic diagram illustrating a front perspective view of a view angle control arrangement of FIG. 2A for a second voltage across the polarisation-switch retarder. Features of the embodiment of FIGS. 2B-C not discussed in further detail may be assumed to correspond to the features with equivalent reference numerals as discussed above, including any potential variations in the features.

Electrode arrangement 815A, 815B is arranged to apply voltages to the layer 314 of liquid crystal material 313 of the polarisation-switch retarder 800 for switching the polarisation-switch retarder 800.

The passive polar control retarder 300 comprises a layer 314 of liquid crystal material 313 that is cured. The layer 314 of liquid crystal material 313 of the polar control retarder 303 has a homogenous alignment on one side thereof and has homeotropic alignment on the other side thereof.

In the present disclosure, a full description of operation of the layer of liquid crystal material at each point on the display surface is determined by evaluating the propagation of phase fronts through twisted, rotated and tilted liquid crystal layers. However, for purposes of illustration, the operation of the layer 314 may be determined by considering the optical alignment direction 329 of liquid crystal material 313 in a plane that is halfway between the sides 317A, 317B. Such an alignment may represent an average alignment of the liquid crystal material 313. Thus considering the liquid crystal material 313 alignment within the layer 314, components 329p of the optical axis 329 of the liquid crystal material 313 have an average direction that is along a predetermined direction. The predetermined direction may be the direction in which the observers 45, 47 are nominally offset, that is the plane containing the directions 445, 447.

FIG. 2C illustrates liquid crystal alignment of material 813 for a driven state with voltage V1, arranged to output a first polarisation state onto the polar control retarder 300 in the first temporal phase. The input polarisation state to the layer 814 with electric vector direction parallel to direction 319 is substantially not rotated by the retardance and orientation of the liquid crystal.

In the second temporal phase, the voltage V2 is adjusted so that the input polarisation state with electric vector direction parallel to direction 319 is rotated by the retardance and orientation of the liquid crystal. As will be described below, the output polarisation states of the layer 814 in FIG. 2C and FIG. 2D are desirably orthogonal. Residual retardance of the layer 814 may provide output polarisation states that has a limited variation with polar angle.

The view angle control arrangement 900 further comprises a passive correction retarder 320. The passive correction retarder 320 advantageously, achieves some correction of in-plane retardance of the molecules of the layer 814 of liquid crystal material 813 and the molecules of the layer 314 of liquid crystal material 313. Retarder 320 advantageously achieves correction of in-plane retardance and improved polar variation of transmission.

The structure of the display device 100 of FIG. 2A does not provide further optical control layers after the output display polariser 218. Advantageously low reflectivity can be achieved for enhanced aesthetic appearance in an automotive cabin, for example by using anti-reflection coatings on the output surface of the polariser 218 or by bonding the display to a further substrate (not shown) comprising an anti-reflection coating on the output surface of the further substrate.

The operation of the display device 100 of FIG. 2A will now be described.

Figure 3A:
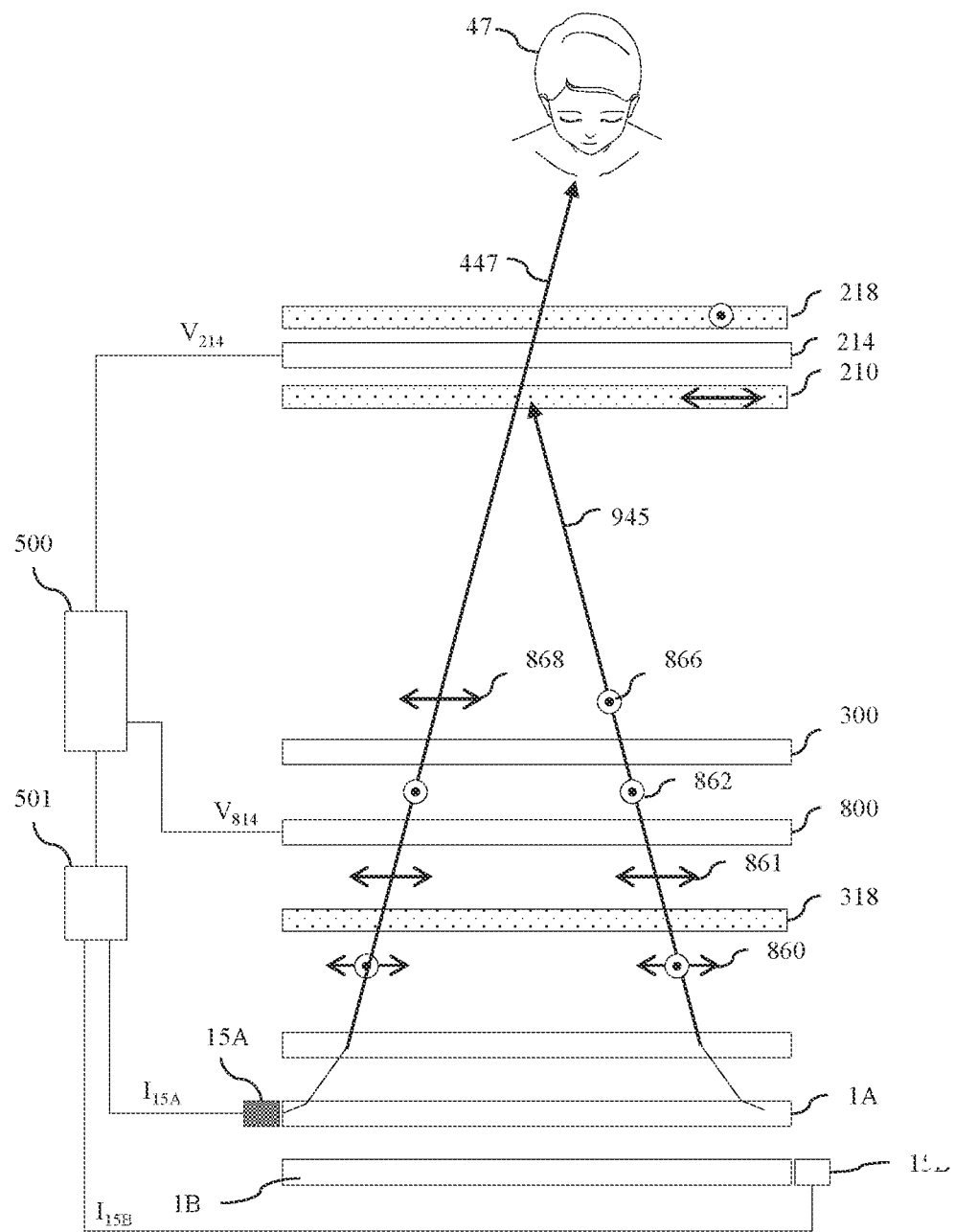
FIG. 3A is a schematic diagram illustrating a side view of operation of the display of FIG. 2A in a first temporal phase of operation.

FIG. 3A is a schematic diagram illustrating a side view of operation of the display device 100 of FIG. 2A in a first temporal phase of operation; and FIG. 313 is a schematic diagram illustrating a side view of operation of the display device 100 of FIG. 2A in a second temporal phase of operation. Features of the embodiment of FIGS. 3A-B not discussed in further detail may be assumed to correspond to the features with equivalent reference numerals as discussed above, including any potential variations in the features.

The polarisation-switch retarder 800 is switchable to a first mode as shown in FIG. 3A in which the polarisation-switch retarder 800 is arranged to output a first polarisation state 862 for unpolarised or partially polarised input light 860 that is polarised to polarisation component 861 by the additional polariser 318. For light propagating along direction 447 the polar control retarder provides an output polarisation component 868 that is transmitted by the display polariser 210 towards the driver 47. By comparison in the direction 445, the polar control retarder 300 provides an output polarisation component 866 that is absorbed by the display input polariser 210. A minimum of transmission from the view angle control arrangement 900 is thus directed along the direction 445 towards the passenger 45. The display device 100 further comprises a backlight 20 control system 501 arranged to control the backlight 20, wherein in the first mode, the light sources 15A are illuminated and light rays 447 are directed towards the driver 47. In operation, some stray light from light sources 15A may be directed in directions 445. In the present embodiments this stray light is desirably reduced by the view angle control arrangement 900.

Figure 3B:
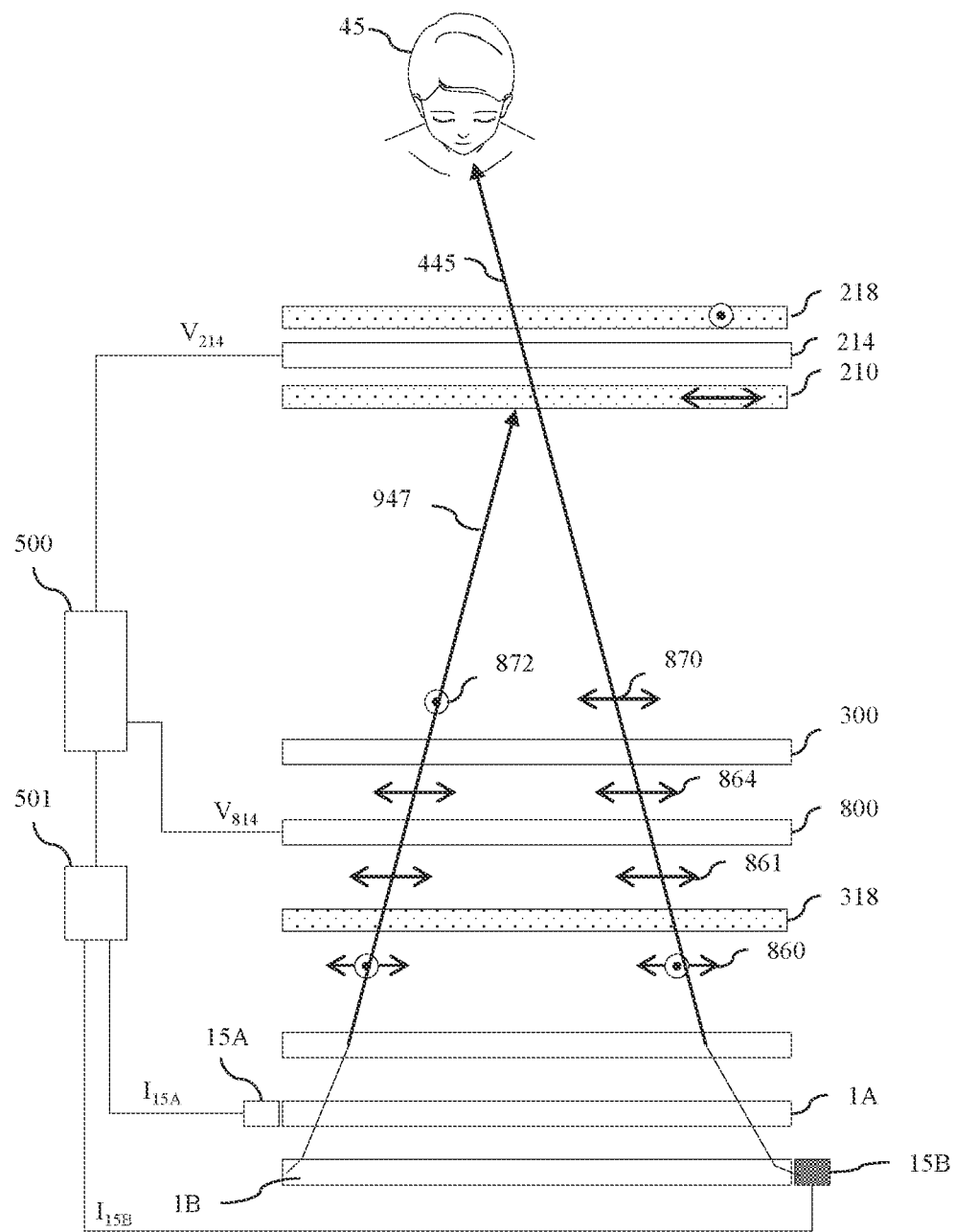
FIG. 3B is a schematic diagram illustrating a side view of operation of the display of FIG. 2A in a second temporal phase of operation.

The polarisation-switch retarder 800 is switchable to a second mode as shown in FIG. 3B in which the polarisation-switch retarder 800 is arranged to output a second polarisation state 864 orthogonal to the first polarisation state 862. For light propagating along direction 445 the polar control retarder 300 provides an output polarisation component 870 that is transmitted by the display polariser 210 towards the passenger 45. By comparison in the direction 447, the polar control retarder 300 provides an output polarisation component 872 that is absorbed by the display input polariser 210. A minimum of transmission from the view angle control arrangement 900 is thus directed towards the driver 47. The backlight 20 control system 501 is arranged to control the backlight 20, wherein in the second mode, the light sources 15B are illuminated and light rays 445 are directed towards the passenger 45. In operation, some stray light from light sources 15B may be directed in directions 447. In the present embodiments this stray light is desirably reduced by the view angle control arrangement 900. In the present description, the location of the passenger 45 and driver 47 may be swapped so that light rays 445 are directed to driver 47 and light rays 447 are directed towards passenger 45.

In the direction in which the polarisation state 872 is crossed with the electric vector transmission direction 211 of the display polariser 210, a local minimum is achieved. Thus in the present embodiment the view angle control arrangement 900 and display polariser 210 have a profile of transmission by angle having a local minimum 945 in a first direction 445 in the first mode and a local minimum 947 in a second direction 447 in the second mode.

It may be further desirable to provide a dual view display device 100.

The display further comprises a control system 500 arranged to control the spatial light modulator 48 and the polarisation-switch retarder 800, wherein the control system 500 is arranged to operate in a dual view mode of operation in which the control system 500, in first temporal phases as illustrated in FIG. 3B, controls the spatial light modulator 48 to display a first image suitable for the passenger 45 and switches the polarisation-switch retarder 800 into the second mode, and, in second temporal phases as illustrated in FIG. 3A that are time-multiplexed with the first temporal phases, controls the spatial light modulator 48 to display a second image suitable for the driver 47 and switches the polarisation-switch retarder 800 into the first mode.

The driver 47 may advantageously see a suitable image and the passenger 45 may advantageously see a different suitable image with low cross talk between driver and passenger images.

FIG. 3C is a schematic diagram illustrating an alternative side view of operation of the display of FIG. 2A in the first temporal phase of operation; FIG. 3D is a schematic diagram illustrating an alternative side view of operation of the display of FIG. 2A in the second temporal phase of operation; FIG. 3E is a schematic diagram illustrating an alternative side view of operation of an alternative display stacking in the first temporal phase of operation; and FIG. 3F is a schematic diagram illustrating an alternative side view of operation of an alternative display stacking in the second temporal phase of operation. Features of the embodiments of FIGS. 3C-F not discussed in further detail may be assumed to correspond to the features with equivalent reference numerals as discussed above, including any potential variations in the features.

FIG. 3C is an alternative illustration of the operation of the arrangement of FIG. 3A and FIG. 3D is an alternative illustration of the operation of the arrangement of FIG. 3B wherein the polarisation-switch retarder 800 is arranged between the additional polariser 318 and the polar control retarder 300.

In the alternative embodiment of FIGS. 3E-F, the sequence of the polarisation-switch retarder 800 and polar control retarder 300 is swapped so that the polar control retarder is arranged between the additional polariser 318 and the polarisation-switch retarder 800. As illustrated in FIG. 3E, for the direction 945 of the minimum transmission, the polar control retarder 300 provides an output polarisation state 863 that is parallel to the polarisation state 861. Polarisation-switch retarder 800 outputs polarisation state 865 that is absorbed by display polariser 210. As illustrated in FIG. 3F, for the direction 947 of the minimum transmission, the polar control retarder 300 provides an output polarisation state 867 that is orthogonal to the polarisation state 863. Polarisation-switch retarder 800 outputs polarisation state 872 that is absorbed by display polariser 210.

The sequence of the retarders 300, 800 may thus be adjusted to provide desirable performance, such as improved optomechanical performance.

Figure 4A:
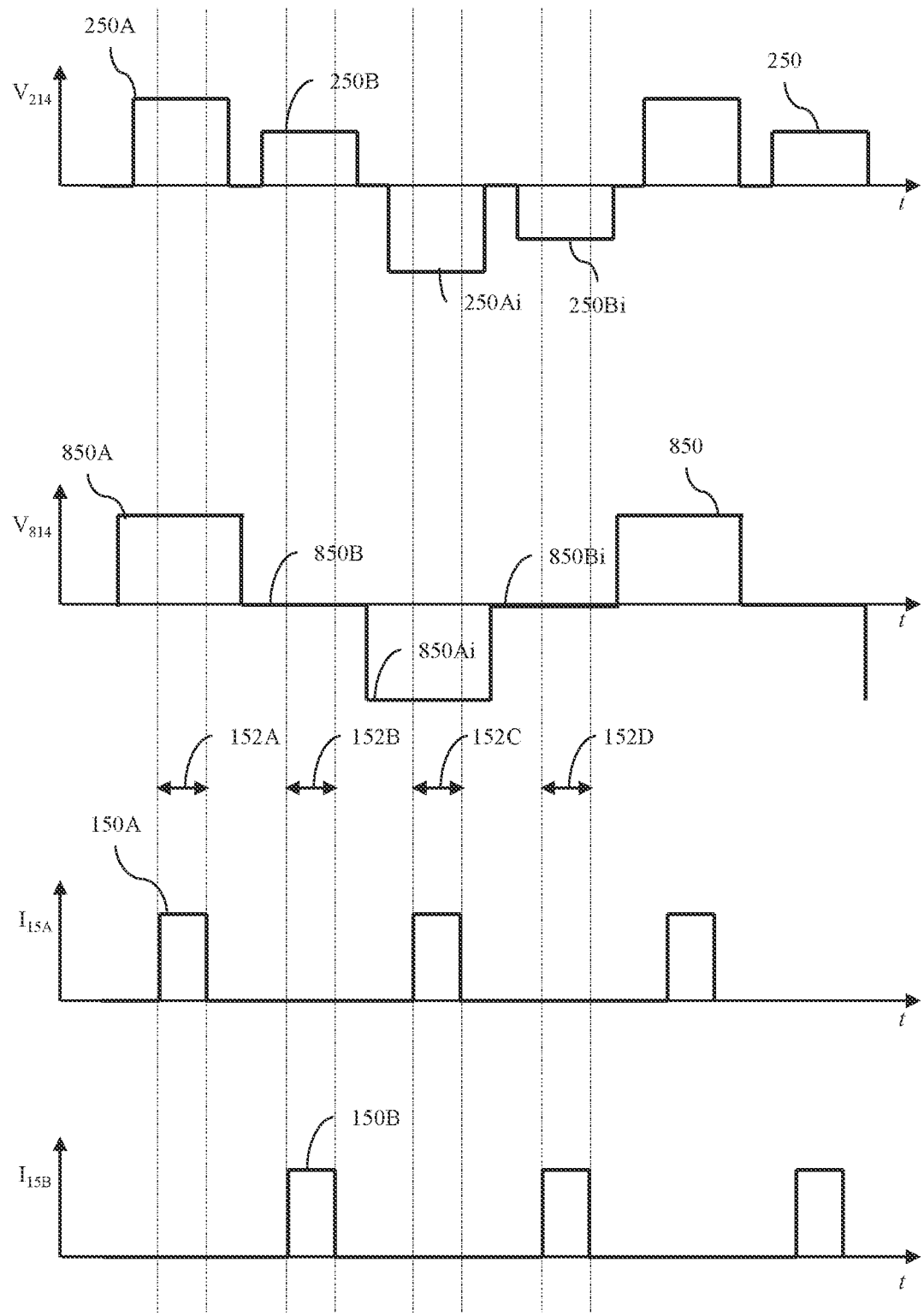
FIG. 4A is a schematic timing diagram illustrating driving of the display of FIG. 2A in dual view mode operation.

FIG. 4A is a schematic timing diagram illustrating driving of the display device 100 of FIG. 2A in dual view mode operation.

Voltage $V_{214}$ is provided across at least one pixel of the spatial light modulator 48 with waveform 250. Voltage $V_{814}$ is provided across the liquid crystal layer 814 of at least part of the polarisation-switch retarder 800 with waveform 850. Current $I_{15A}$ is provided to the light sources 15A with waveform 150A and current $I_{15B}$ is provided to the light sources 15B with waveform 150B.

In illumination temporal window 152A the pixel data voltage level 250A is set for a desirable grey level for image data suitable for the driver 47, with a transmission minimum directed towards the passenger 45 direction 445. The polarisation-switch retarder 800 is set for a voltage level to provide the polarisation output of FIG. 3A.

In illumination temporal window 152B the pixel data voltage level 250B is set for a desirable grey level for image data suitable for the passenger 45 with a transmission minimum directed towards the driver 47 direction 447. The polarisation-switch retarder 800 is set for a voltage level to provide the polarisation output of FIG. 3B.

In illumination temporal window 152C the pixel data voltage level 250Ai is set for a desirable grey level for image data suitable for the driver 47 with an inverted voltage to desirably minimise charge migration within the layer 214 of the spatial light modulator 48, with a transmission minimum directed towards the passenger 45 direction 445. The polarisation-switch retarder 800 is set for a voltage level to provide the polarisation output of FIG. 3A with an inverted voltage to desirably minimise charge migration within the layer 814 of the polarisation-switch retarder 800.

In illumination temporal window 152D the pixel data voltage level 250Bi is set for a desirable grey level for image data suitable for the passenger 45 with an inverted voltage to desirably minimise charge migration within the layer 214 of the spatial light modulator 48. with a transmission minimum directed towards the driver 47 direction 447. The polarisation-switch retarder 800 is set for a voltage level to provide the polarisation output of FIG. 3B with an inverted voltage 850Bi (which may be zero and thus the same as voltage 850B) to desirably minimise charge migration within the layer 814 of the polarisation-switch retarder 800.

Figure 5:
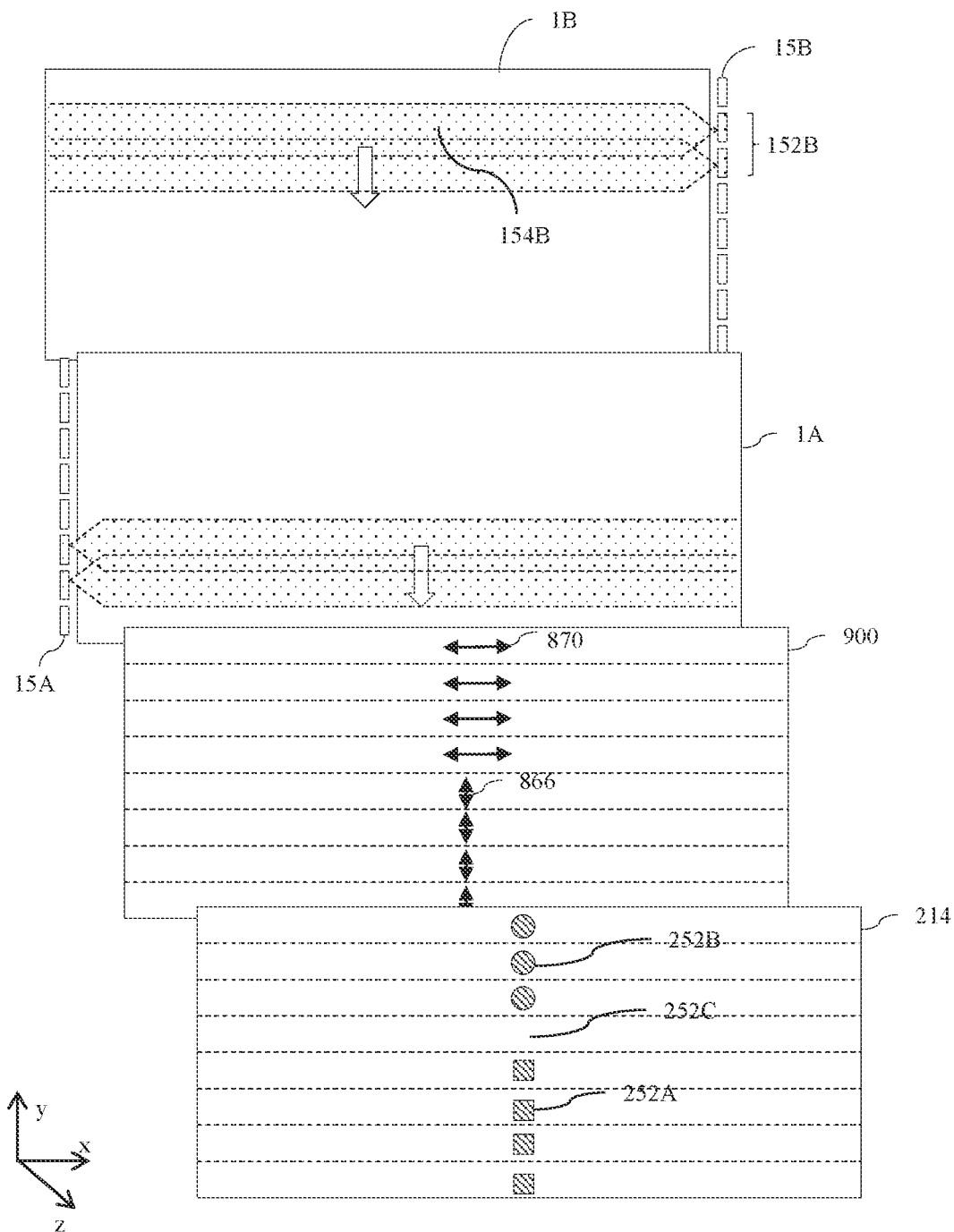
FIG. 5 is a schematic diagram illustrating a front perspective view of addressing of components of a dual view display in scanned operation.

Voltage $V_{214}$ is provided across at least one pixel 220R, 220G, 220B of the spatial light modulator 48 and may be inverted every two fields rather than on alternate fields as this provides improved DC-balance for a time sequential spatial light modulator 48. The illumination phases of waveforms 150A and 150B typically illuminate a group of pixels 220, for example as illustrated in FIG. 5 hereinbelow or over the entire spatial light modulator 48 and the illumination timing width is optimised on this basis.

Advantageously the display device may provide a dual view image with low cross talk between driver 47 suitable image and passenger 45 suitable image. Further charge migration within the liquid crystal layers may be minimised.

It may also be desirable to provide a share mode of operation.

Figure 4B:
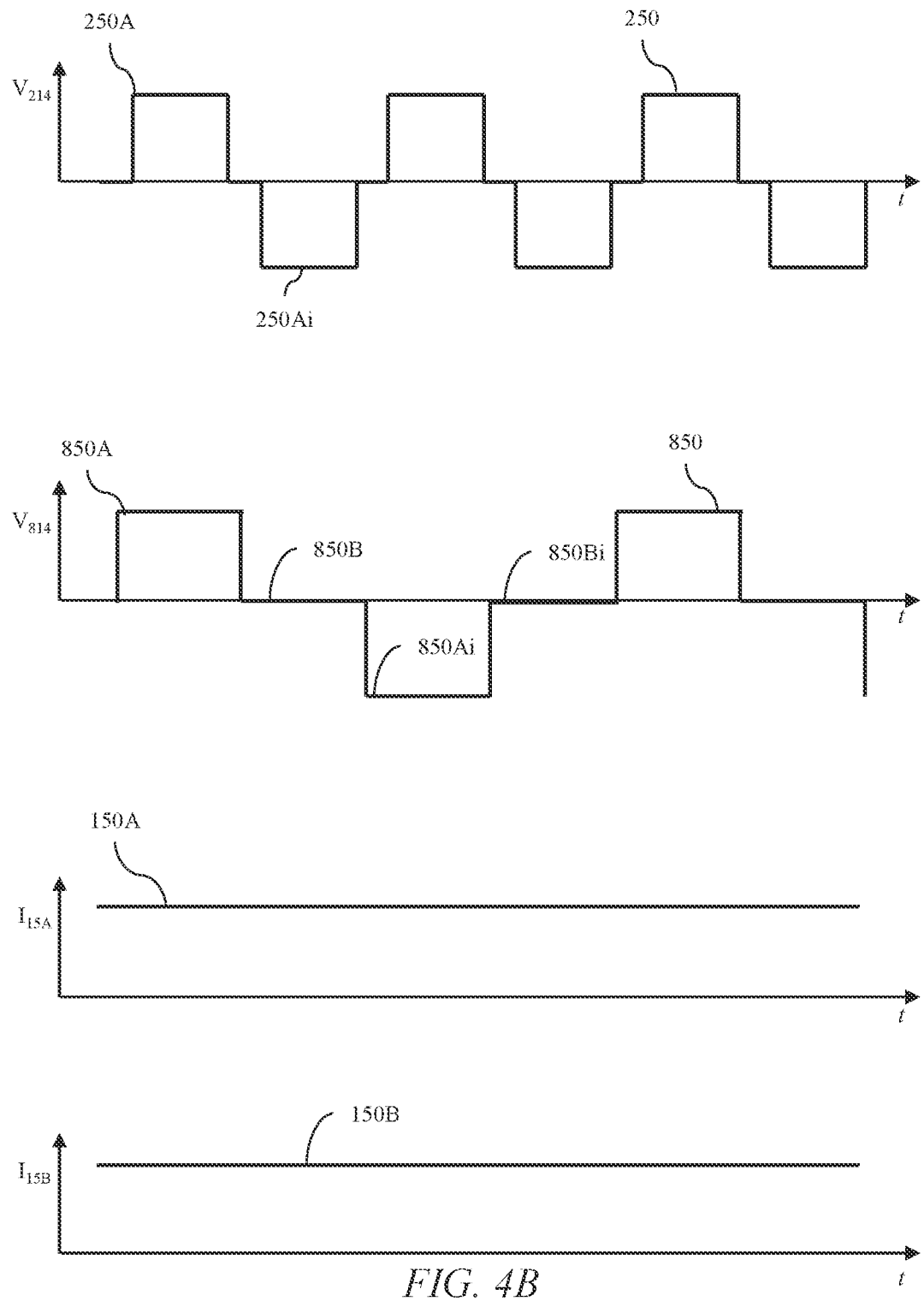
FIG. 4B is a schematic timing diagram illustrating driving of the display of FIG. 2A in share mode operation.

FIG. 4B is a schematic timing diagram illustrating driving of the display device 100 of FIG. 2A in share mode operation. Features of the embodiment of FIG. 4B not discussed in further detail may be assumed to correspond to the features with equivalent reference numerals as discussed above, including any potential variations in the features.

The control system 500 is further arranged to operate in a share mode of operation in which the control system 500, in first temporal phases, controls the spatial light modulator 48 to display a common image and switches the polarisation-switch retarder 800 into the second mode, and, in second temporal phases that are time-multiplexed with the first temporal phases, controls the spatial light modulator 48 to display the common image and switches the polarisation-switch retarder 800 into the first mode.

In comparison to the dual view mode, the waveform 250 is inverted on alternating fields. Further the light sources 15A, 15B may be continuously illuminated. Advantageously luminance may be increased.

Alternatively, the waveform 250 may continue to invert every two fields. Advantageously the inversion control system is simplified.

It may be desirable to provide scanned display device 100.

FIG. 5 is a schematic diagram illustrating a front perspective view of addressing of components of a dual view display device 100 in scanned operation, frozen for a given time. Features of the embodiment of FIG. 5 not discussed in further detail may be assumed to correspond to the features with equivalent reference numerals as discussed above, including any potential variations in the features.

The control system 500 is arranged to control the spatial light modulator 48 and the polarisation-switch retarder 800 in the first and second temporal phases in regions of the display device 100 that are scanned across the display device 100.

Figure 28A:
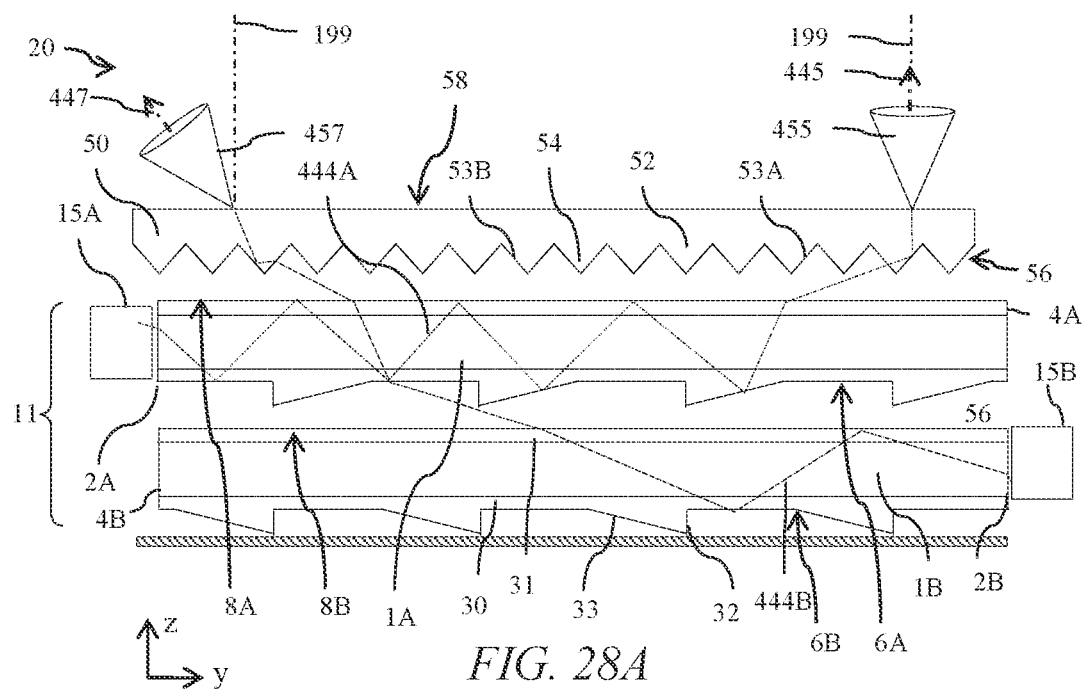
FIG. 28A is a schematic diagram illustrating a side view of a switchable backlight comprising first and second waveguides, a rear reflector and an optical turning film and outputting light beams for passenger and driver nominal directions.

Control system 501 is arranged such that waveguide 1B is illuminated by some of the LEDs 152B and waveguide 1A is illuminated by some of the LEDs 152A. In operation, the collimated waveguides 1A, 1B that are described further in FIG. 28A provide light stripes 154B, 154A across some of the backlight 20, achieving horizontal light stripes in different regions of the display device 100.

The view angle control arrangement 900 comprises a polarisation-switch retarder 800 with segmented regions such that some regions output polarisation state 870 that are aligned with light stripes 154B and other regions output polarisation component 866 that are aligned with light stripes 154A.

The spatial light modulator 48 comprises liquid crystal layer 214 that is addressed in a scanned manner such that in region 252B, image data is presented that is aligned with light stripes 154B and polarisation component 870 whereas in different region 252A different image data is presented that is aligned with light stripes 154A and polarisation component 866. In region 252C, switching of the liquid crystal layer 214 between the two images 252A, 252B may be provided and are not seen by either driver 47 or passenger 45.

In spatial light modulators 48 that are addressed sequentially a line at a time to build up an image, a fast electro-optic material response provides more time for the active electro-optic material, such as a liquid crystal, to respond and establish a fully responded stable image. The backlight illumination may be synchronised to the formation of the stable image. In this way the illumination of all or part of the response curve of the electro-optic material of the spatial light modulator 48 and or the polarisation-switch retarder 800 may be avoided. This means that the image contrast of the displayed image may be improved.

Alternatively, a fast frame rate spatial light modulator 48 and a fast-responding electro-optic material may be used to produce a frame sequential display where alternate frame images are displayed synchronised to the illumination from the backlight 20 and the polarisation-switch retarder 800. The fast-responding spatial light modulator 48 therefore provides reduced cross talk between sequential images.

Figure 6A:
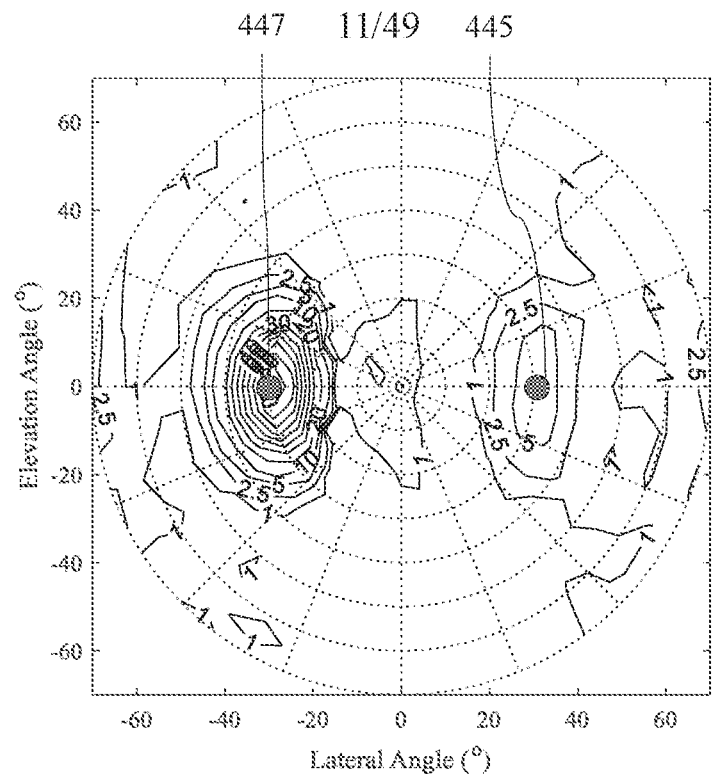
FIG. 6A is a schematic graph illustrating the angular profile of luminance output for the backlight of FIG. 2A in the first temporal phase of operation.
Figure 6B:
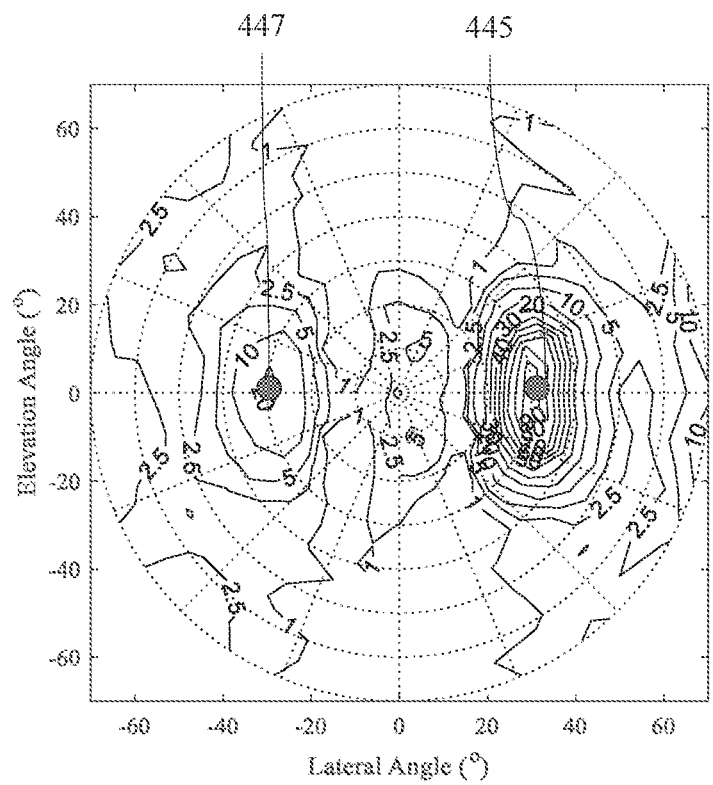
FIG. 6B is a schematic graph illustrating the angular profile of luminance output for the backlight of FIG. 2A in the second temporal phase of operation.

FIG. 6A is a schematic graph illustrating the angular profile of luminance output for the backlight 20 of FIG. 2A in the first temporal phase of operation; and FIG. 6B is a schematic graph illustrating the angular profile of luminance output for the backlight 20 of FIG. 2A in the second temporal phase of operation.

The present disclosure describes a profile of quantities such as luminance or transmission by angle. Any such quantity may have values that vary in directions defined by angle, for example by elevation angle and lateral angle (or in a different coordinate system not used herein by inclination angle and azimuth angle), thereby defining a profile by angle. Herein, different directions may be referred to as polar locations and the profile by angle may be referred to as a polar profile or an angular profile. For example, the polar location having an elevation angle of 0 degrees and a lateral angle of 0 degrees refers to a direction that is normal to the plane of the display device. Similarly the polar location 445 refers to a nominal direction of the driver 47 and the polar location 447 refers to the nominal direction of the passenger 45, as described elsewhere herein.

Referring to FIG. 2A, the polar distribution of the light output of rays 445, 447 towards passenger 45 and driver 47 respectively may be further modified by diffusers including diffuser 5 arranged after the turning film 50 of the backlight 20 or diffusers arranged between other components of the display device 100 and the users 45, 47.

The backlight 20 of FIG. 2A may advantageously achieve high luminance around the direction 445 in the first temporal phase of operation and high luminance around the direction 447 in a second temporal phase of operation.

An illustrative embodiment of FIG. 2C will now be described, as shown in TABLE 1.

a range from 200 nm to 300 nm and preferably from 230 nm to 270 nm. The polar control retarder 300 has a homogeneous alignment layer and a homeotropic alignment layer and a retardance for light of a wavelength of 550 nm in a range from 200 nm to 300 nm and preferably from 230 nm to 270 nm. The polar control retarder 300 of TABLE 1 has no twist. The correction retarder 320 has a retardance in the range from 100 nm to 200 nm and preferably in the range from 130 nm to 170 nm.

Simulated angular profiles of transmission for the embodiment of TABLE 1 will now be described.

Figure 7A:
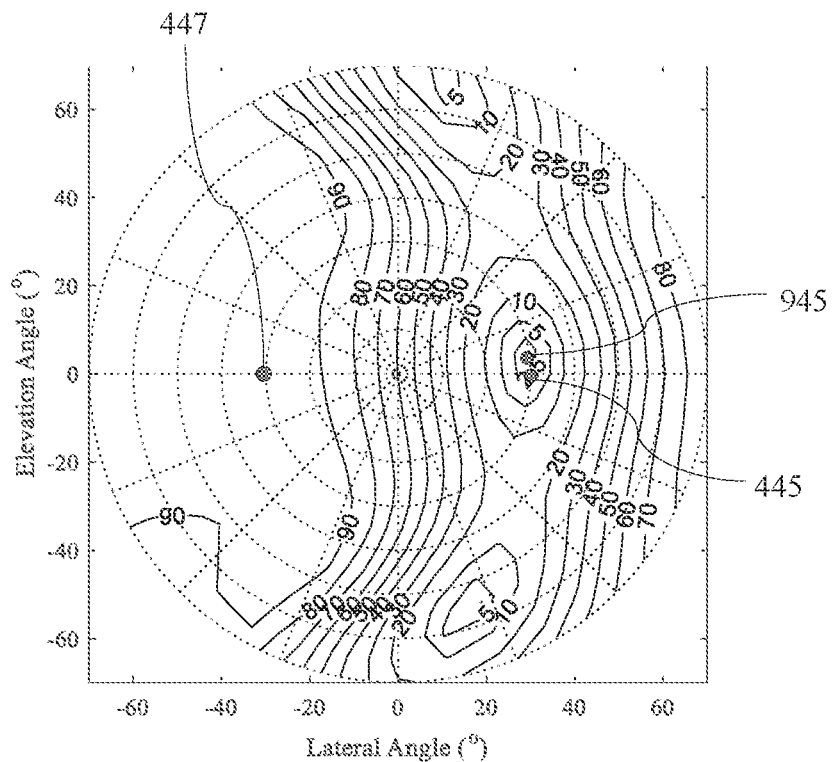
FIG. 7A is a schematic graph illustrating the angular profile of transmission for the view angle control arrangement of FIG. 2A in the first temporal phase of operation.
Figure 7B:
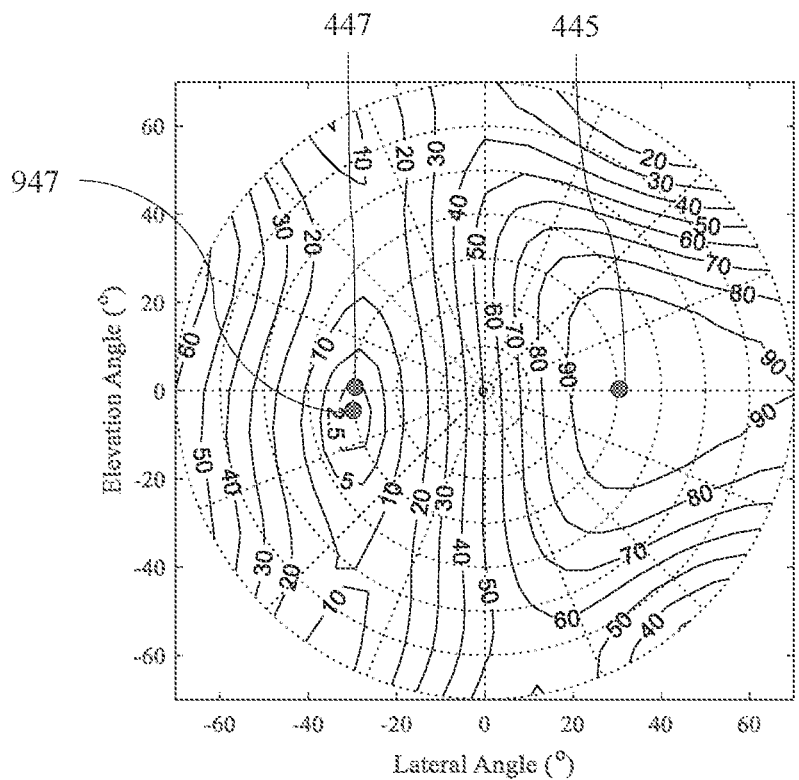
FIG. 7B is a schematic graph illustrating the angular profile of transmission for the view angle control arrangement of FIG. 2A in the second temporal phase of operation.
Figure 8A:
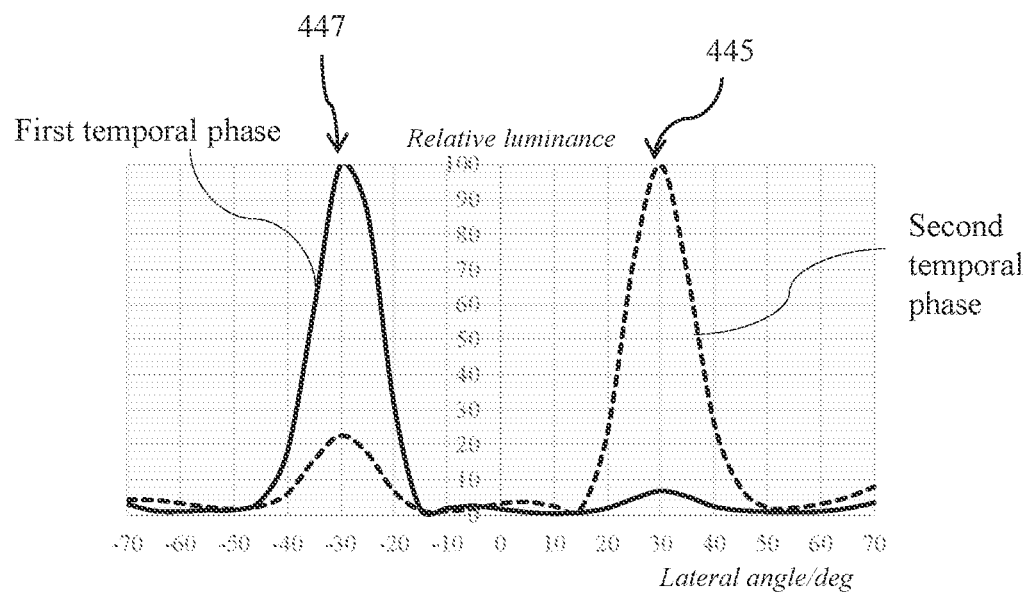
FIG. 8A is a schematic graph illustrating the lateral variation of luminance output for the backlight of FIG. 2A in first and second temporal phases of operation.
Figure 8B:
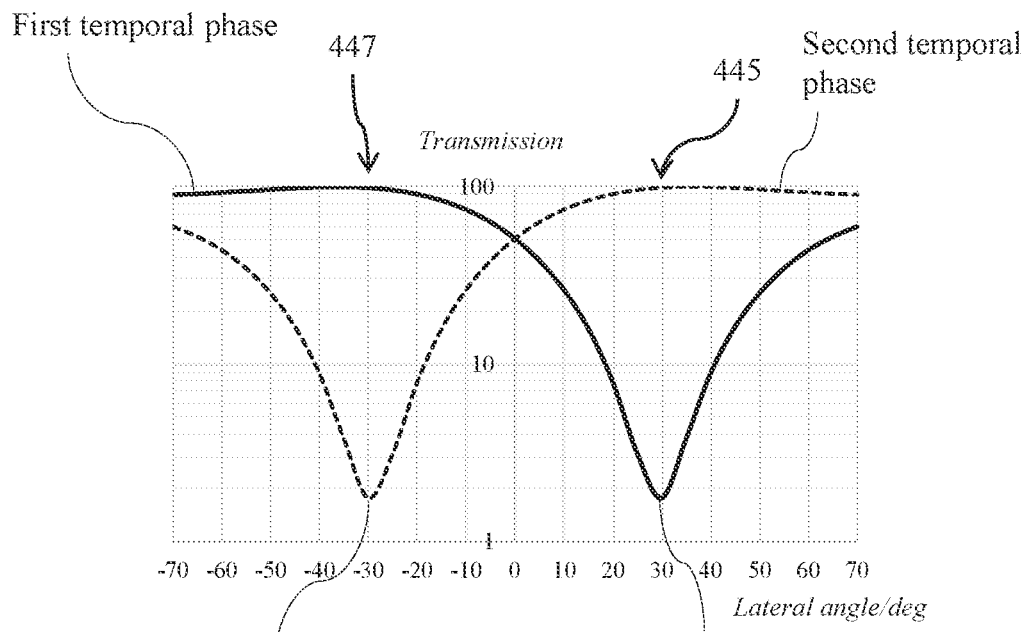
FIG. 8B is a schematic graph illustrating the lateral variation of transmission for the view angle control arrangement of FIG. 2A in first and second temporal phases of operation.

FIG. 7A is a schematic graph illustrating the angular profile of transmission for the view angle control arrangement 900 of FIG. 2A in the first temporal phase of operation; FIG. 7B is a schematic graph illustrating the angular profile of transmission for the view angle control arrangement 900 of FIG. 2A in the second temporal phase of operation: FIG. 8A is a schematic graph illustrating the lateral variation for zero degrees elevation of luminance output for the backlight 20 of FIG. 2A in first and second temporal phases of operation; and FIG. 8B is a schematic graph illustrating the lateral variation for zero degrees elevation of transmission for the view angle control arrangement 900 of FIG. 2A in first and second temporal phases of operation.

The view angle control arrangement 900 and display polariser 210 have a profile of transmission by angle having a local minimum 945 in a first direction 445 in the first mode as illustrated in FIG. 7A and a local minimum 947 in a second direction 447 in the second mode as illustrated in FIG. 7B.

In the first temporal phase, the driver 47 direction 447 has high luminance and the passenger 45 direction 445 is at or near to the minimum transmission of the view angle control arrangement 900. Advantageously stray light from the backlight profile of FIG. 6A is minimised for the passenger 45.

In the second temporal phase, the driver 47 direction 447 is at or near to the minimum transmission of the view angle control arrangement 900 and the passenger 45 direction 445 sees output from the view angle control arrangement 900 with high transmission. Advantageously stray light from the backlight profile of FIG. 6B is minimised for the driver 47.

Figure 9:
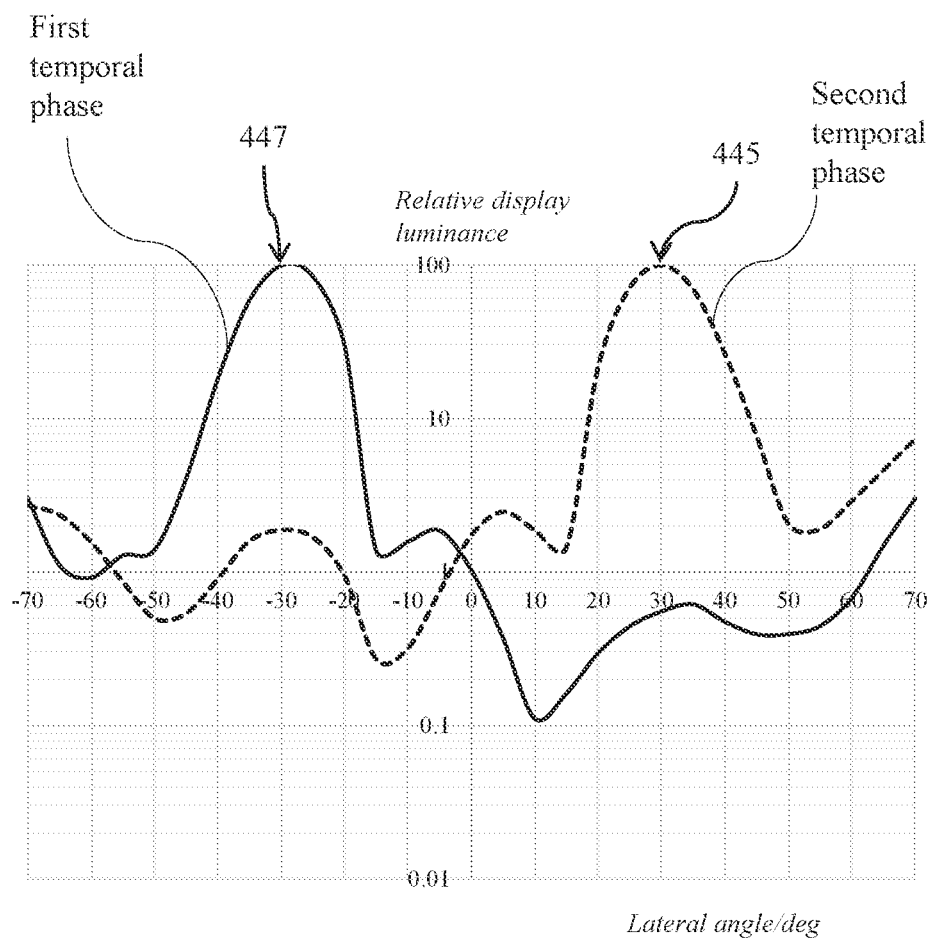
FIG. 9 is a schematic graph illustrating the lateral variation of luminance output for the display of FIG. 2A with the view angle control arrangement of FIG. 2C in first and second temporal phases of operation.

FIG. 9 is a schematic graph illustrating the lateral variation of luminance output for the display device 100 of FIG. 2A with the view angle control arrangement 900 of FIG. 2C in first and second temporal phases of operation. The graphs

TABLE 1

| Item | Layer | Alignment type | Pretilt | In-plane alignment direction | LC layer 314 retardance {narrow range} (wide range) | Additional retarder type | Additional passive retarder retardance {narrow range} (wide range) |
|---|---|---|---|---|---|---|---|
| 318 | | | | | | Polariser @ 45° | |
| 800 | 817A | Homogeneous | 2° | θ 90° | +250 nm | | |
| | 817B | Homogeneous | 2° | θ 270° | {230 nm~270 nm} (200 nm~300 nm) | | |
| 300 | 317A | Homogeneous | 2° | θ 0° | +250 nm | | |
| | 317B | Homeotropic | 88° | θ 180° | {230 nm~270 nm} (200 nm~300 nm) | | |
| 320 | | | | | | Positive A-plate @ 90° | +150 mm {130 nm~170 nm} (100 nm~200 nm) |
| 210 | | | | | | Polariser @ 45° | |
| 218 | | | | | | Polariser @ 135° | |

In the embodiment of TABLE 1, the polarisation-switch retarder 800 has at parallel homogeneous alignment layers and has a retardance for light of a wavelength of 550 nm in of FIG. 9 are provided by the multiplicative effects of the backlight profiles of FIG. 8A and the view angle control arrangement 900 profiles of FIG. 8B.

FIG. 9 illustrates the maximum cross talk of the passenger image as seen by the driver 47 in location 447 is approximately 2% and the maximum cross talk of the driver image as seen by the passenger in location 445 is approximately 0.6%. In an alternative configuration, it may be desirable to provide the driver 47 at direction 445 and the passenger 45 at direction 447. Advantageously driver distraction may be minimised.

Cross talk between the image suitable for the driver 47 and the image suitable for the passenger 45 is reduced. Driver 47 distraction may be reduced and vehicle safe operation enhanced.

In alternative embodiments compared to that of TABLE 1, it may be desirable to adjust the nominal viewing location for the driver 47 and/or passenger 45. Such adjustments may be achieved by modifying backlight 20 profiles, for example by modifying light turning component 50 or waveguide 1A, 1B design as illustrated in FIG. 28A. Alternatively, the retardance of the polar control retarder 300, correction retarder 320, and polarisation-switch retarder 900 may be modified.

It may be desirable to provide modified polariser electric vector transmission directions in the display device 100.

Figure 10A:
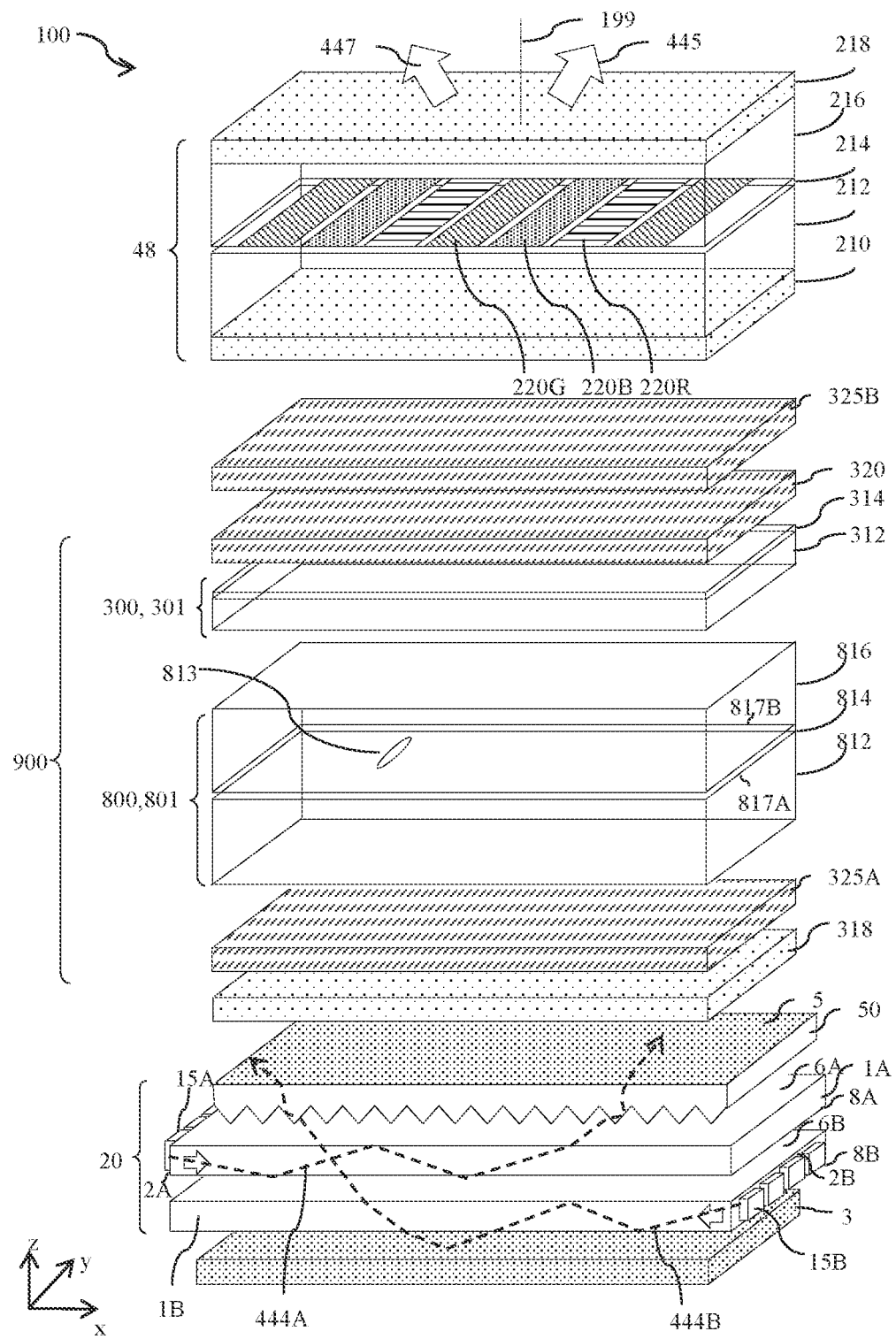
FIG. 10A is a schematic diagram illustrating a side perspective view of a switchable dual view display comprising a transmissive spatial light modulator with an alternative arrangement of polariser electric vector transmission directions.
Figure 10B:
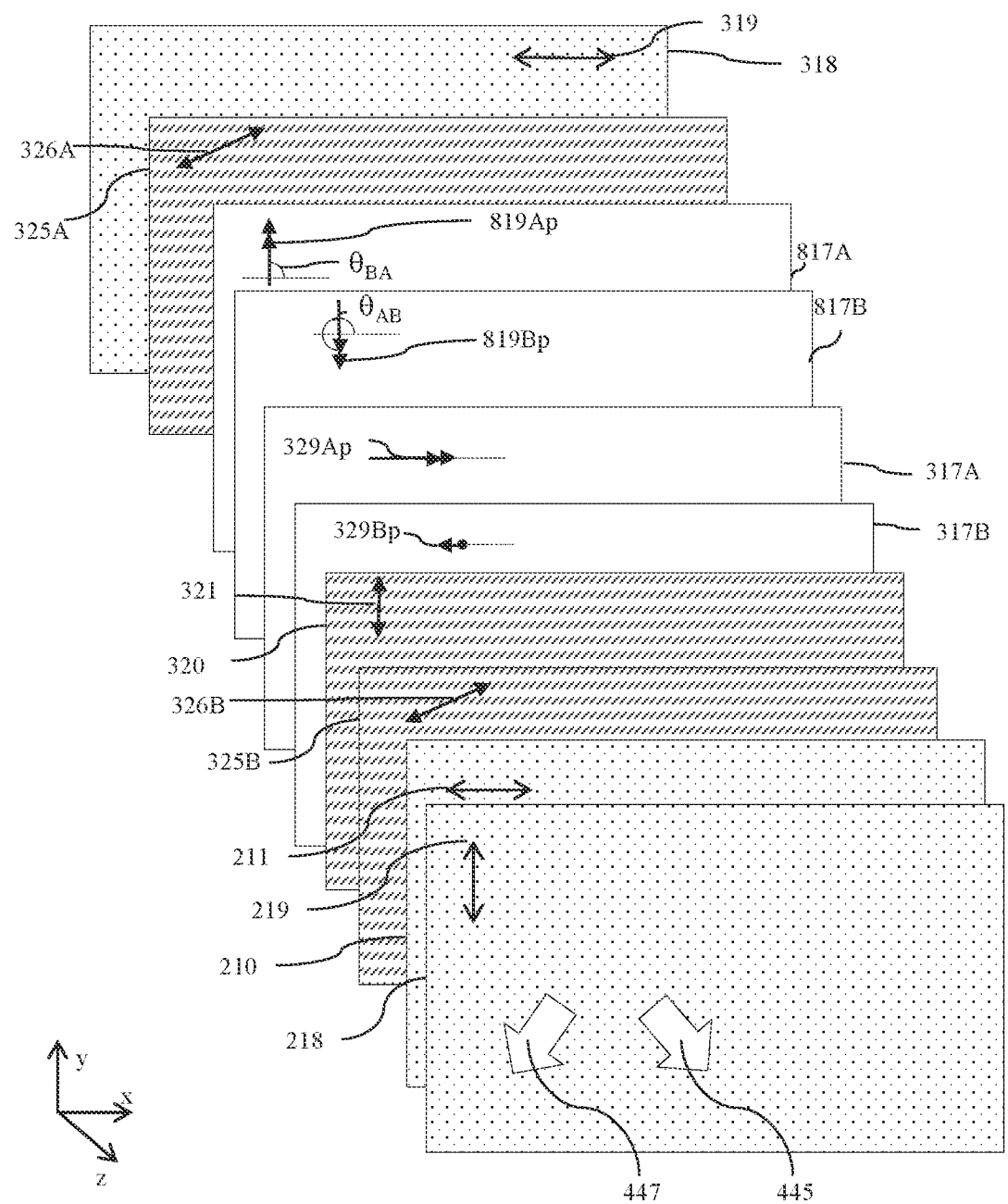
FIG. 10B is a schematic diagram illustrating a front perspective view of alignment orientations for components of the dual view display of FIG. 10A.

FIG. 10A is a schematic diagram illustrating a side perspective view of a switchable dual view display device 100 comprising a transmissive spatial light modulator 48 with an alternative arrangement of polariser electric vector transmission directions; and FIG. 10B is a schematic diagram illustrating a front perspective view of alignment orientations for components of the dual view display device 100 of FIG. 10A. Features of the embodiment of FIGS. 10A-B not discussed in further detail may be assumed to correspond to the features with equivalent reference numerals as discussed above, including any potential variations in the features.

The view angle control arrangement 900 further comprises at least one polarisation-rotation retarder 325A, 325B arranged between the display polariser 210 and the additional polariser 318 and arranged to rotate the direction of the polarisation state passing therethrough.

The polarisation-rotation retarder 325A is a half waveplate with optical axis direction 326A arranged to rotate the output polarisation component 319 at 0 degrees of the additional polariser 318 to 45 degrees. The polarisation-rotation retarder 325B is a further half waveplate with optical axis direction 326B arranged to rotate the output polarisation components from the view angle control arrangement 900 such that the minima directions 945, 947 are provided towards the desirable directions 445, 447 respectively when transmitted by the display polariser 210 with polarisation transmission direction 211 of 0 degrees, that is along the x-axis direction of FIG. 10B.

For the light source inputs 15A, 15B of FIG. 10A, the output of the backlight 20 may have partially polarised output due to Fresnel reflections at the waveguide 1A, 1B and/or turning film component 50. Higher transmission may be for an electric vector transmission direction of the output light from the backlight 20 is at 0 degrees. Advantageously efficiency is increased.

Further the polariser 210 has an electric vector transmission direction 211 that is at 0 degrees and the display output polariser 218 has an electric vector transmission direction 219 that is at 90 degrees. Advantageously users wearing sunglasses may see the display with high brightness. Further the spatial light modulator 48 may comprise a wide viewing angle spatial light modulator such as an IPS, FRS or VA mode LCD. Advantageously image contrast may be increased.

It may be desirable to reduce cross talk in the display device 100 in comparison to that illustrated in FIG. 9.

Figure 11A:
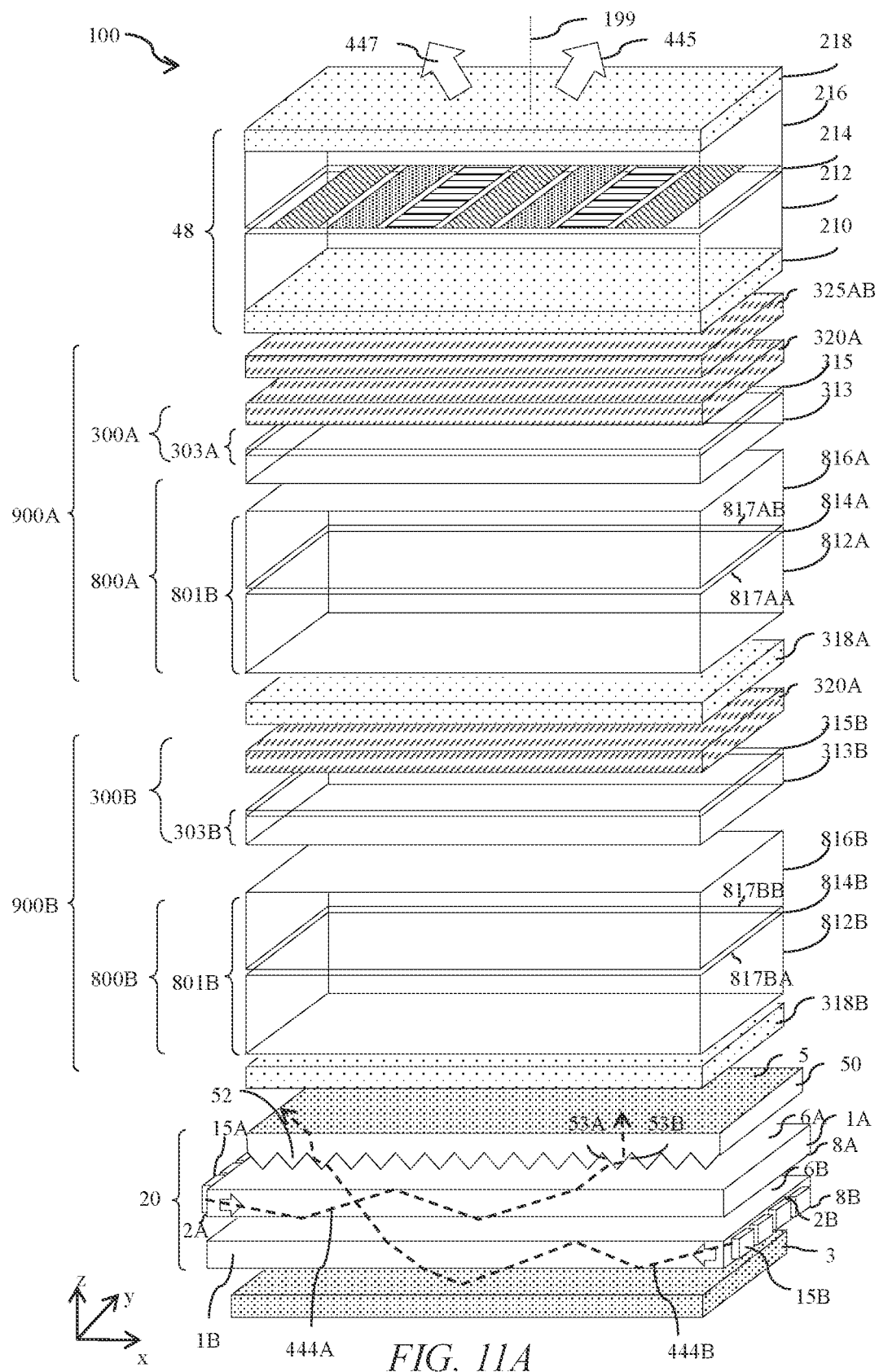
FIG. 11A is a schematic diagram illustrating a side perspective view of a switchable dual view display comprising a transmissive spatial light modulator with plural view angle control arrangements.
Figure 11B:
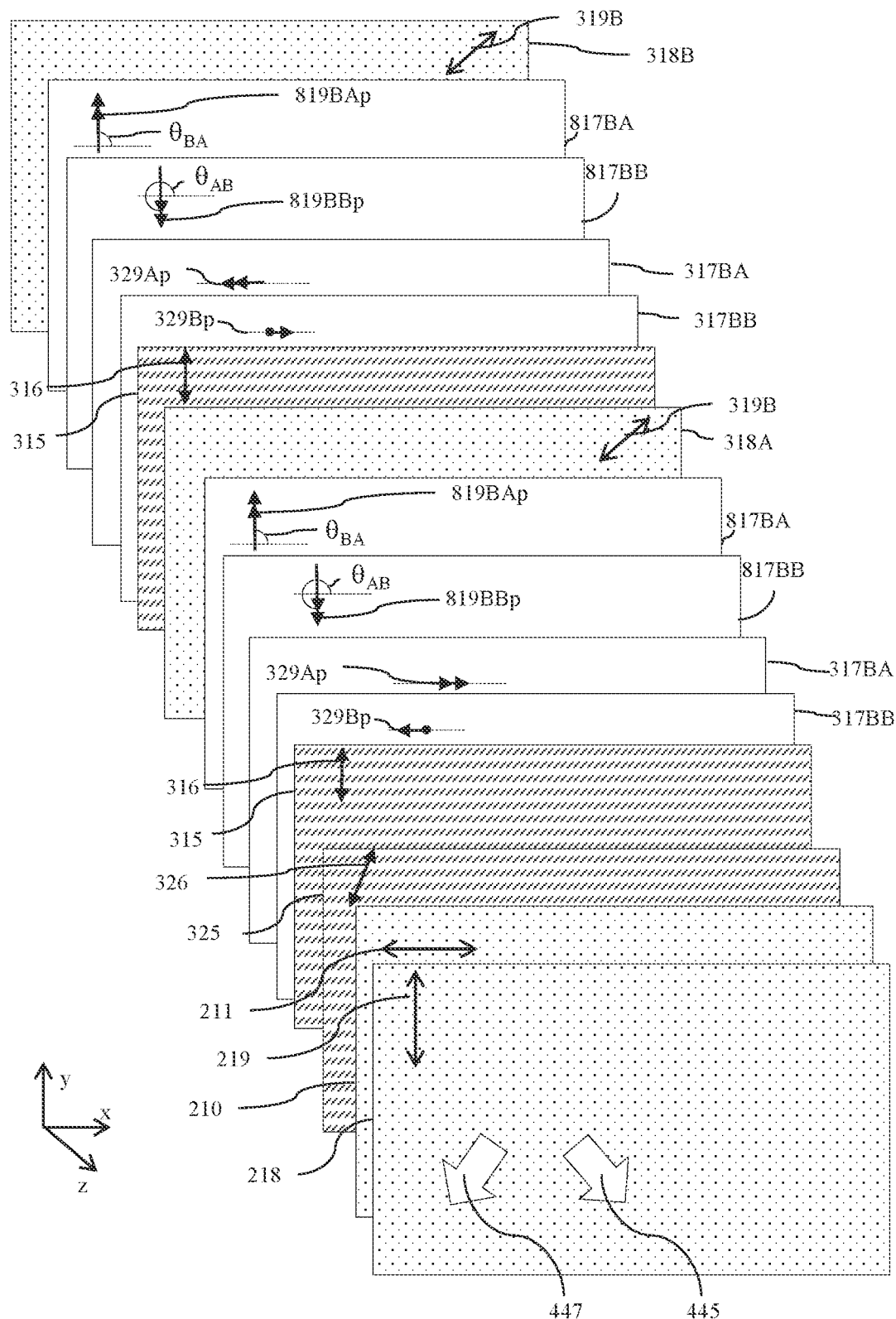
FIG. 11B is a schematic diagram illustrating a front perspective view of alignment orientations for components of the dual view display of FIG. 11A.
Figure 11C:
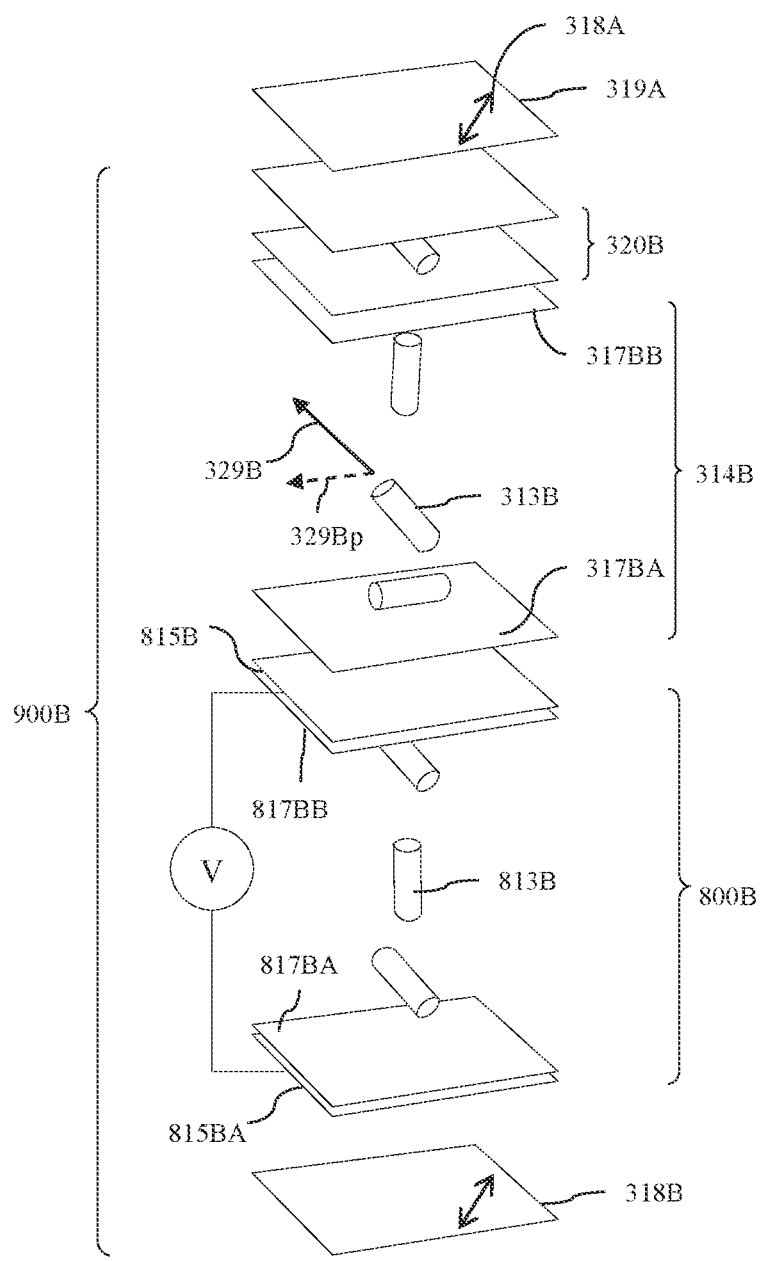
FIG. 11C is a schematic diagram illustrating a side perspective view of the further view angle control arrangement of FIGS. 11A-B.

FIG. 11A is a schematic diagram illustrating a side perspective view of a switchable dual view display device 100 comprising a transmissive spatial light modulator 48 with plural view angle control arrangements 800A, 800B; FIG. 11B is a schematic diagram illustrating a front perspective view of alignment orientations for components of the dual view display device 100 of FIG. 11A; and FIG. 11C, is a schematic diagram illustrating a side perspective view of the further view angle control arrangement 900B of FIGS. 11A-B, Features of the embodiment of FIGS. 11A-B not discussed in further detail may be assumed to correspond to the features with equivalent reference numerals as discussed above, including any potential variations in the features.

View angle control arrangement 900A is provided by view angle control arrangement 900 of FIG. 2C. The display further comprises: further additional polariser 318B arranged on the same side of the spatial light modulator 48 as the additional polariser 318A outside the additional polariser 318A, the further additional polariser 318B being a linear polariser; and at least one further polar control retarder 300B and a further polarisation-switch retarder 800B arranged between the additional polariser 318A and the further additional polariser 318B. An illustrative embodiment is provided in TABLE 2.

TABLE 2

| Item | Layer | Alignment type | Pretilt | In-plane alignment 419 direction | LC layer 314 retardance {narrow range} (wide range) | Additional retarder type | Additional passive retarder retardance {narrow range} (wide range) |
|---|---|---|---|---|---|---|---|
| 318B | | | | | | Polariser @ 45° | |
| 800B | 819BA | Homogeneous | 2° | θ 90° | +250 nm | | |
| | 819BB | Homogeneous | 2° | θ 270° | {230 nm~270 nm} (200 nm~300 nm) | | |
| 300B | 317BA | Homogeneous | 2° | θ 0° | +250 nm | | |
| | 317BB | Homeotropic | 88° | θ 180° | {230 nm~270 nm} (200 nm~300 nm) | | |
| 320B | | | | | | Positive A-plate @ 0° | +150 nm {130 nm~170 nm} (100 nm~200 nm) |
| 318B | | | | | | Polariser (@) 45° | |
| 800A | 819AA | Homogeneous | 2° | θ 270° | +250 nm | | |
| | 819AB | Homogeneous | 2° | θ 90° | {230 nm~270 nm} (200 nm~300 nm) | | |

TABLE 2-continued

| Item | Layer | Alignment type | Pretilt | In-plane alignment 419 direction | LC layer 314 retardance {narrow range} (wide range) | Additional retarder type | Additional passive retarder retardance {narrow range} (wide range) |
|---|---|---|---|---|---|---|---|
| 300A | 317AA | Homogeneous | 2° | θ 0° | +250 nm | | |
| | 317AB | Homeotropic | 88° | θ 180° | {230 nm~270 nm} (200 nm~300 nm) | | |
| 320A | | | | | | Positive A-plate @ 0° | +150 nm {130 nm~170 nm} (100 nm~200 nm) |
| 325 | | | | | | Positive A-plate @ 67.5° | +250 nm {230 nm~270 nm} (200 nm~300 nm) |
| 210 | | | | | | Polariser @ 0° | |
| 218 | | | | | | Polariser @ 90° | |

In the alternative embodiment of FIGS. 11A-C and TABLE. 2, the further view angle control arrangement 900B is provided with an alignment direction 329B of the liquid crystal material 313B that is directed towards the driver 47 rather than directed towards the passenger 45 with an alignment direction 329A of the liquid crystal material 313A for the view angle control arrangement 900A the same as direction 329 for the liquid crystal material 313 illustrated in FIG. 2C.

Such an arrangement achieves local minima that are on opposite sides of the normal to the display in comparison to the arrangement of FIG. 2C. Increased uniformity of illumination to driver 47 and passenger 45 may advantageously be achieved.

The polarisation-rotation retarder 325 is arranged to provide desirable polarisation components onto the display polariser 210 as described hereinabove.

The operation of the alternative embodiment of FIGS. 11A-C for dual view display operation will now be described.

Figure 12A:
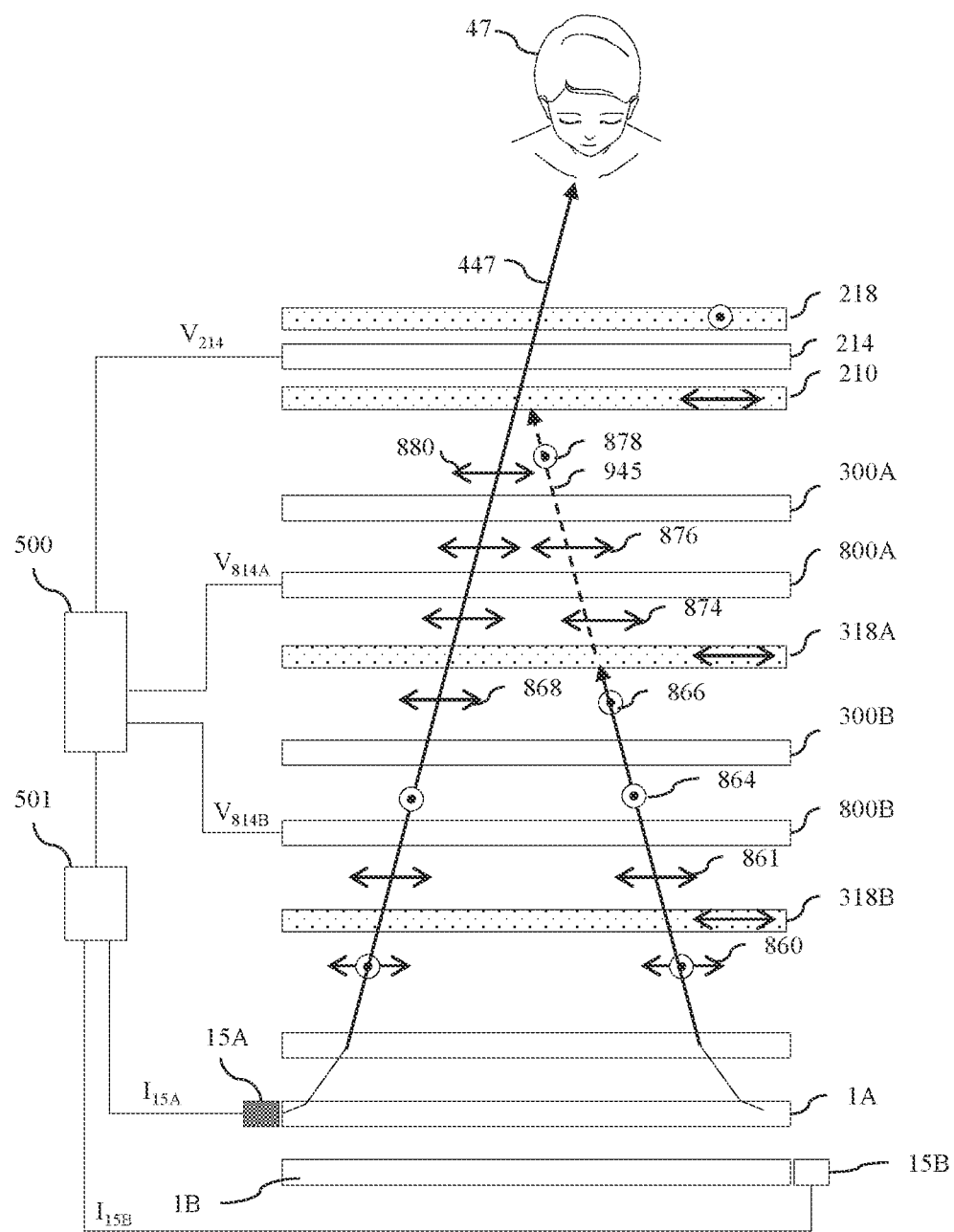
FIG. 12A is a schematic diagram illustrating a side view of operation of the display of FIG. 11A in a first temporal phase of operation.
Figure 12B:
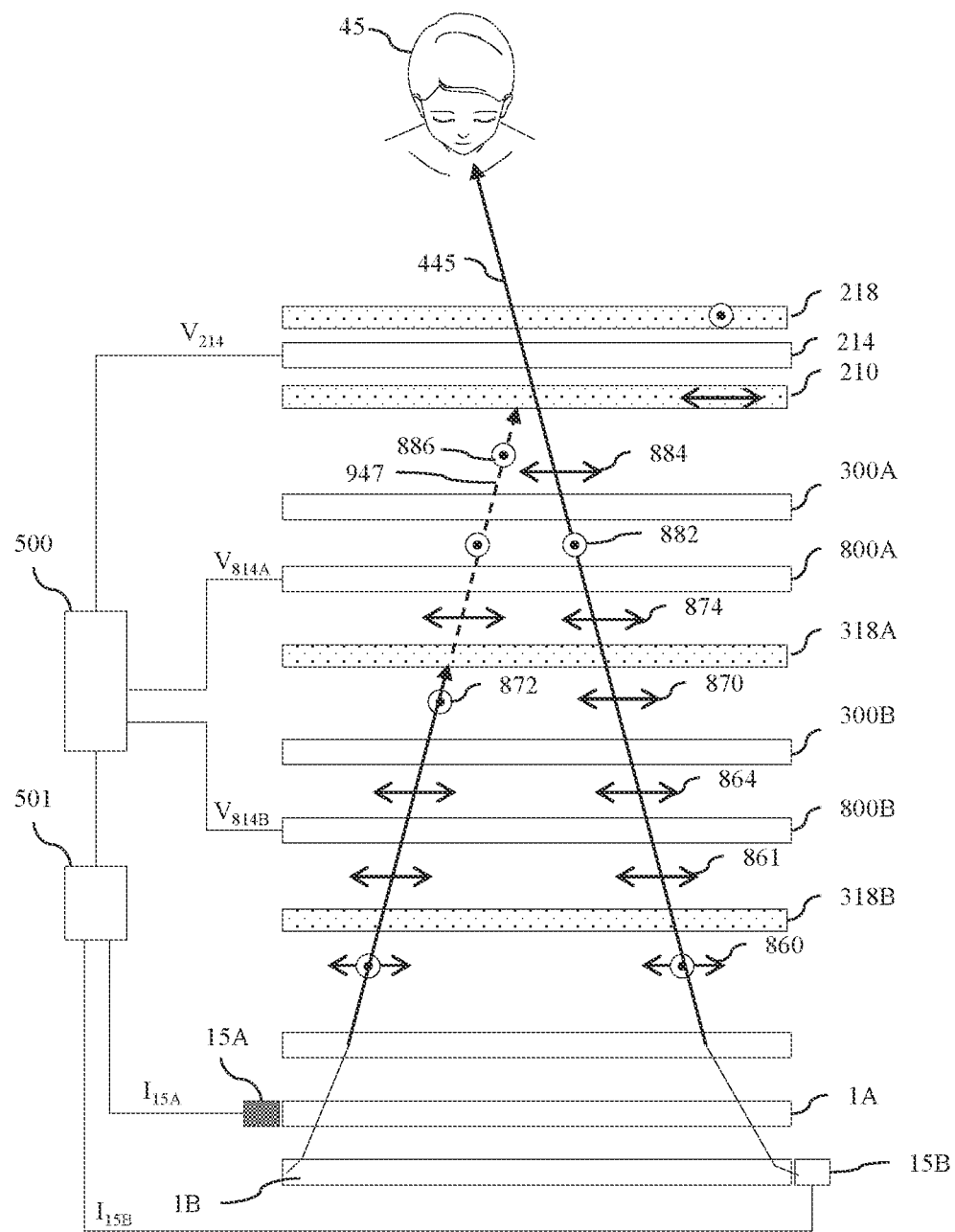
FIG. 12B is a schematic diagram illustrating a side view of operation of the display of FIG. 11A in a second temporal phase of operation.

FIG. 12A is a schematic diagram illustrating a side view of operation of the display device 100 of FIG. 11A in a first temporal phase of operation; and FIG. 12B is a schematic diagram illustrating a side view of operation of the display device 100 of FIG. 11A in a second temporal phase of operation. Features of the embodiment of FIGS. 12A-B not discussed in further detail may be assumed to correspond to the features with equivalent reference numerals as discussed above, including any potential variations in the features.

For convenience of explanation the polarisation-rotation retarder 325 is omitted.

Referring to FIG. 12A, the operation is similar to FIG. 3A. The further view angle control arrangement 9008 provides polarisation states 868, 866 at respective directions 447, 945 and the additional polariser 318A provides a first transmission profile. The view angle control arrangement 900A then provides polarisation states 880, 878 at respective directions 447, 945 and the display input polariser 210 provides a second transmission profile.

Referring to FIG. 12B, the operation is similar to FIG. 3B. The further view angle control arrangement 9008 provides polarisation states 872, 870 at respective directions 445, 947 and the additional polariser 318A provides a first transmission profile, The view angle control arrangement 900A then provides polarisation states 886, 884 at respective directions 445, 947 and the display input polariser 210 provides a second transmission profile. Note that in the alternative embodiment of FIGS. 11B-C the components 329A, 329B are reversed, the driving of the polarisation-switch retarder is also reversed to provide common directions for the minima directions 945, 947. In other alternative embodiments (not shown), the components 329A, 329B may have a common direction.

The final profile is determined by the combined optical effect of the backlight 20, further view angle control arrangement 900B, view angle control arrangement 900A and display polariser 210 as will be described further hereinbelow.

The driving of the arrangement of FIG. 11A with the alternative embodiment of FIGS. 11B-C will now be described.

Figure 13:
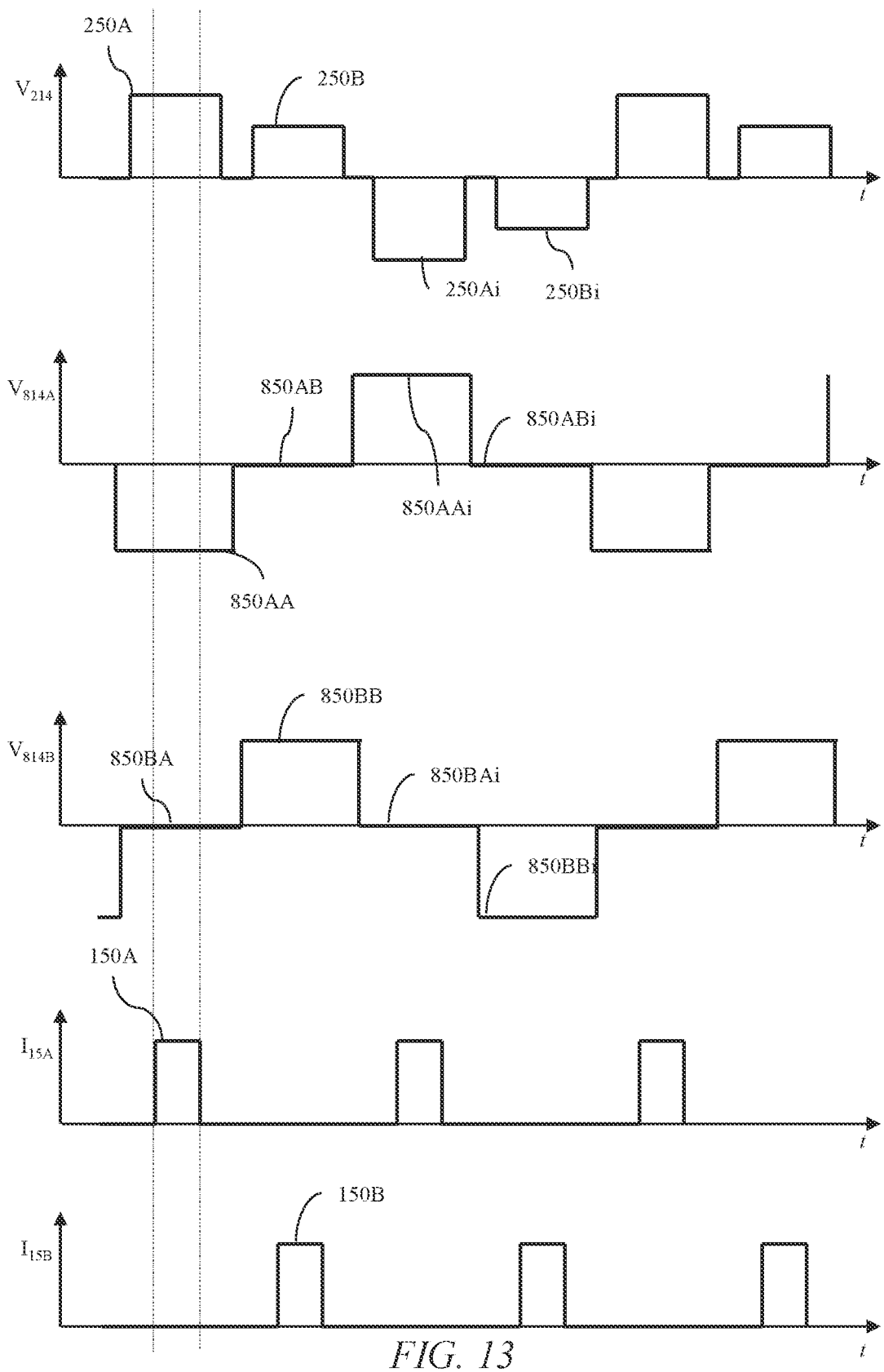
FIG. 13 is a schematic timing diagram illustrating driving of the display of FIG. 11A in dual view mode operation.

FIG. 13 is a schematic timing diagram illustrating driving of the display device 100 of FIG. 11A in dual view mode operation. Features of the embodiment of FIG. 13 not discussed in further detail may be assumed to correspond to the features with equivalent reference numerals as discussed above, including any potential variations in the features.

In comparison to the embodiment of FIG. 4A, FIG. 13 illustrates that drive voltages $V_{814A}$, $V_{814B}$ are provided for polarisation-switch retarders 814A, 814B respectively and are in anti-phase because of the opposite average components 329A, 329B.

Figure 14A:
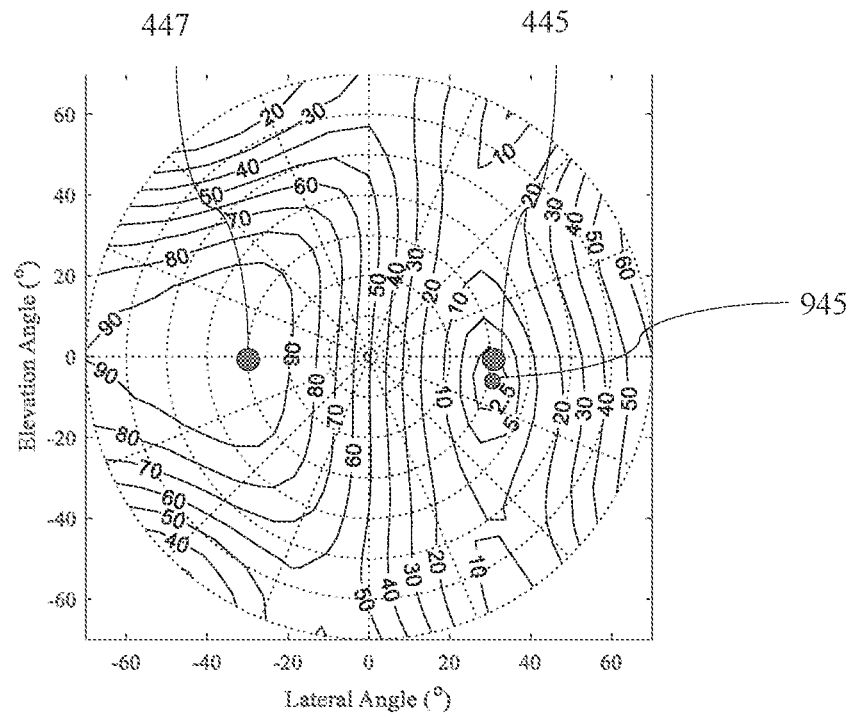
FIG. 14A is a schematic graph illustrating the angular profile of transmission for the further view angle control arrangement of FIG. 11A in the first temporal phase of operation.
Figure 14B:
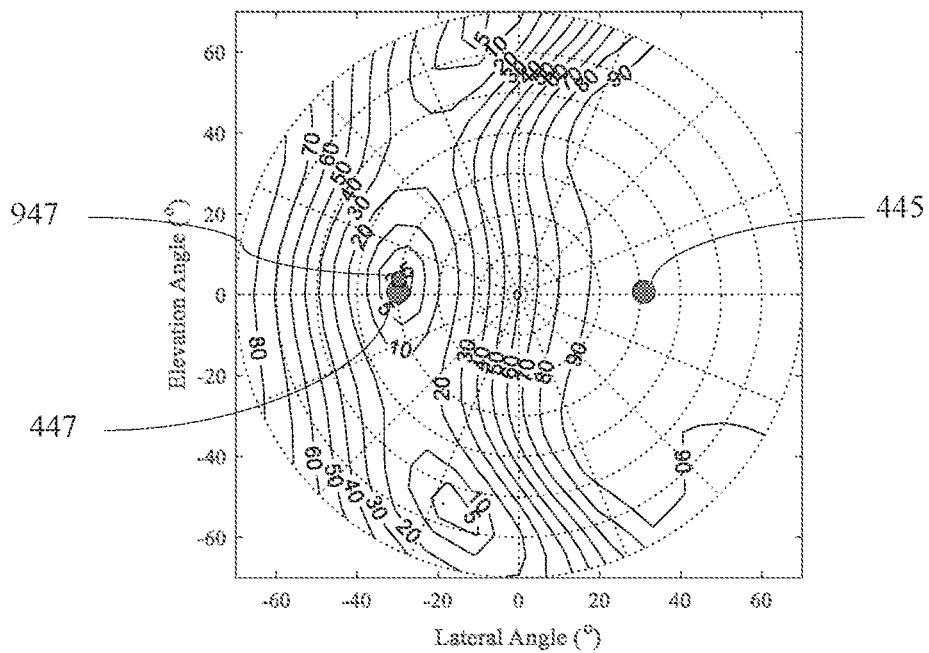
FIG. 14B is a schematic graph illustrating the angular profile of transmission for the further view angle control arrangement of FIG. 11A in the second temporal phase of operation.
Figure 15A:
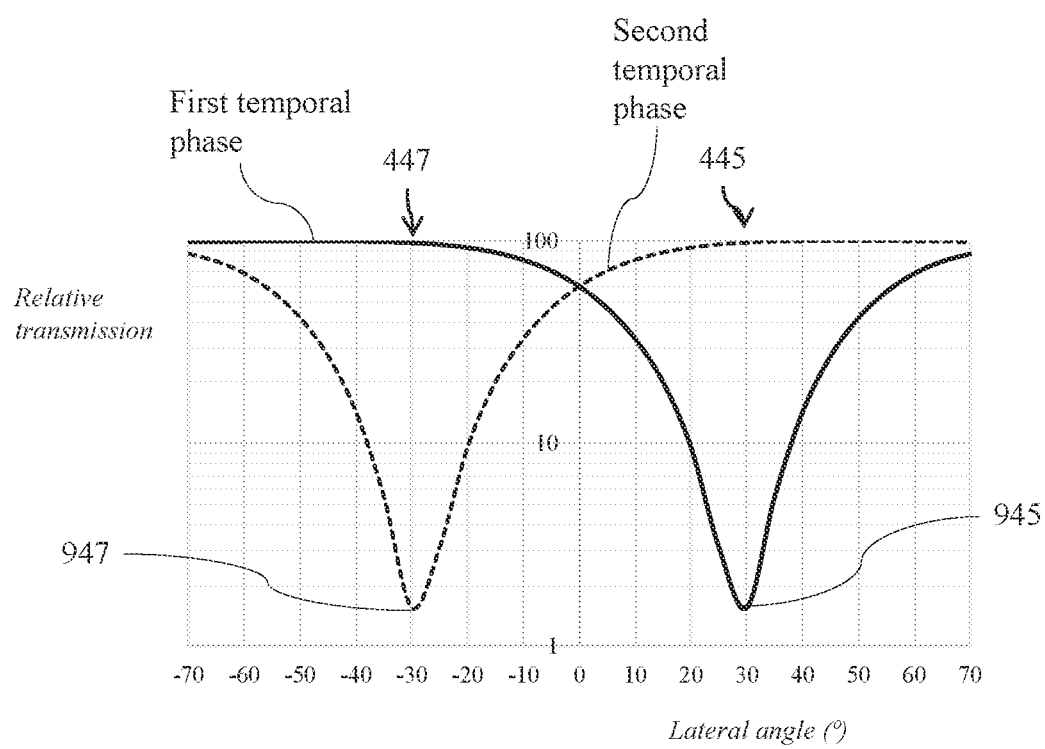
FIG. 15A is a schematic graph illustrating the lateral variation of transmission for the further view angle control arrangement of FIG. 11A in first and second temporal phases of operation.
Figure 15B:
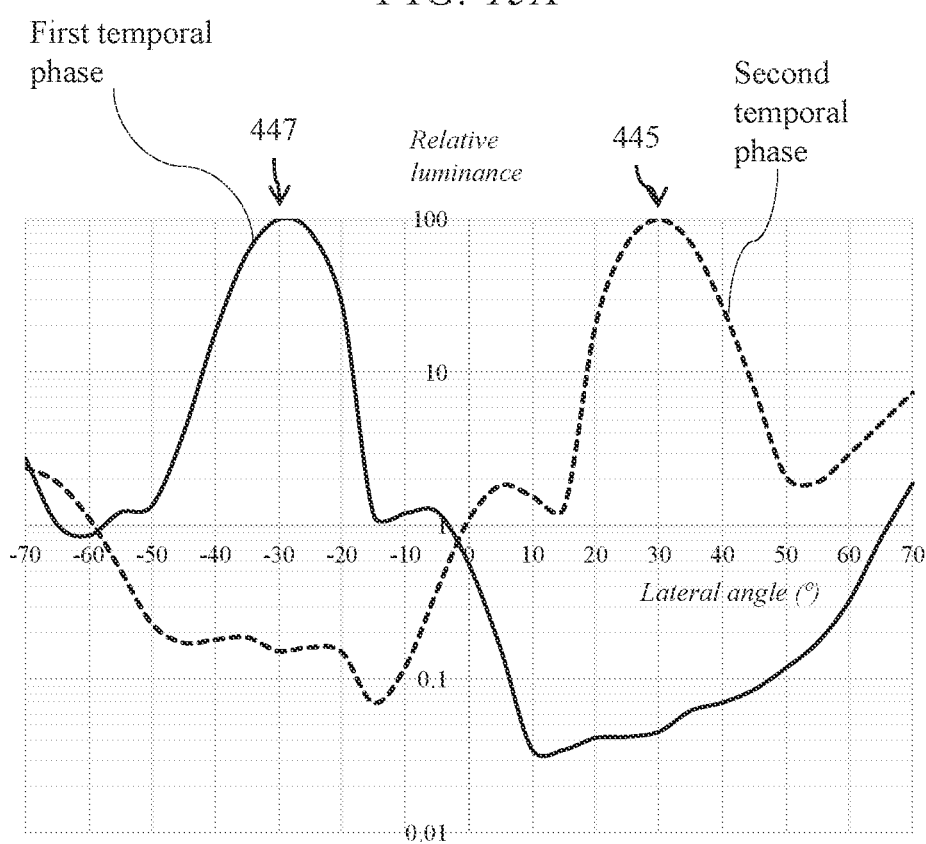
FIG. 15B is a schematic graph illustrating the lateral variation of display luminance for the plural view angle control arrangement of FIG. 11A in first and second temporal phases of operation.

FIG. 14A is a schematic graph illustrating the angular profile of transmission for the further view angle control arrangement 900B of FIG. 11A in the first temporal phase of operation; FIG. 14B is a schematic graph illustrating the angular profile of transmission for the further view angle control arrangement 900B of FIG. 11A in the second temporal phase of operation; FIG. 15A is a schematic graph illustrating the lateral variation of transmission for the further view angle control arrangement 900B of FIG. 11A in first and second temporal phases of operation; and FIG. 15B is a schematic graph illustrating the lateral variation of display luminance for the plural view angle control arrangement 900B of FIG. 11A in first and second temporal phases of operation. Features of the embodiment of FIGS. 14A-B and FIGS. 15A-B not discussed in further detail may be assumed to correspond to the features with equivalent reference numerals as discussed above, including any potential variations in the features.

Considering the transmission angular profiles of FIG. 14B, in comparison. to FIG. 7B, the angular profile for the first and second temporal phases are different because of the different direction 329 of the liquid crystal molecules in the polar control retarder 300.

Considering the luminance angular profiles of FIG. 15B, there is advantageously reduced asymmetry between the driver 47 side and the passenger 45 side, and overall cross talk is substantially reduced in comparison to the arrangement of FIG. 9. The cross talk for both the driver 47 and passenger 45 is less than 0.2%. Such a low cross talk level may advantageously achieve a high security factor between the two images and minimise driver distraction.

It may be desirable to provide further control of the luminance profile in share mode of operation.

Figure 16A:
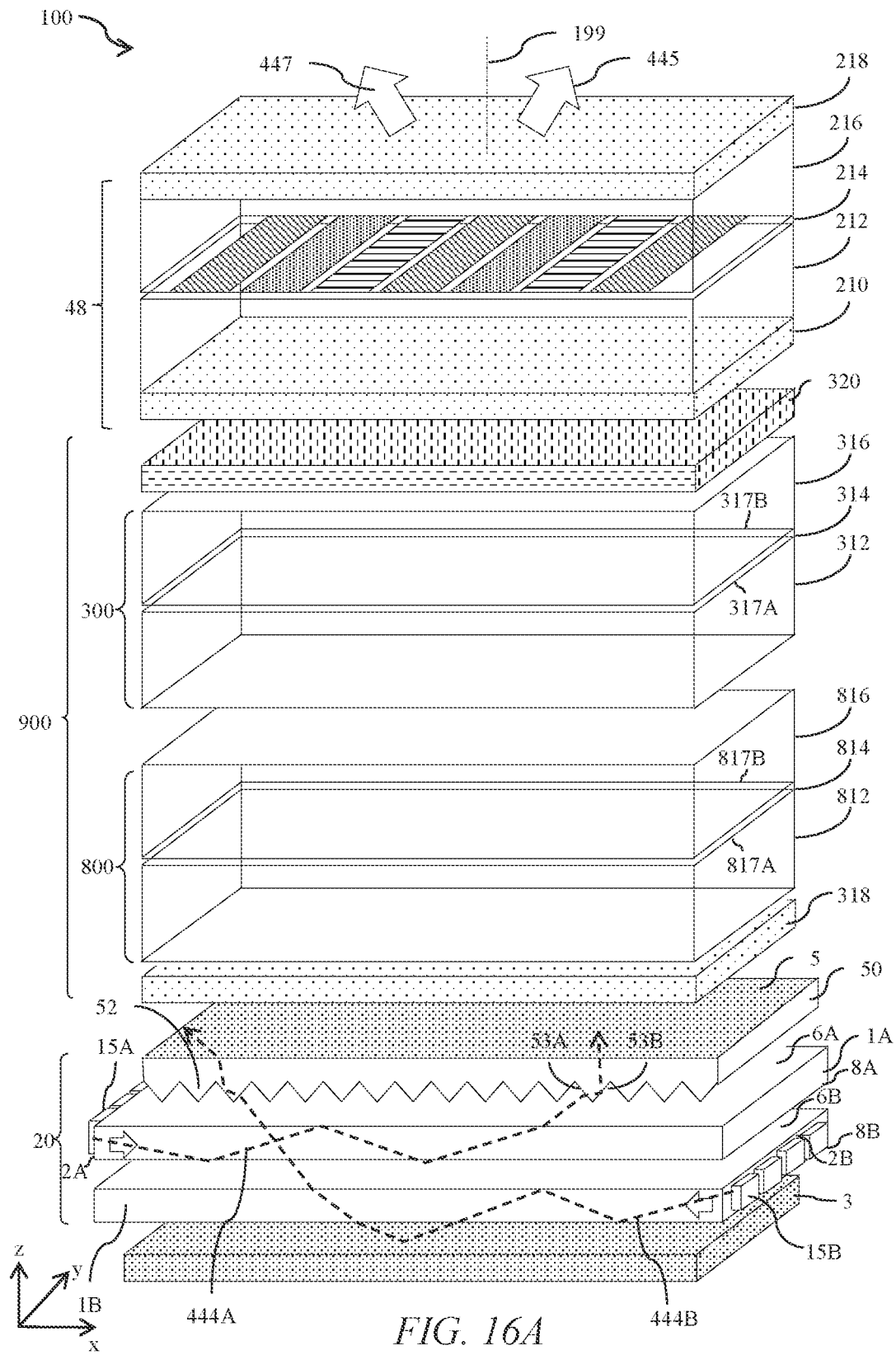
FIG. 16A is a schematic diagram illustrating a side perspective view of a switchable dual view display comprising a transmissive spatial light modulator wherein the view angle control arrangement comprises an active polar control retarder.
Figure 16B:
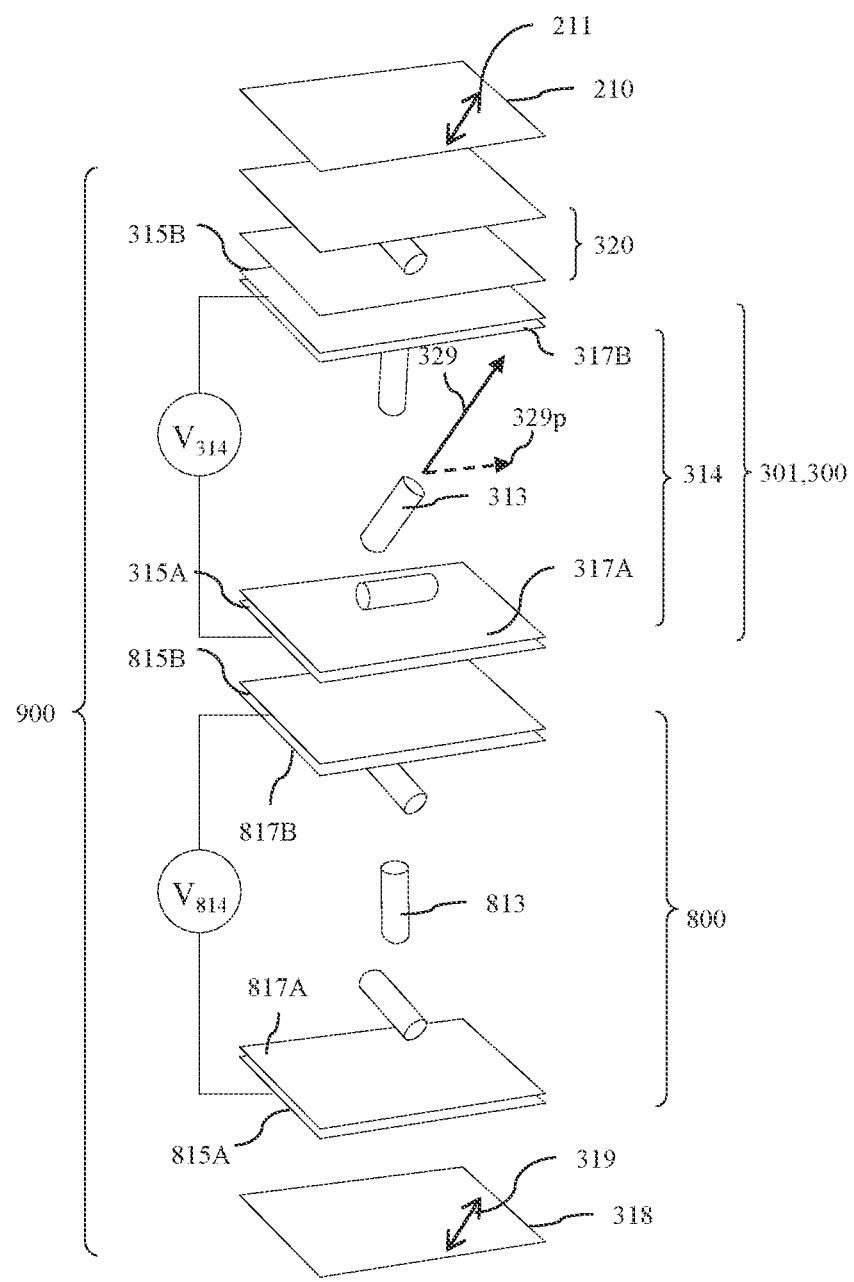
FIG. 16B is a schematic diagram illustrating a side perspective view of alignment orientations for components of the dual view display of FIG. 16A.

FIG. 16A is a schematic diagram illustrating a side perspective view of a switchable dual view display device 100 comprising a transmissive spatial light modulator 48 wherein the view angle control arrangement 900 comprises an active polar control retarder 300; and FIG. 16B is a schematic diagram illustrating a side perspective view of alignment orientations for components of the dual view display of FIG. 16A. Features of the embodiment of FIGS. 16A-B not discussed in further detail may be assumed to correspond to the features with equivalent reference numerals as discussed above, including any potential variations in the features.

Further the at least one polar control retarder 300 comprises a switchable liquid crystal retarder 301 comprising a layer 314 of liquid crystal material 313, and the display device 100 further comprises: two surface alignment layers 317A, 317B disposed adjacent to the layer 314 of liquid crystal material 313 of the switchable liquid crystal retarder 301 and on opposite sides thereof. Further an electrode arrangement 315A, 315B arranged on transparent substrates 312, 316 respectively is arranged to apply voltages to the layer 314 of liquid crystal material 313 of the switchable liquid crystal retarder 301.

In the embodiment of FIG. 16B, one of the surface alignment layers 317A, 317B disposed adjacent to the layer 314 of liquid crystal material 313 of the switchable liquid crystal retarder 301 is arranged to provide homogenous alignment in the adjacent liquid crystal material, and the other of the surface alignment layers 317A, 317B disposed adjacent to the layer 314 of liquid crystal material 313 of the switchable liquid crystal retarder 301 is arranged to provide homeotropic alignment in the adjacent liquid crystal material.

Advantageously the switchable liquid crystal layer 314 of FIG. 16B may more conveniently be provided with desirable retardance and alignment properties in comparison to the passive layer of FIGS. 2A-C, Further, the liquid crystal layer 314 may be switched between a first state for dual view mode operation and a second state for share mode operation.

Figure 17A:
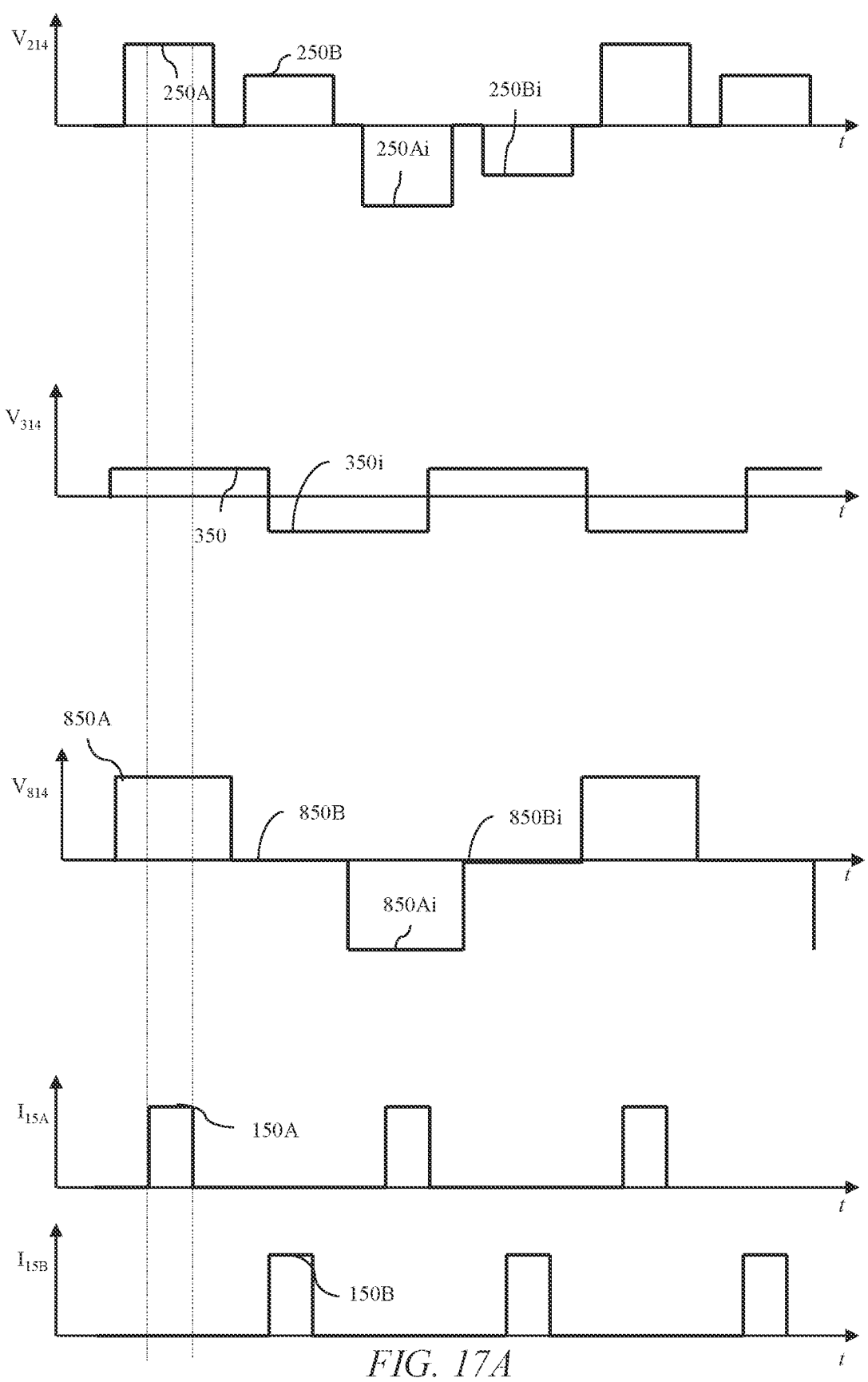
FIG. 17A is a schematic timing diagram illustrating driving of the display of FIG. 16B in dual view mode operation.
Figure 17B:
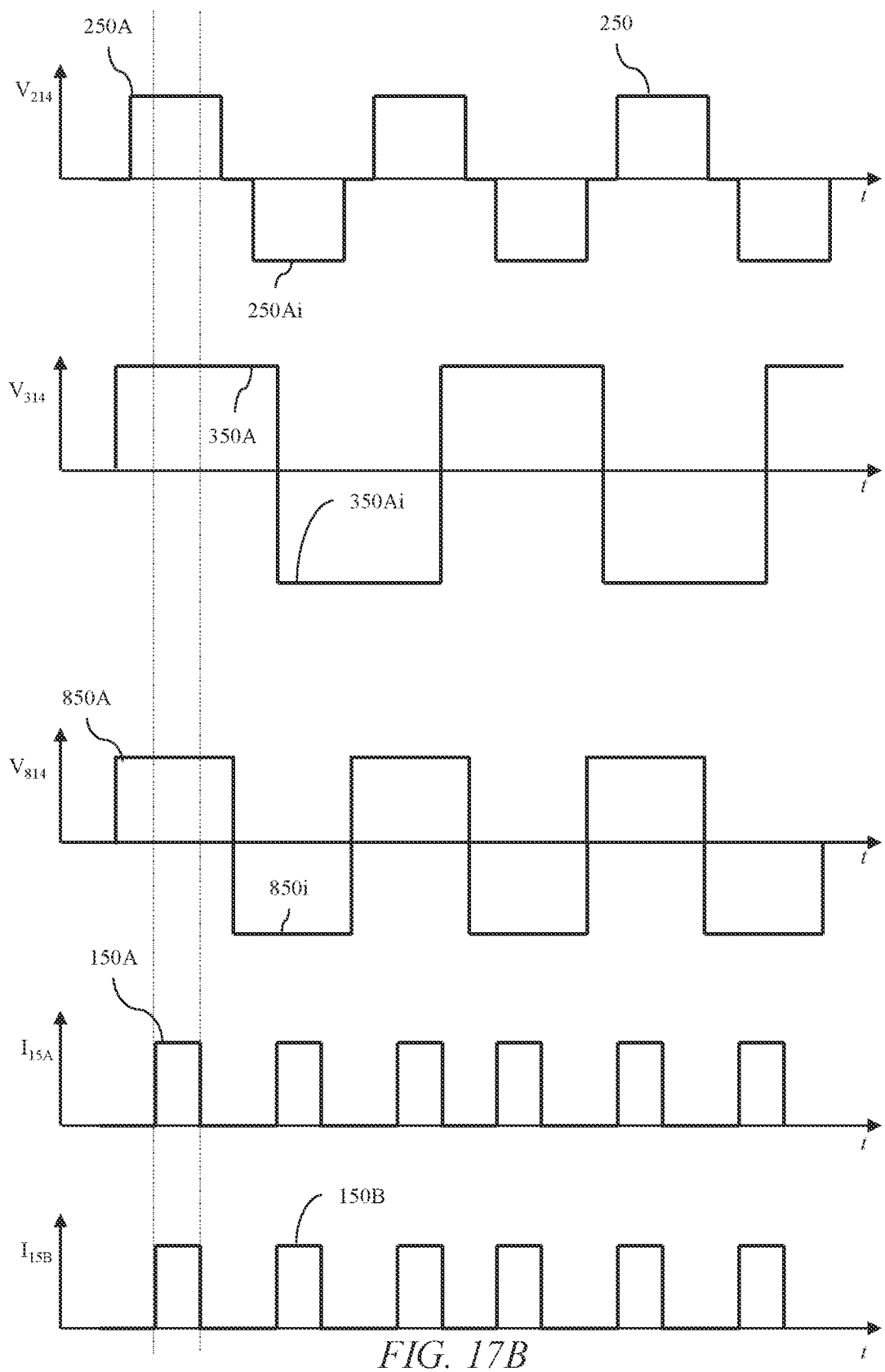
FIG. 17B is a schematic timing diagram illustrating driving of the display of FIG. 16B in share mode operation.

FIG. 17A is a schematic timing diagram illustrating driving of the display of FIG. 16B in dual view mode operation; and FIG. 17B is a schematic timing diagram illustrating driving of the display of FIG. 16B in share mode operation. Features of the embodiments of FIGS. 17A-B not discussed in further detail may be assumed to correspond to the features with equivalent reference numerals as discussed above, including any potential variations in the features.

In comparison to FIG. 4A, in the alternative embodiment of FIG. 17A a first voltage waveform 350 is used to set the liquid crystal polar control retarder 300 to a first retarder orientation suitable for dual view operation as described elsewhere herein. The waveform 350i is the inverse or negative of 350, and that the frequency of inversion need not be the same as or synchronized with the frequency of waveform 850.

FIG. 17B illustrates an alternative timing diagram to share mode operation. In comparison to FIG. 4B, the LED illumination signals may be pulsed, for example to improve impulse response of the display.

In another illustrated alternative embodiment of FIG. 17B, the voltage waveform 850A provided for the polarisation-switch retarder 800A is arranged to provide a single polarisation state to the polar control retarder, that is aligned to the display polariser 210 electric vector transmission direction 211.

Further, the polar control retarder 300 liquid crystal layer 314 is provided with voltage V314 with waveform 350 that has a different voltage to that of FIG. 17A, so as to provide high transmission from a wide range of viewing angles. The uniformity of luminance in wide angle mode of operation is increased. In share mode of operation, advantageously image data is visible from a wider range of viewing angles in comparison to dual view embodiment of FIG. 17A. Illumination current 115A of light sources 15A with waveform 150A may occupy the same time slot or be simultaneous with waveform 150B and may be wider or even continuous wave rather than pulsed in this mode.

Figure 18A:
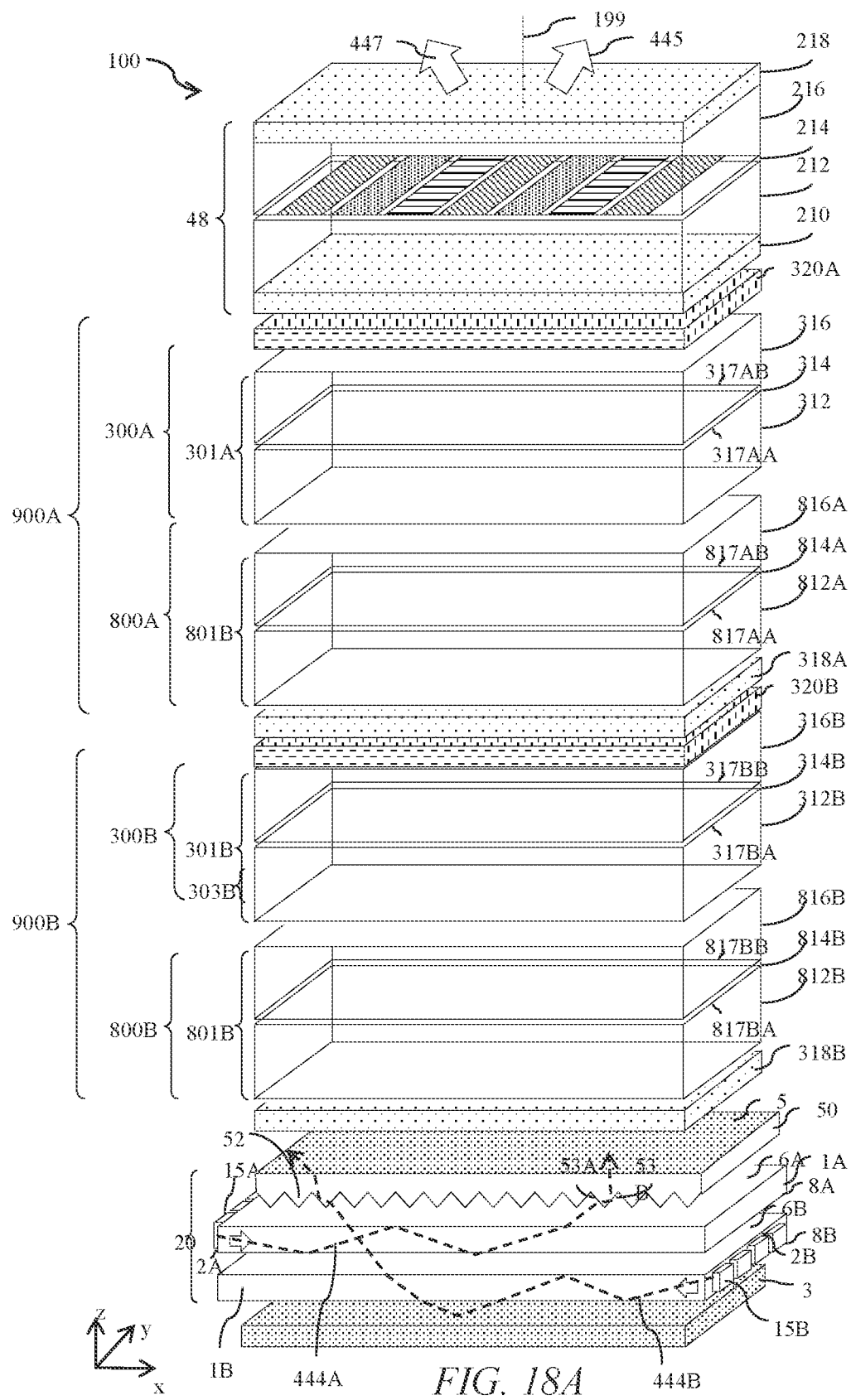
FIG. 18A is a schematic diagram illustrating a side perspective view of a switchable dual view display comprising a transmissive spatial light modulator comprising plural view angle control arrangements wherein the view angle control arrangements each comprise an active polar control retarder.

FIG. 18A is a schematic diagram illustrating a side perspective view of a switchable dual view display device 100 comprising a transmissive spatial light modulator 48 comprising plural view angle control arrangements 900A, 900B wherein the view angle control arrangements 900A, 900B each comprise an active polar control retarder 301A, 301B. Features of the embodiment of FIG. 18A not discussed in further detail may be assumed to correspond to the features with equivalent reference numerals as discussed above, including any potential variations in the features.

In comparison to the arrangement of FIG. 11A, the switchable liquid crystal layers 314A, 314B may be more conveniently provided. Further, share mode transmission uniformity may advantageously be increased.

A viewer location control apparatus will now be described.

Figure 18B:
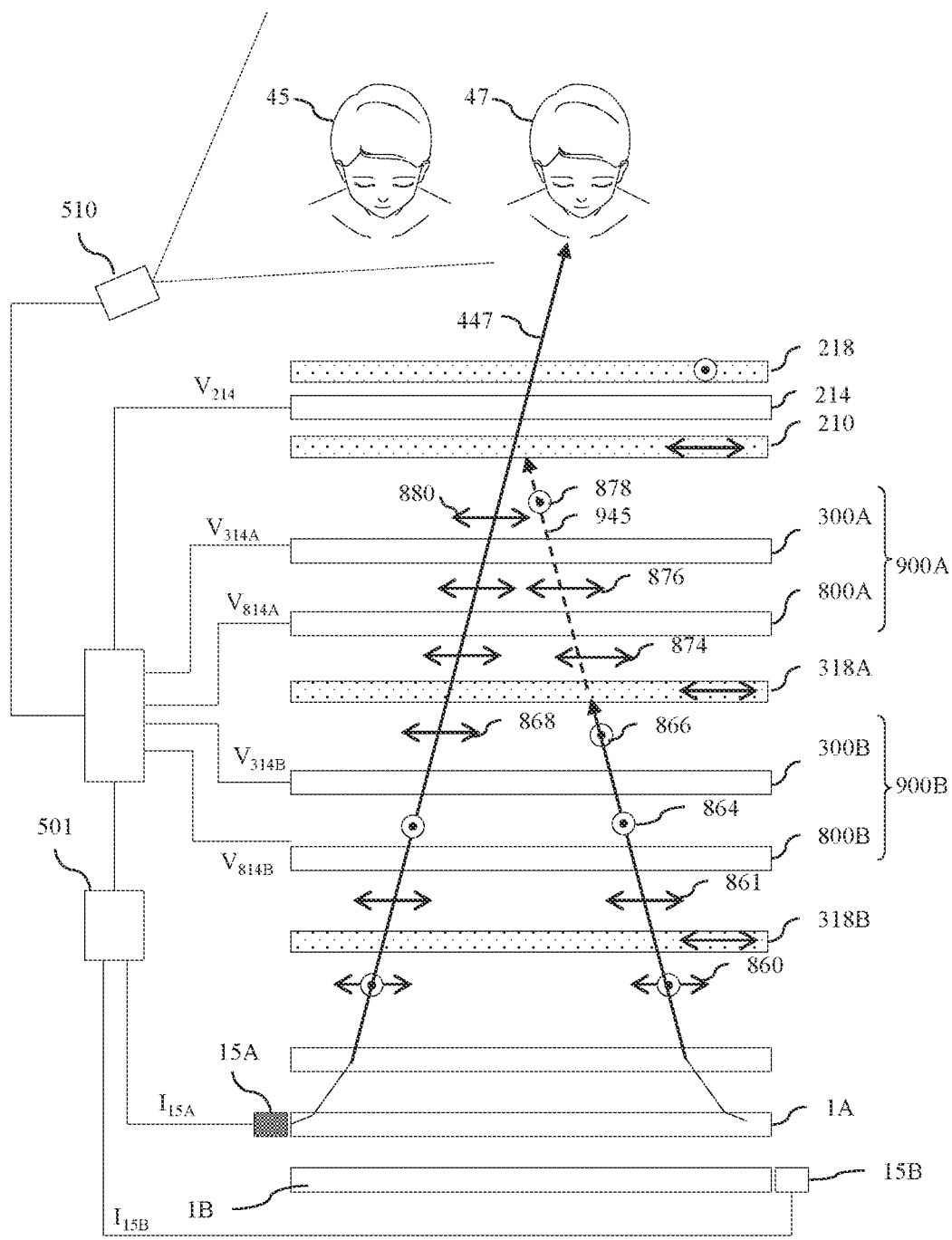
FIG. 18B is a schematic diagram illustrating a top view of operation of the display of FIG. 16B in a first temporal phase of operation, further comprising an observer tracking system.

FIG. 18B is a schematic diagram illustrating a top view of operation of the display of FIG. 18A in a first temporal phase of operation, further comprising an observer tracking system 510. Features of the embodiment of FIG. 18B not discussed in further detail may be assumed to correspond to the features with equivalent reference numerals as discussed above, including any potential variations in the features.

In the alternative embodiment of FIG. 18B, the observer tracking system 510 may be arranged to determine the location of at least one of the driver 47 and passenger 45. The voltages $V_{314A}$, $V_{314B}$ may be adjusted to provide control of the direction of the minima 447, 445, determined by the respective average orientations 329A, 329B of the optical axis of the liquid crystal material 313A, 313B in the liquid crystal polar control retarder 301A, 301B.

The cross talk seen by at least one of the passenger 45 and driver 47 may advantageously be reduced as the directions 445, 447 may be controlled to be closer to the respective users 45, 47.

In other embodiments (not shown) the observer tracking system 510 may he provided in display devices 100 that do not comprise the further additional polariser 319B and further view angle control arrangement 900B. Advantageously cost, complexity and cross talk is reduced for variable locations of observers 45, 47 or for moving observers 45, 47.

Alternative arrangements of polar control retarder 300 will now be described.

Figure 19:
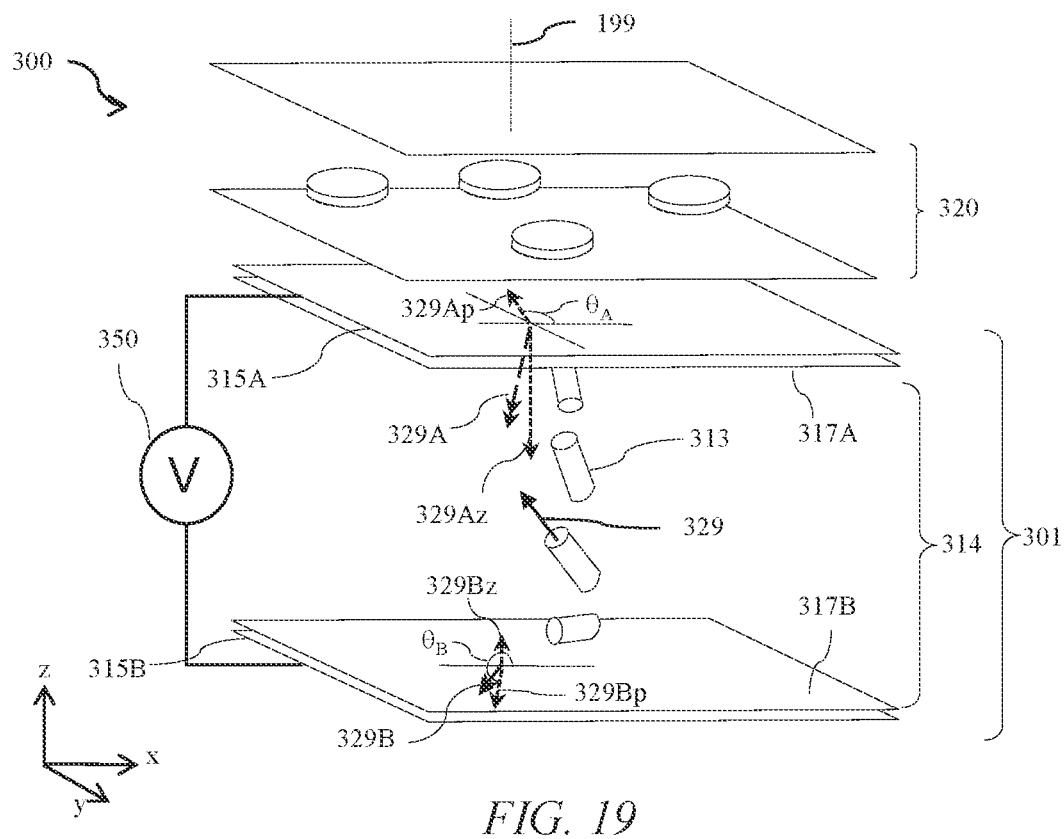
FIG. 19 is a schematic diagram illustrating a side perspective view of a polar control retarder comprising a homeotropic alignment layer and a homogeneous alignment layer.

FIG. 19 is a schematic diagram illustrating a side perspective view of an illustrative polar control retarder 300 of FIG. 18A comprising a homeotropic alignment layer and a homogeneous alignment layer and further comprising a negative C-plate correction retarder 320. Features of the embodiment of FIG. 19 not discussed in further detail may be assumed to correspond to the features with equivalent reference numerals as discussed above, including any potential variations in the features.

In comparison to the arrangement of FIG. 2C, electrodes 315A, 315B are arranged to apply a controllable voltage across the layer 314 of liquid crystal material 313 of the switchable liquid crystal retarder 301.

At least one of the surface alignment layers 317A, 317B disposed adjacent to the layer 314 of liquid crystal material 313 of the layer 314 of the switchable liquid crystal retarder 301 has a pretilt having a pretilt direction with a component 419Bp in the plane of the layer 314 of liquid crystal material 313 that is at an acute non-zero angle to the electric vector transmission directions 211, 319 of at least one of the display polariser 210 and the additional polariser 318 in at least part of the display device 100.

Such an embodiment achieves an optical alignment direction 329 that is offset to the display normal 199. Advantageously the direction of the minimum transmission may be directed in an off-axis direction, for example towards a driver 47 and a passenger 45 of FIGS. 1A-C. In the embodiment of FIG. 2A for example, the angles $\theta_A$, $\theta_B$ may be 0 and 180 degrees as described elsewhere herein, for example in TABLE 1. Angles offset from these angles may achieve direction of minimum of transmission that is offset in different polar directions and with different polar size of minima.

In operation, the polar control retarder may be provided with a first voltage for dual view mode and a second voltage for share mode of operation.

In the alternative embodiment further C-plate correction retarder 320 may be provided. Said retarder 320 may compensate for the out-of-plane retardance of the layer 314 when driven into a wide angle mode for share mode operation. Increased uniformity with polar angle of transmission in share mode is advantageously achieved.

Figure 20:
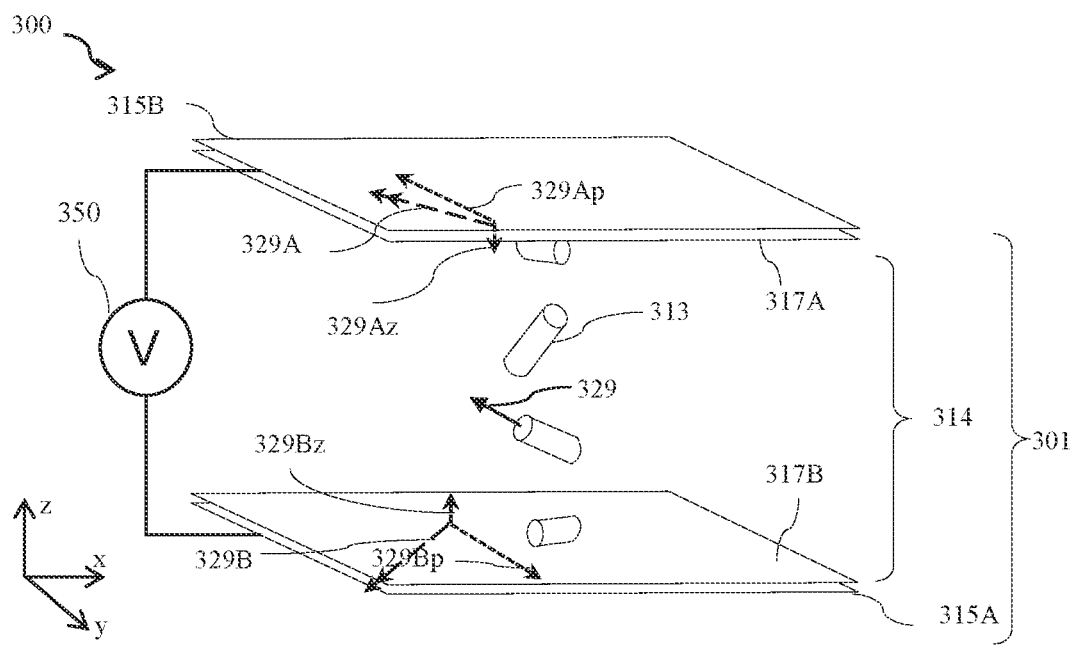
FIG. 20 is a schematic diagram illustrating a side perspective view of a polar control retarder comprising a twisted liquid crystal layer arranged between two homogeneous alignment layers.

FIG. 20 is a schematic diagram illustrating a side perspective view of a polar control retarder 300 comprising a twisted liquid crystal layer arranged between two homogeneous alignment layers. Features of the embodiment of FIG. 20 not discussed in further detail may be assumed to correspond to the features with equivalent reference numerals as discussed above, including any potential variations in the features.

In comparison to the arrangement of FIG. 19, the layer 314 of liquid crystal material 313 of the switchable liquid crystal retarder 301 has a twist and both alignment layers 317A, 317B have a homogeneous alignment. The C-plate of FIG. 19 may be omitted and cost, thickness and complexity reduced.

An illustrative embodiment of an alternative polar control retarder 300 is illustrated in TABLE 3.

The twist may be in a range from 60° to 120°, and preferably in a range from 70° to 90°. The switchable liquid crystal retarder may have a retardance for light of a wavelength of 550 nm in a range from 300 nm to 1500 nm, preferably in a range from 400 nm to 1200 nm.

The twisted nematic liquid crystal layer 314 provides an off-axis pointing direction 329 as described elsewhere herein. Off-axis minima may advantageously be achieved for reduction of image cross talk and improvement of image privacy.

Figure 21:
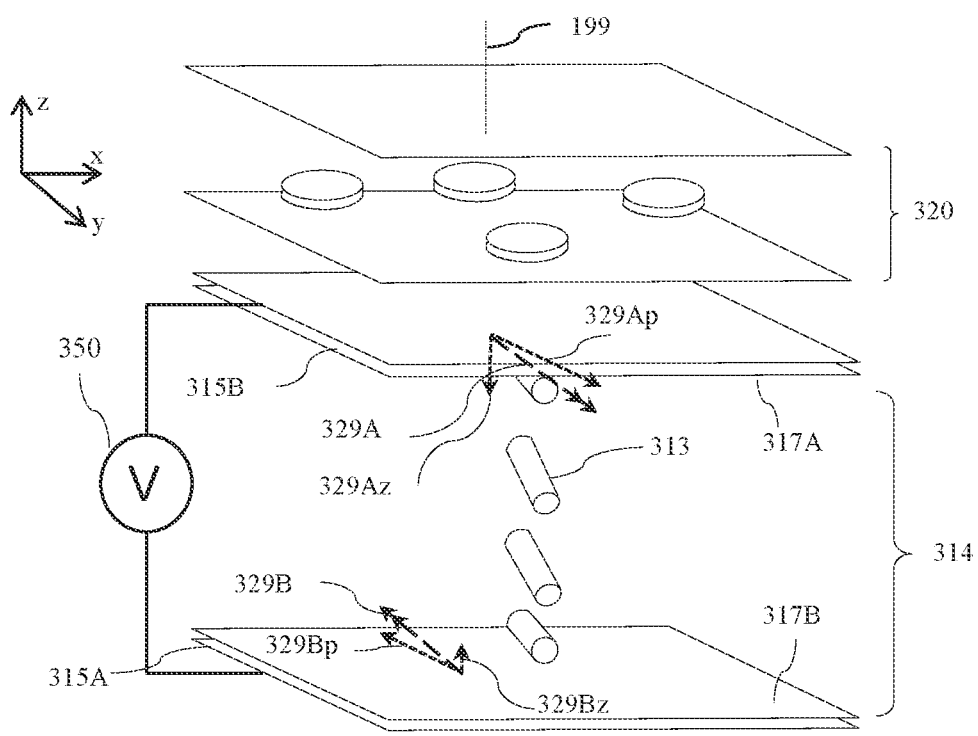
FIG. 21 is a schematic diagram illustrating a front perspective view of a polar control retarder comprising a non-twisted liquid crystal layer arranged between two homogeneous alignment layers.

FIG. 21 is a schematic diagram illustrating a front perspective view of a polar control retarder 300 comprising a non-twisted liquid crystal layer arranged between two homogeneous alignment layers. Features of the embodiment of FIG. 21 not discussed in further detail may be assumed to correspond to the features with equivalent reference numerals as discussed above, including any potential variations in the features.

In comparison to the embodiment of FIG. 19, both alignment layers 317A, 317B may provide homogeneous alignment. The retardance of the liquid crystal layer 314 may be reduced. Susceptibility to applied mechanical pressure may advantageously be reduced.

Figure 22:
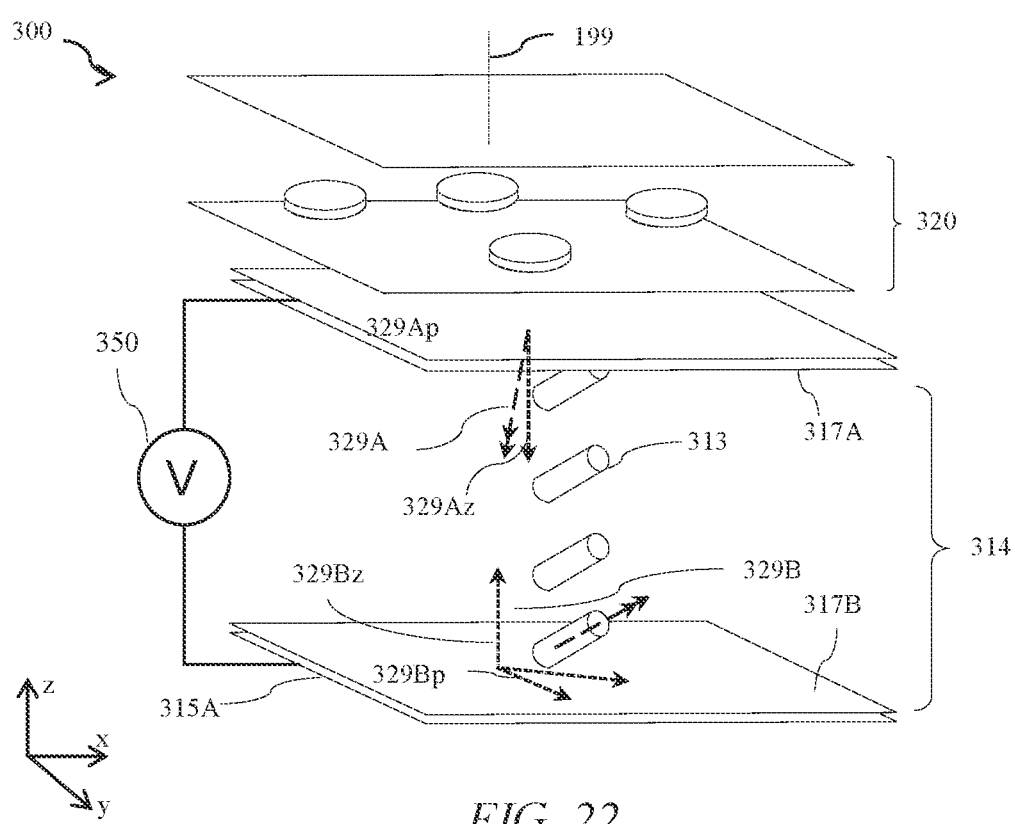
FIG. 22 is a schematic diagram illustrating a front perspective view of a polar control retarder comprising a non-twisted liquid crystal layer arranged between two homeotropic alignment layers.

FIG. 22 is a schematic diagram illustrating a front perspective view of a polar control retarder 300 comprising a non-twisted liquid crystal layer arranged between two homeotropic alignment layers. Features of the embodiment of FIG. 22 not discussed in further detail may be assumed to correspond to the features with equivalent reference numerals as discussed above, including any potential variations in the features.

In comparison to the embodiment of FIG. 19, both alignment layers 317A, 317B may provide homeotropic alignment. The voltage applied for share mode operation may be reduced, advantageously achieving reduced power consumption in share mode of operation.

A dual view passenger infotainment display device 100 will now be described.

Figure 23:
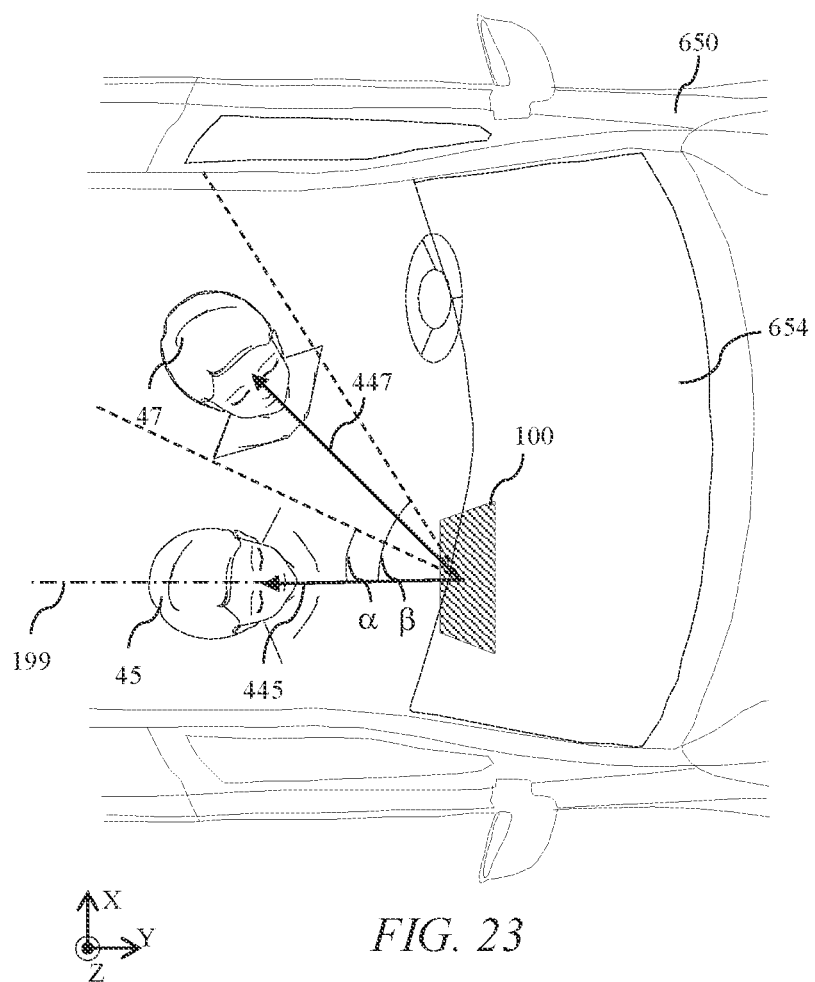
FIG. 23 is a schematic diagram illustrating a top view of a passenger infotainment display for use by a driver and a passenger in an automotive vehicle.

FIG. 23 is a schematic diagram illustrating a top view of a passenger infotainment display device 100 for use by a driver 47 and a passenger 45 in an automotive vehicle 650. Features of the embodiment of FIG. 23 not discussed in further detail may be assumed to correspond to the features with equivalent reference numerals as discussed above, including any potential variations in the features.

Display device 100 is arranged in a passenger information display (ND) location (on the right hand side of the vehicle for Left Hand Drive), with light rays 445, 447 output to the user 45 and user 47 respectively, In a first mode of operation that is the privacy mode the display device 100 is arranged for viewing by the front passenger 45 near to an on-axis 199 location, and to inhibit

TABLE 3

| | In-plane rotation angle | In-plane rotation angle | | Active LC retarder 301 | | | |
|---|---|---|---|---|---|---|---|
| Item | | | Twist | Alignment layers | Pretilt | Δn.d | $V_C$ |
| 318 | 319, $\phi_A$ | 45° | | | | | |
| 300 | 329Ap, $\theta_A$ | 45° | 90° | Homogeneous | 2° | 500 nm | 1.55 V |
| | 329Bp, $\theta_B$ | 135° | | Homogeneous | 2° | | |
| 800 | | | | See TABLE 1 | | | |
| 210 | 211, $\phi_B$ | 45° | | | | | | viewing by the driver 47. The inhibited viewing may be provided by a uniform image or by an image comprising image information suitable for the driver 47 during operation of the vehicle.

It is desirable that the passenger 45 may view information such as entertainment without the image causing distraction to the driver 47, that is the privacy mode refers to a low driver distraction mode. This mode is in comparison with a mode in which the passenger display turns off when the vehicle is in motion to prevent driver distraction. More specifically to minimise the visibility to the driver 47 of distracting images at both the nominal driver position and when the driver leans across towards the display while driving, it is desirable to maximise the security factor S at angles α from the optical axis 199 of greater than 30° and preferably greater than 25° in the direction from the optical axis 199 towards the driver 47. Further it is desirable to achieve a high security factor, S for polar angles at least at angles β from the optical axis 199.

Further in a low stray light function of the privacy mode, it may be desirable to provide an image to the passenger 45 with desirable luminance while reducing the luminance to reflecting and scattering surfaces within the vehicle. Advantageously the brightness of internal surfaces of the vehicle 650 may be reduced during night-time operation, reducing driver distraction. Further, increased area displays may be provided while maintaining desirably low levels of stray illumination within the vehicle 650 cabin.

In a second mode that is the share mode, the display device 100 is arranged for viewing by driver 47 in an off-axis location. Such use may be for occasions when viewing the display content is safe such as when the vehicle is stationary, or the content is appropriate such as map or instrument data.

An illustrative embodiment will now be described.

Figure 24A:
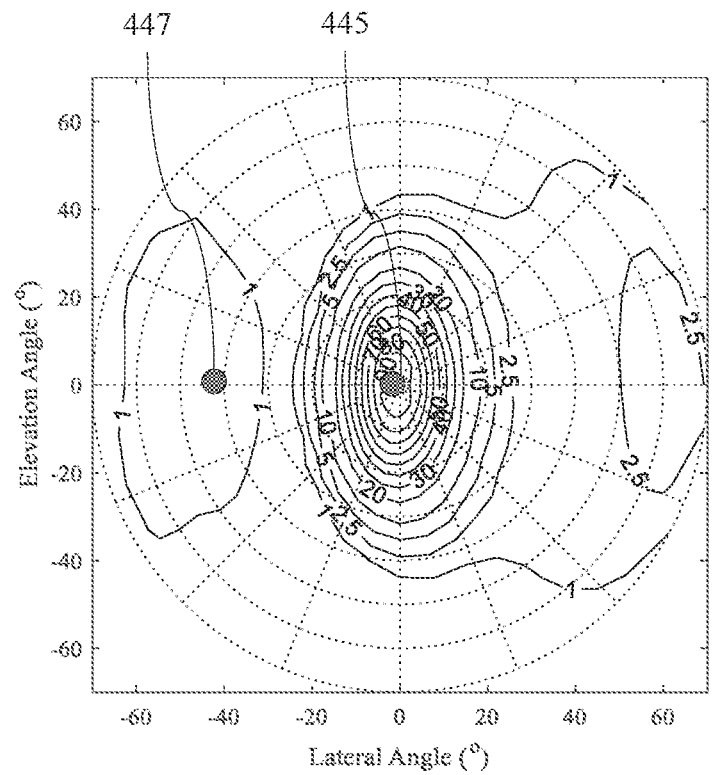
FIG. 24A is a schematic graph illustrating the angular profile of luminance output for the backlight of FIG. 2A in the first temporal phase of operation.
Figure 24B:
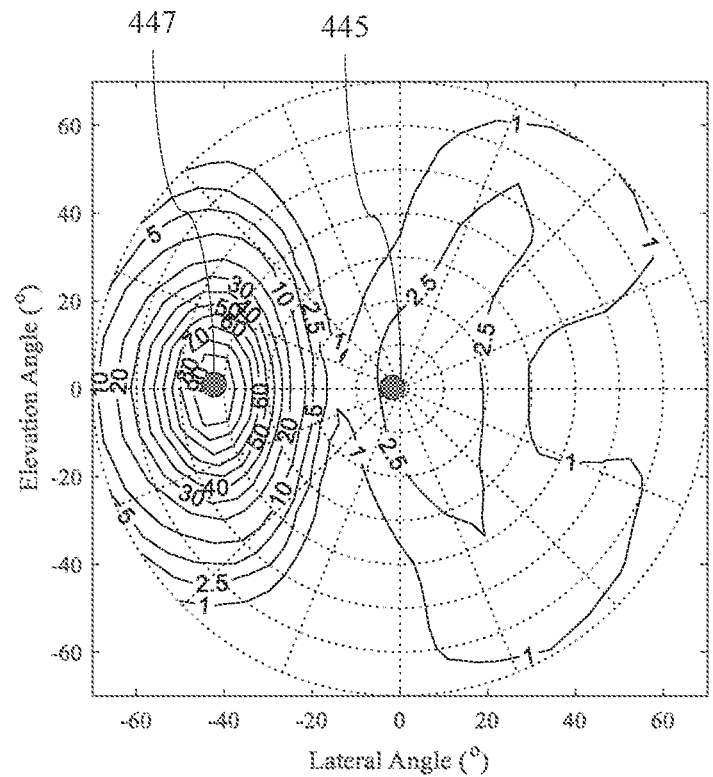
FIG. 24B is a schematic graph illustrating the angular profile of luminance output for the backlight of FIG. 2A in the second temporal phase of operation.

FIG. 24A is a schematic graph illustrating the angular profile of luminance output for the backlight 20 of FIG. 2A in the first temporal phase of operation; and FIG. 24B is a schematic graph illustrating the angular profile of luminance output for the backlight 20 of FIG. 2A in the second temporal phase of operation. Features of the embodiment of FIGS. 24A-B not discussed in further detail may be assumed to correspond to the features with equivalent reference numerals as discussed above, including any potential variations in the features.

In comparison to FIGS. 6A-B, the alternative embodiment of FIGS. 24A-B provide respectively an on-axis peak illuminance in direction 445 for the passenger and an on-axis peak illuminance in direction 447 for the driver 47.

An alternative view angle control arrangement 900 will now be described.

Figure 25A:
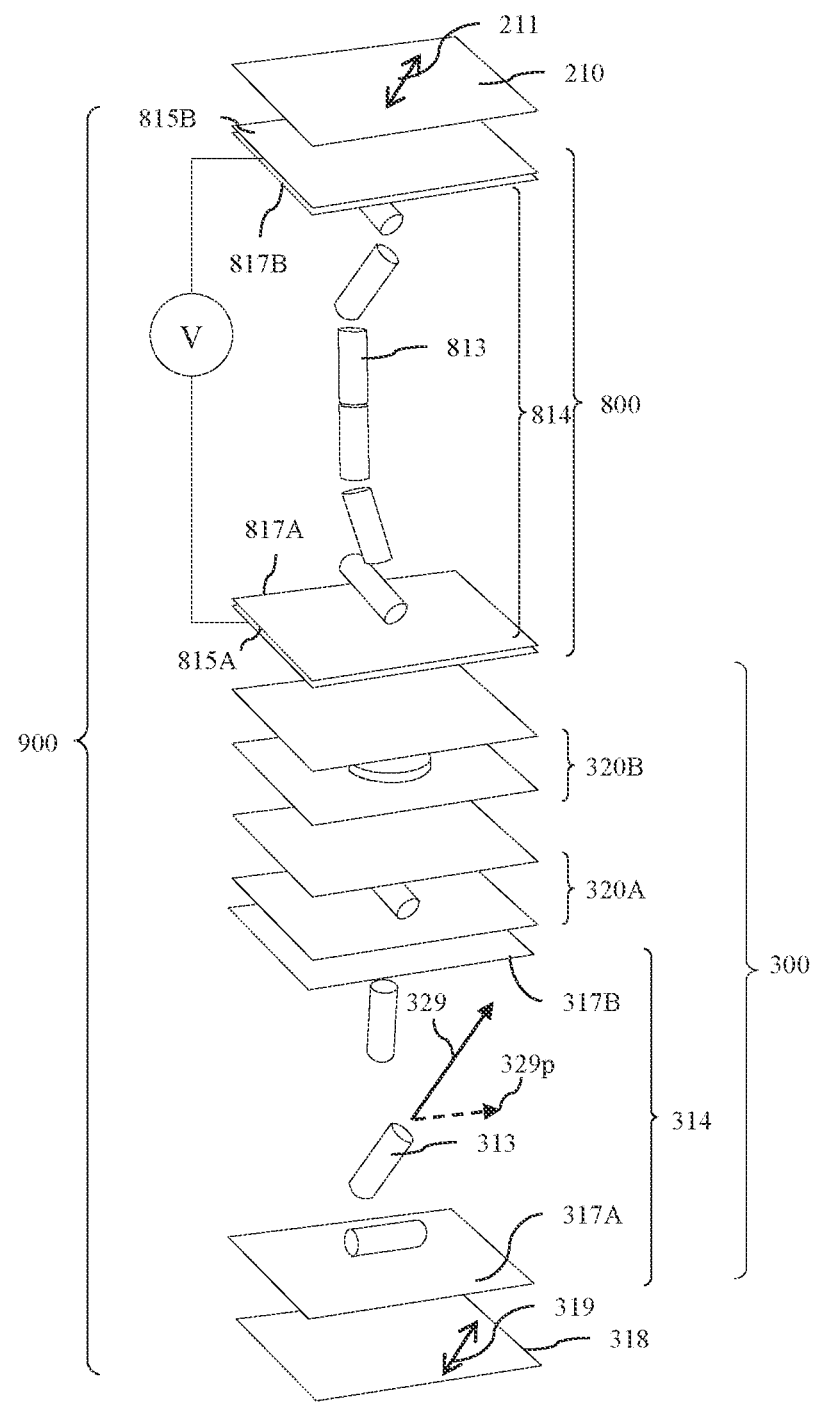
FIG. 25A is a schematic diagram illustrating a front perspective view of a view angle control arrangement of FIG. 2A.

FIG. 25A is a schematic diagram illustrating a front perspective view of an alternative view angle control arrangement 900 of FIG. 2A. Features of the embodiment of FIG. 25A not discussed in further detail may be assumed to correspond to the features with equivalent reference numerals as discussed above, including any potential variations in the features. TABLE 4 is an illustrative embodiment.

TABLE 4

| Item | Layer | Alignment type | Pretilt | In-plane alignment direction | LC layer 314 retardance {narrow range} (wide range) | Additional retarder type | Additional passive retarder retardance {narrow range} (wide range) |
|---|---|---|---|---|---|---|---|
| 318 | | | | | | | Polariser @ 45° |
| 314 | 317A | Homogeneous | 2° | θ 0° | +650 nm {550~750 nm} (300~900 nm) | | |
|  | 317B | Homeotropic | 88° | θ 180° | | | |
| 320A | | | | | | A-plate @ 0° | +180 nm {130 nm~170 nm} (100 nm~200 nm) |
| 320B | | | | | | C-plate | −440 nm (−350~−550 nm) {−250~−650 nm} |
| 800 | 817A | Homogeneous | 2° | θ 90° | +800 nm {700~900 nm} (500~1100 nm) | | |
|  | 817B | Homogeneous | 2° | θ 90° | | | |
| 210 | | | | | | | Polariser @ 45° |

In the alternative embodiment of FIG. 25A, the liquid crystal layer 814 is provided with homogeneous alignment layers 815A, 815B with parallel alignment directions, rather than anti-parallel as in FIG. 2C and TABLE 1. The liquid crystal material near to the alignment layers 815A, 815B may be arranged to switch more quickly than the material through the layer 314 of TABLE 1. Advantageously the response speed of the liquid crystal layer 814 may be increased in comparison to the arrangement of FIG. 2C.

In comparison to the embodiment of TABLE 1. in the embodiment of TABLE 4, the polarisation-switch retarder 800 has parallel homogeneous alignment layers and has a retardance for light of a wavelength of 550 nm in a range from 500 nm to 1100 nm and preferably from 700 nm to 900 nm. The polar control retarder 300 has a homogeneous alignment layer and a homeotropic alignment layer and a retardance for light of a wavelength of 550 nm in a range from 300 nm to 900 nm and preferably from 550 nm to 750 nm. The A-plate correction retarder 320A has a retardance in the range from 100 nm to 200 nm and preferably in the range from 130 nm to 170 nm and the C-plate correction retarder 320B has a retardance in the range from −250 nm to −650 nm and preferably in the range from −350 nm to −550 nm. The ranges are somewhat different to those of TABLE 1, that is related to the increased optical thickness of the layer 314 when the alignment layers are parallel rather than anti-parallel. Such thickness maintains a substantially half-wave retardance in operation for polarised light; however, has increased out-of-plane and in-plane retardances that are desirably corrected by correction retarders 320A, 320B. Similarly the retardance of the polar control retarder is increased because of the off-axis transmission variation caused by the homeotropic alignment of the liquid crystal molecules near the centre of the layer 314. Thus the prescriptive regions for TABLE 1 and TABLE 4 are different.

Further an additional C-plate passive correction retarder 320B is provided such that at least one passive correction retarders 320A, 320B has an optical axis orthogonal to the plane of the passive correction retarder 320B.

Said retarder 320B is arranged to correct for the high out-of-plane retardance of the liquid crystal layer 814, while the retarder 320A is arranged to correct for the high in-plane retardance as described elsewhere herein.

Figure 25B:
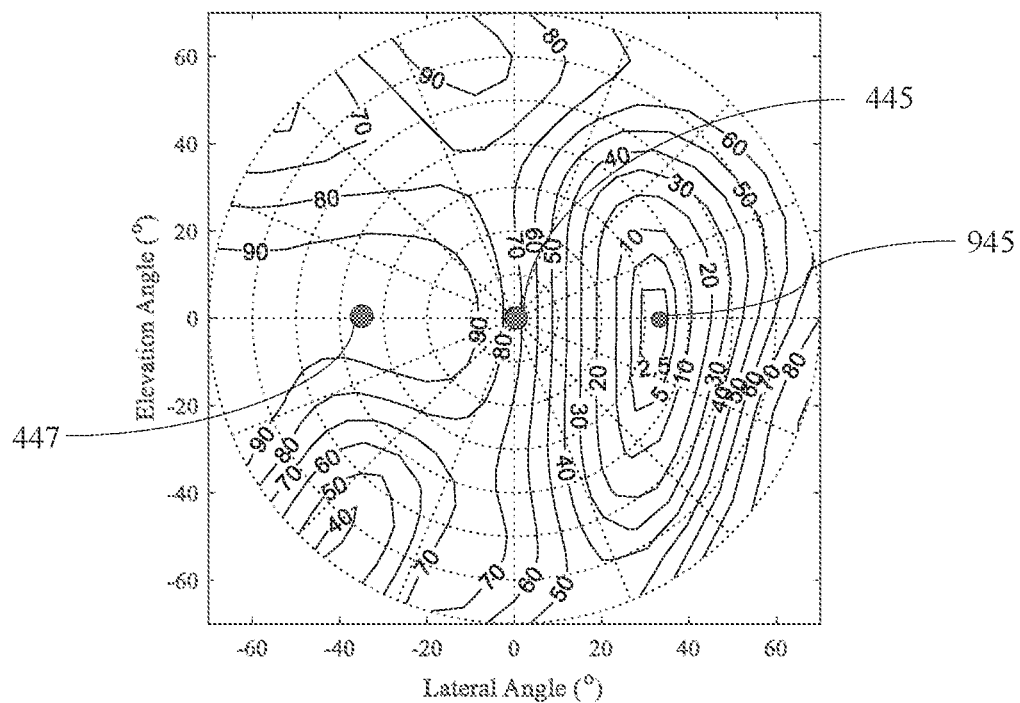
FIG. 25B is a schematic graph illustrating the angular profile of transmission for the view angle control arrangement of FIG. 20A in the first temporal phase of operation.
Figure 25C:
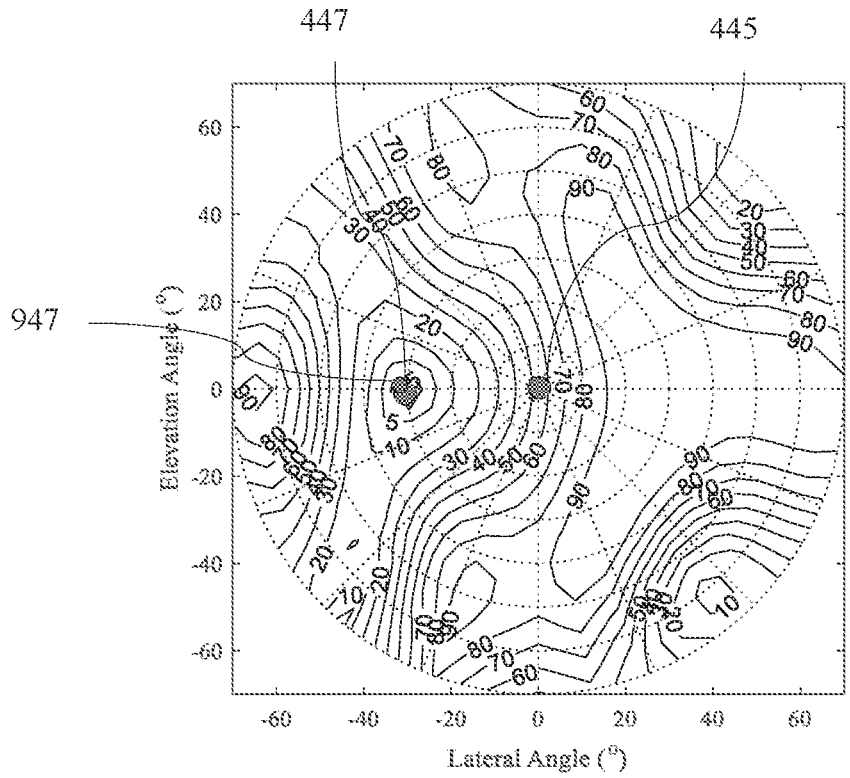
FIG. 25C is a schematic graph illustrating the angular profile of transmission for the view angle control arrangement of FIG. 20A in the second temporal phase of operation.
Figure 25D:
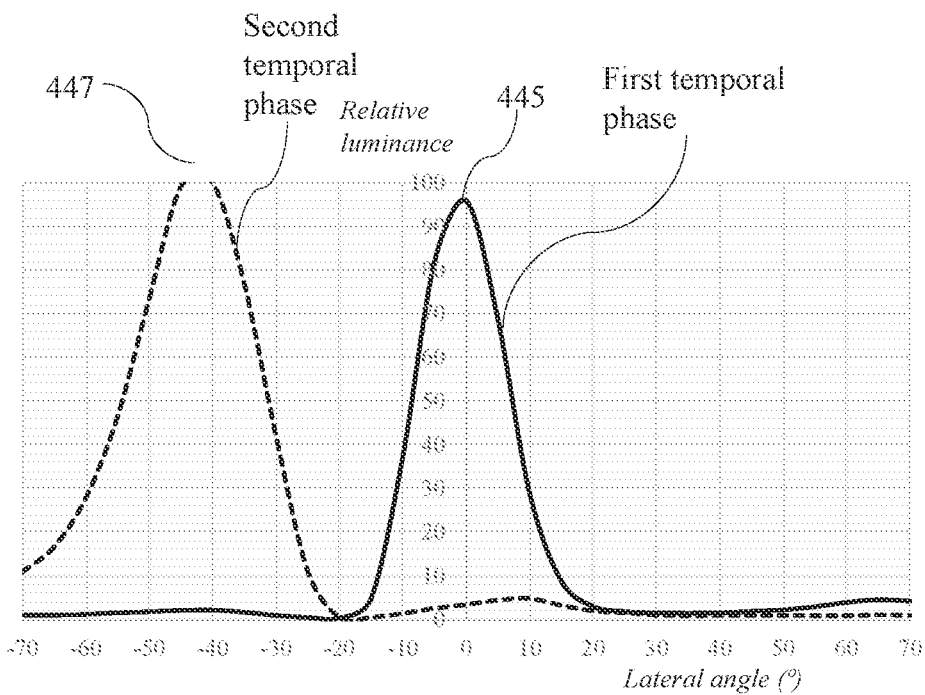
FIG. 25D and FIG. 25E are schematic graphs illustrating the lateral variation of luminance output for the display of FIG. 2A with the view angle control arrangement of FIG. 25A in first and second temporal phases of operation.
Figure 25E:
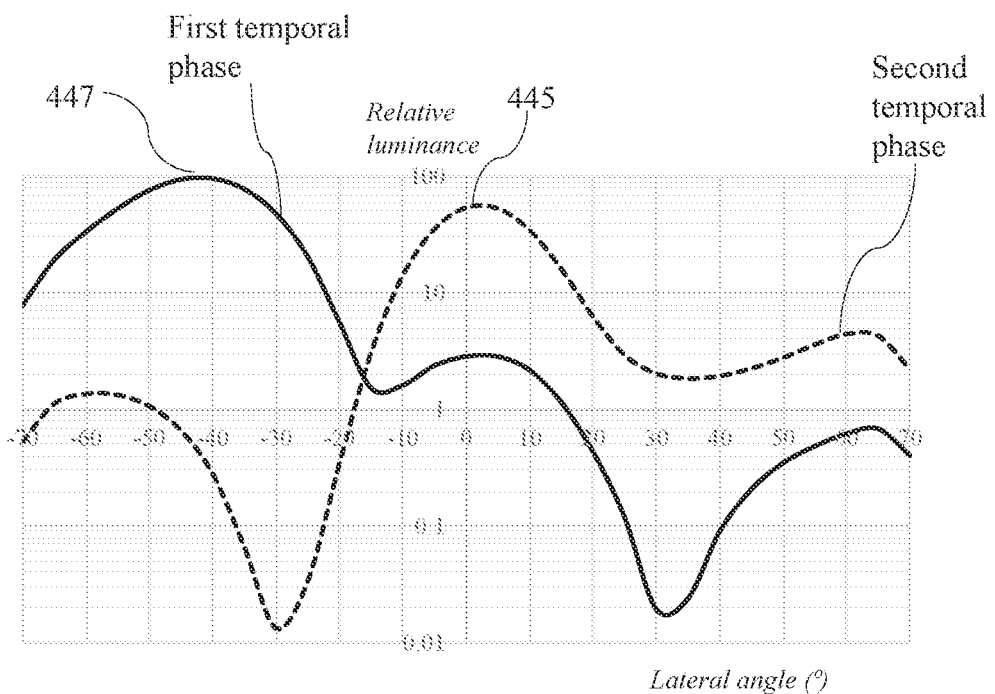

FIG. 25B is a schematic graph illustrating the angular profile of transmission for the view angle control arrangement 900 of FIG. 25A in the first temporal phase of operation; FIG. 25C is a schematic graph illustrating the angular profile of transmission for the view angle control arrangement 900 of FIG. 25A in the second temporal phase of operation; and FIGS. 25D-E are schematic graphs illustrating the lateral variation of luminance output for the display device 100 of FIG. 2A with the view angle control arrangement 900 of FIG. 25A in first and second temporal phases of operation.

In comparison to the embodiments of FIG. 8A and FIG. 9, a luminance peak is achieved in direction 445 for the passenger 45, and in direction 447 for the driver 47. Further the cross talk between the driver 47 image and passenger 45 image may be reduced to desirable levels.

Advantageously a passenger infotainment display with low levels of driver distraction may be achieved. Further the passenger 45 and driver 47 may receive different images for dual view operation.

Optical components will now be further described.

Figure 26A:
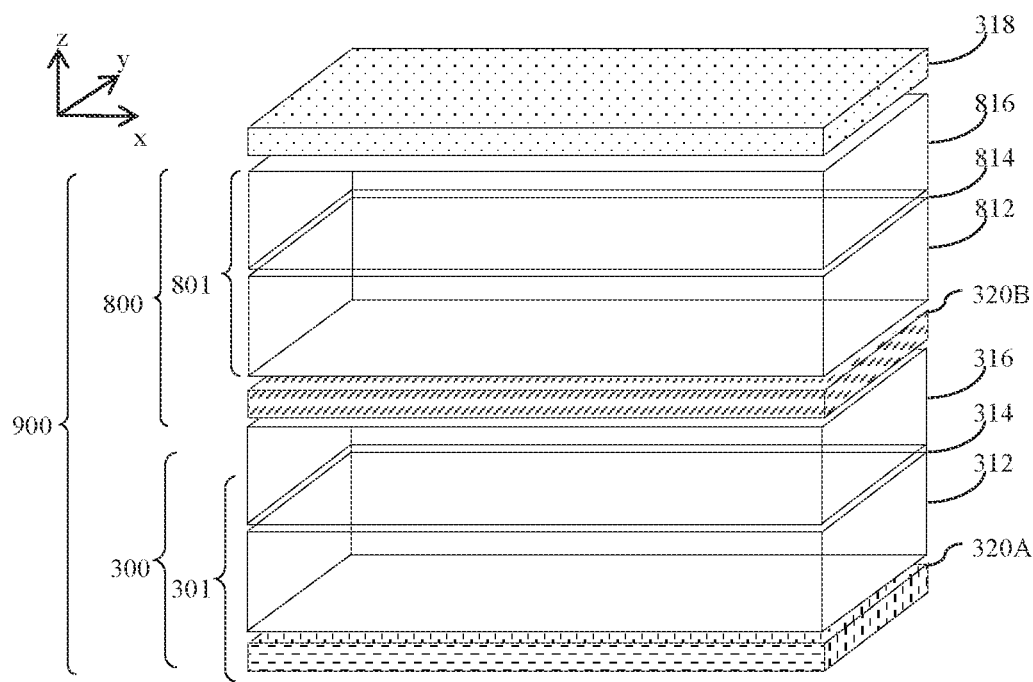
FIG. 26A is a schematic diagram illustrating a front perspective view of a component comprising a view angle control arrangement comprising an active polar control retarder.
Figure 26B:
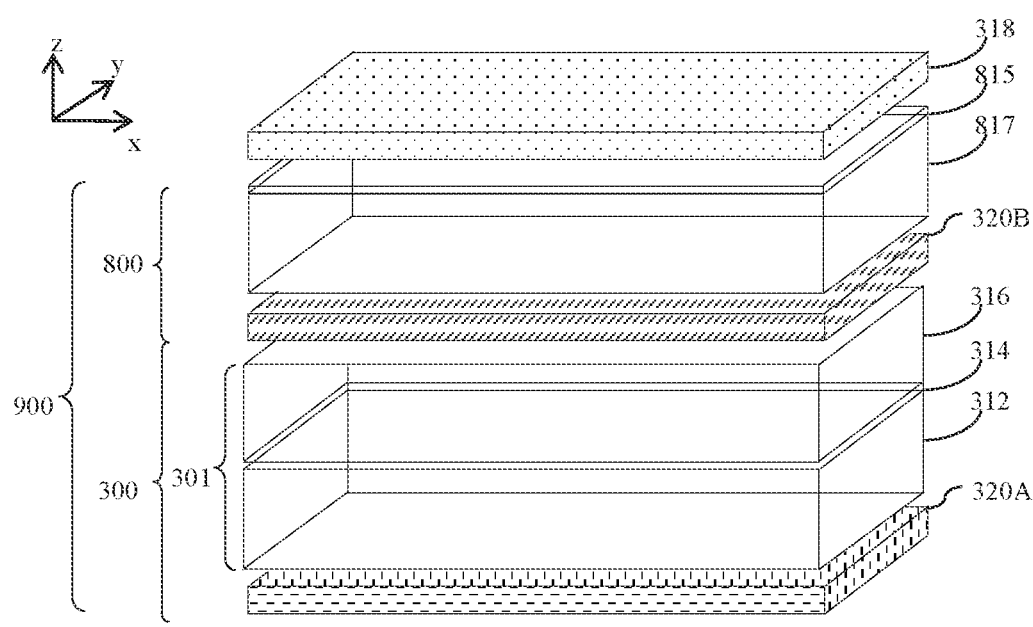
FIG. 26B is a schematic diagram illustrating a front perspective view of a component comprising a view angle control arrangement comprising a passive polar control retarder.
Figure 26C:
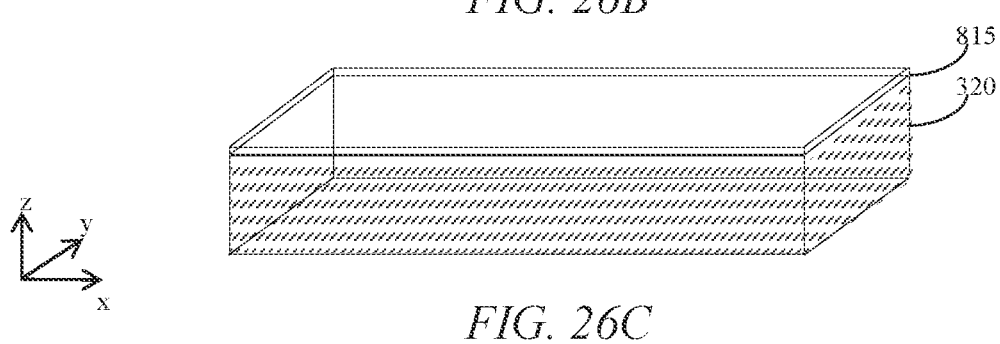
FIG. 26C is a schematic diagram illustrating a front perspective view of a component comprising a passive polar control retarder.

FIG. 26A is a schematic diagram illustrating a front perspective view of a component comprising a view angle control arrangement 900 comprising an active polar control retarder 300; FIG. 26B is a schematic diagram illustrating a front perspective view of a component comprising a view angle control arrangement 900 comprising a polar control retarder 300; and FIG. 26C is a schematic diagram illustrating a front perspective view of a component comprising a polar control retarder 300. Features of the embodiments of FIGS. 26A-C not discussed in further detail may be assumed to correspond to the features with equivalent reference numerals as discussed above, including any potential variations in the features.

Alternative optical stockings will now be described.

Figures 27A, 27B:
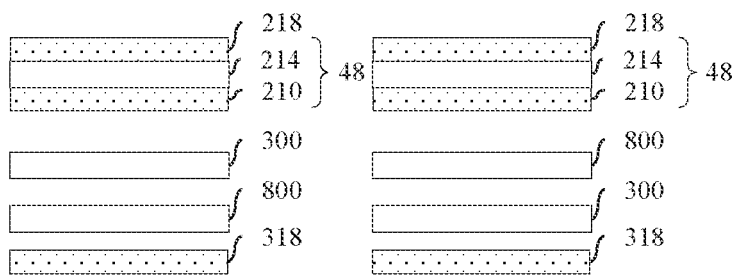
FIGS. 27A-W are schematic diagrams illustrating alternative side views of alternative display structures.
Figures 27C, 27D, 27E:
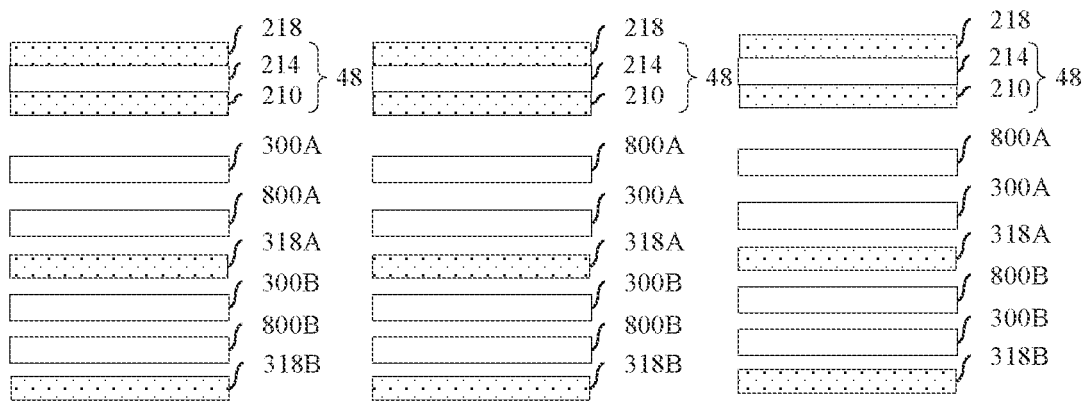
Figures 27F, 27G:
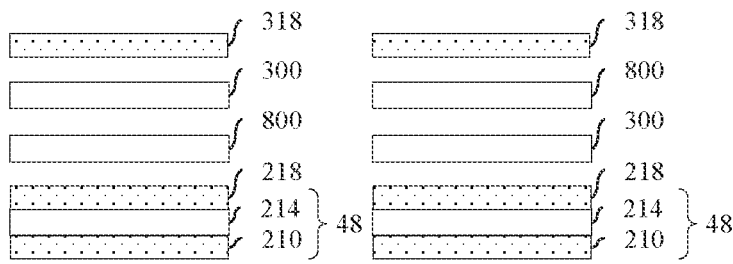
Figures 27H, 27I, 27J:
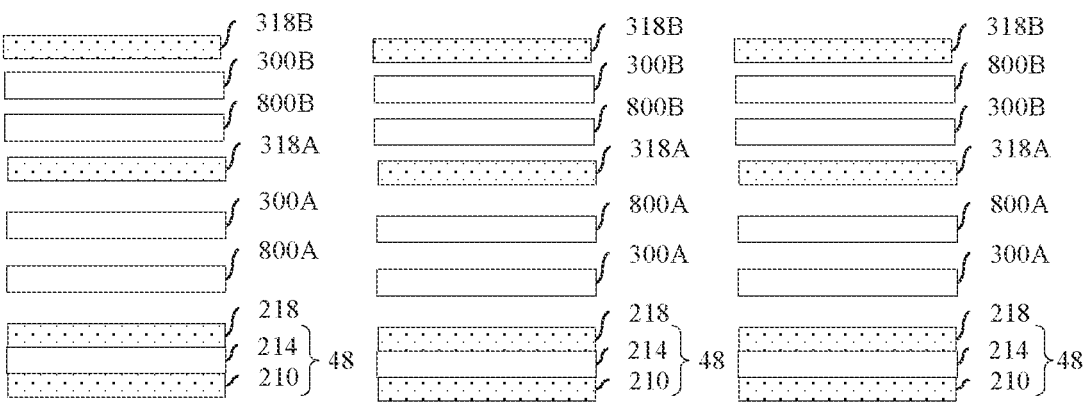
Figure 27K:
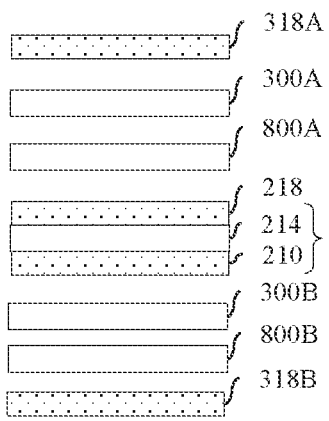
Figure 27L:
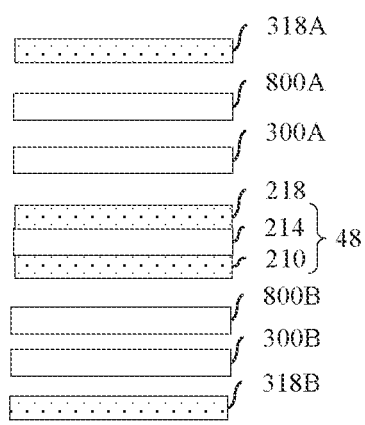
Figure 27M:
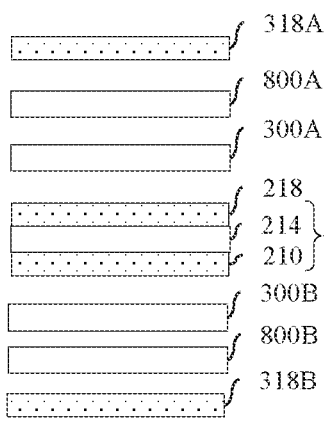
Figure 27N:
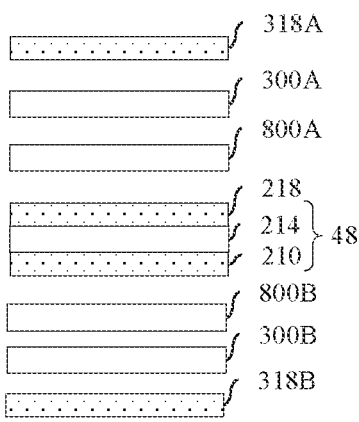
Figure 27O:
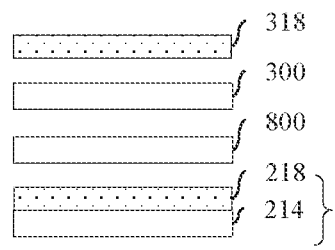
Figure 27P:
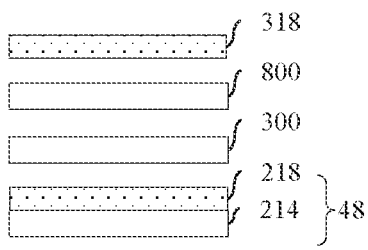
Figure 27Q:
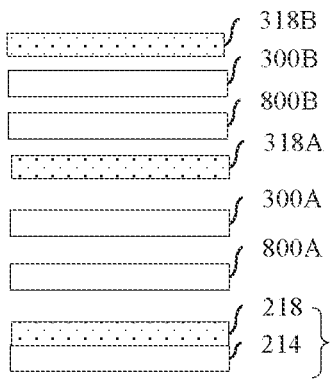
Figure 27R:
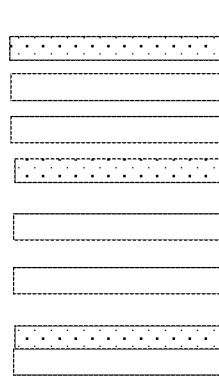
Figure 27S:
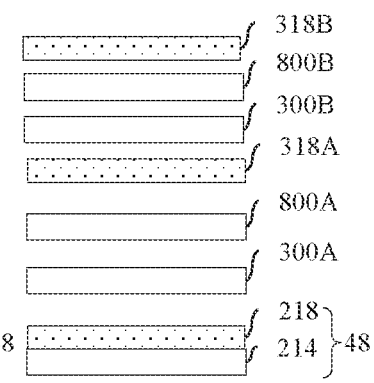
Figures 27T, 27U:
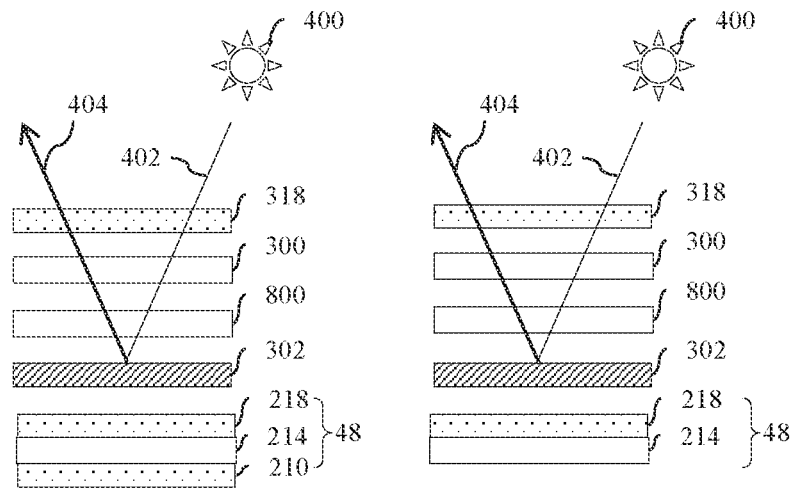
Figures 27V, 27W:
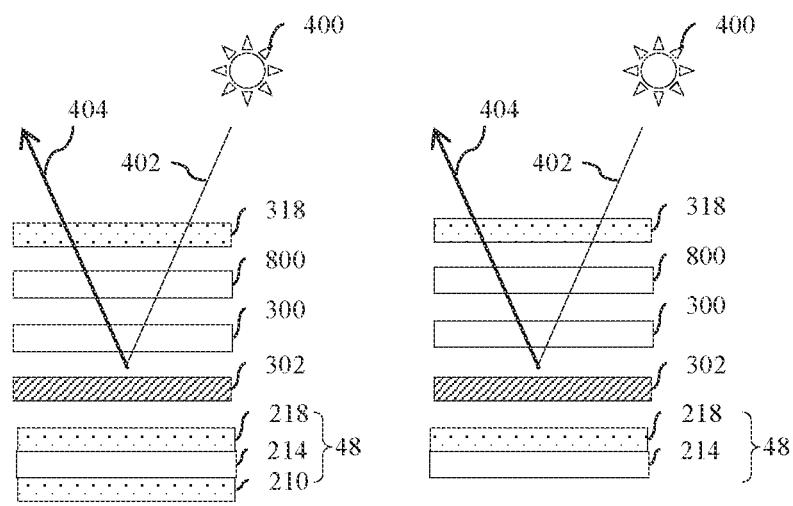

FIGS. 27A-W are schematic diagrams illustrating alternative side views of alternative display, device 100 structures. Features of the embodiments of FIGS. 27A-W not discussed in further detail may be assumed to correspond to the features with equivalent reference numerals as discussed above, including any potential variations in the features.

In comparison to the embodiments hereinabove, in the embodiments of FIGS. 27F-S the display polariser may be an output display polariser 218 arranged on the output side of the spatial light modulator 48. The display device 100 further comprises: an output display polariser 218 arranged on the output side of the spatial light modulator 48; a further additional polariser 318 arranged on the output side of the spatial light modulator 48, the further additional polariser 318 being a linear polariser; and at least one further polar control retarder 300B and a further polarisation-switch retarder arranged between the further additional polariser 318 and the output display polariser 210.

In the embodiments of FIGS. 27O-S, the spatial light modulator 48 comprises an emissive spatial light modulator 48 arranged to emit the spatially modulated light. The emissive spatial light modulator 48 may comprise an OLED display, a micro-LED display or other known emissive display types. Emissive displays may achieve higher frame update rates than switchable liquid crystal displays. Advantageously cross talk may be reduced.

In further alternative embodiments such as in FIGS. 27T-27W a reflective polariser 302 may be provided between the output display polariser 218 and a view angle control arrangement 900 and additional polariser 318. In operation as a privacy display, ambient light rays 402 from ambient light source 400 may be reflected to rays 404 by the reflective polariser 302. The reflected light rays 404 may advantageously achieve increased security factor, as described in U.S. Pat. No. 10,303,030 and in U.S. Pat. No. 10,976,578, both of which are herein incorporated by reference in their entireties.

The structure and operation of various alternative backlights 20 that provide desirable illumination characteristics for the switchable privacy display device 100 of the present embodiments will now be described further.

Figure 28B:
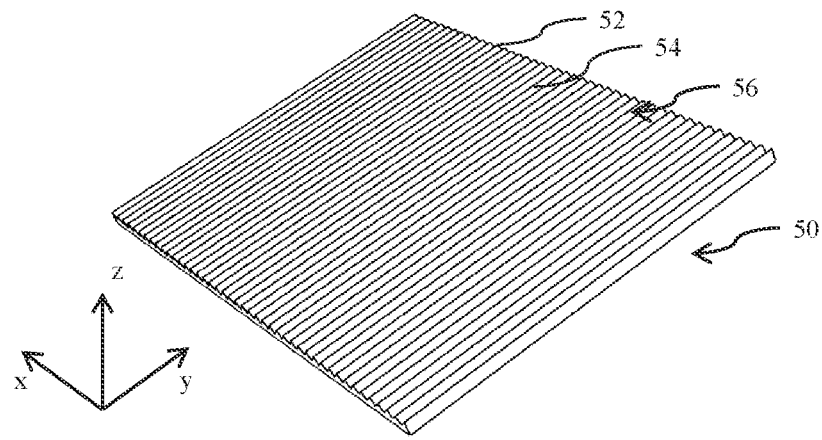
FIG. 28B is a schematic diagram illustrating a front perspective view of an optical turning film component for the backlight of FIG. 26A.
Figure 28C:
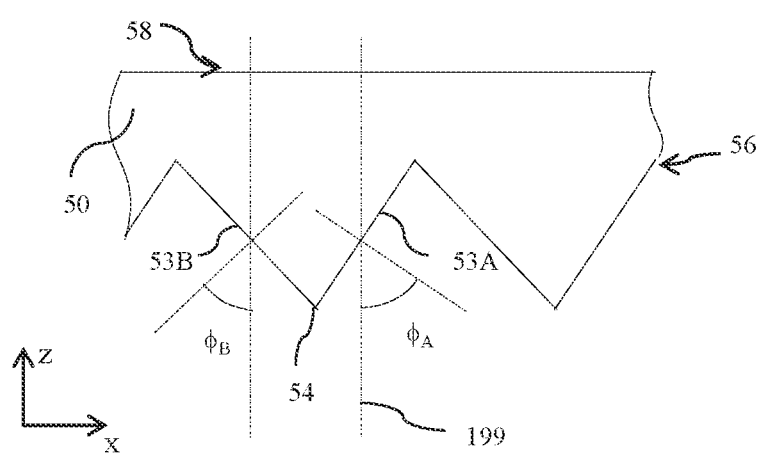
FIG. 28C is a schematic diagram illustrating a side view of an optical turning film component.
Figure 28D:
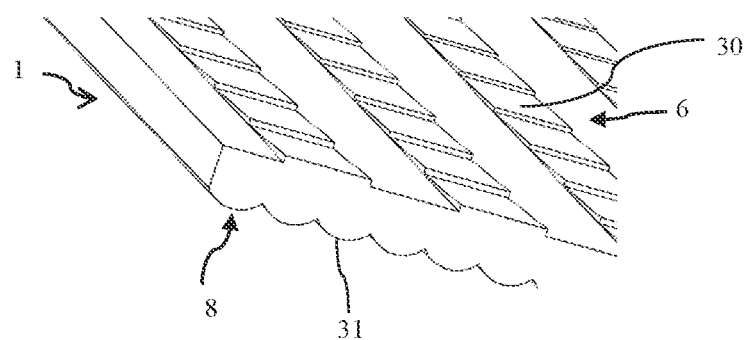
FIG. 28D, FIG. 28E, FIG. 28F, and FIG. 28G are schematic diagrams illustrating perspective views of waveguides for use in the arrangement of FIG. 28A.
Figure 28E:
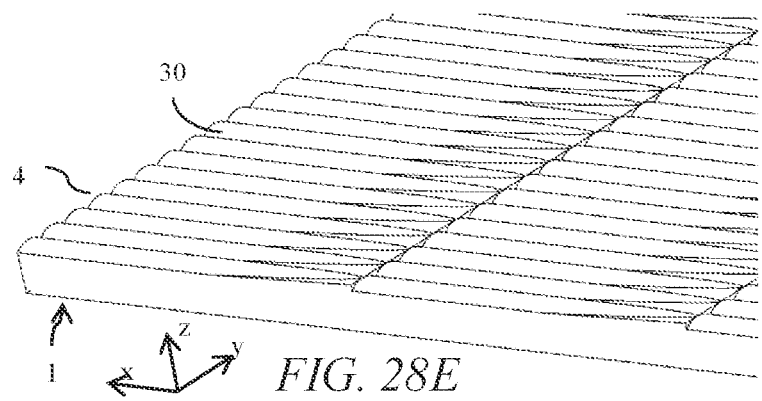
Figure 28F:
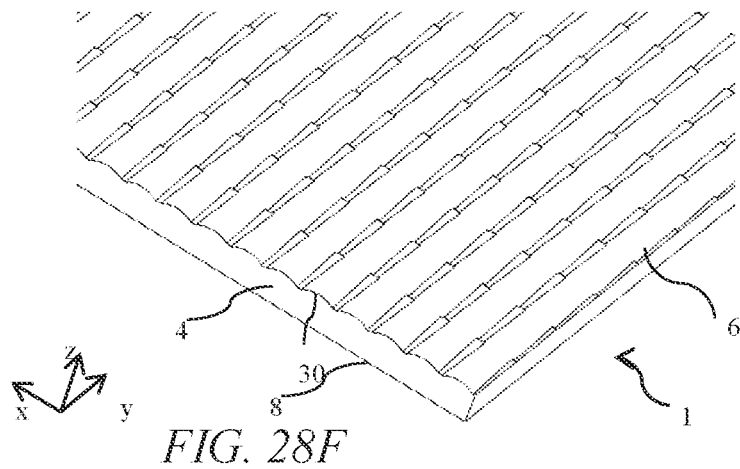
Figure 28G:
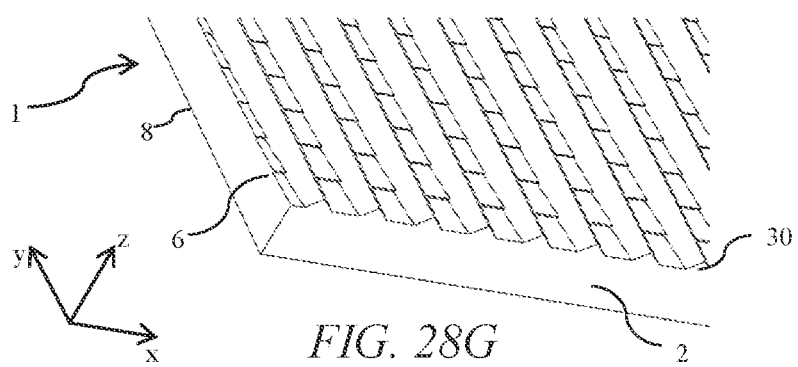

FIG. 28A is a schematic diagram illustrating a side view of the switchable backlight 20 of FIG. 2A comprising waveguides 1A, 1B, a rear reflector 3 and an optical turning film component 50 and outputting light beams 445, 447 with the angular distributions as illustrated in FIGS. 4A-C; FIG. 28B is a schematic diagram illustrating a front perspective view of an optical turning film component 50 for the backlight 20 of FIG. 28A; FIG. 28C is a schematic diagram illustrating a side view of an optical turning film component 50; and FIGS. 28D-G are schematic diagrams illustrating perspective views of waveguides for use in the arrangement of FIG. 28A. Features of the embodiments of FIGS. 28A-H not discussed in further detail may he assumed to correspond to the features with equivalent reference numerals as discussed above, including any potential variations in the features.

The backlight 20 comprises: at least one first light source 15A arranged to provide input light; at least one second light source 15B arranged to provide input light in an opposite direction from the at least one first light source 15; a waveguide arrangement 11 comprising at least one waveguide 1, the waveguide arrangement 11 being arranged to receive the input light from the at least one first light source 15 and the at least one second light source and to cause light from the at least one first light source 15 and the at least one second light source to exit from the waveguide arrangement 11 by breaking total internal reflection; and an optical turning film component 50 comprising: an input surface 56 arranged to receive the light exiting from a waveguide 1 through a light guiding surface 8 of the waveguide 1 by breaking total internal reflection, the input surface 56 extending across the plane; and an output surface 58 facing the input surface 56, wherein the input surface 56 comprises an array of prismatic elements 51. The prismatic elements 51 may be elongate.

Further, in the embodiment of FIG. 28A, the waveguide arrangement 11 comprises: a first waveguide 1A extending across a plane and comprising first and second opposed light guiding surfaces 6A, 8A arranged to guide light along the waveguide, the second light guiding surface being arranged to guide light by total internal reflection; and a first input end 2A arranged between the first and second light guiding surfaces 6A, 8A and extending in a lateral direction between the first and second light guiding surfaces 6A, 8A; wherein the at least one first light source 15A is arranged to input light 444A into the first waveguide 1A through the first input end, and the first waveguide 1A is arranged to cause light from the at least one first light source 15A to exit from the first waveguide 1A through one of the first and second light guiding surfaces 6A, 8A by breaking total internal reflection;

a second waveguide 1B extending across the plane arranged in series with the first waveguide 1A and comprising first and second opposed light guiding surfaces 6B, 8B arranged to guide light along the waveguide 1B, the second light guiding surface 8B being arranged to guide light by total internal reflection, and a second input end 2B arranged between the first and second light guiding surfaces 6B, 8B and extending in a lateral direction between the first and second light guiding surfaces 6B, 8B; wherein the at least one second light source 15B is arranged to input light 444B into the second waveguide 1B through the second input end 2B, and the second waveguide 1B is arranged to cause light from the at least one second light source 15B to exit from the second waveguide 1B through one of the first and second light guiding surfaces 6B, 8B by breaking total internal reflection, and wherein the first and second waveguides 1A, 1B are oriented so that at least one first light source 15A and at least one second light source 15B input light 444A, 444B into the first and second waveguides 1A, 1B in opposite directions.

The optical turning film component 50 comprises: an input surface 56 arranged to receive the light 444A, 444B exiting from the waveguide arrangement 11 through a light guiding surface of the at least one waveguide 1A, 1B of the waveguide arrangement by breaking total internal reflection, the input surface 56 extending across the plane; and an output surface 58 facing the input surface, wherein the input surface 56 comprises an array of prismatic elements 52. The prismatic elements each comprise a pair of elongate facets 52 defining a ridge 54 therebetween. Angles $\phi_A$, $\phi_B$ of prism surfaces 53A, 53B are provided to direct the nominal light output from waveguides 1A, 1B into directions 445, 447 with respective light cones 455, 457 by refraction and reflection at surfaces 53A, 53B. Advantageously desirable illumination directions such as illustrated in FIGS. 4A-F may be achieved by selection of angles $\phi_A$, $\phi_B$.

The backlight 20 of FIG. 28A may provide the exemplary luminance profiles of FIGS. 6A-B or FIGS. 24A-B hereinabove, In operation, the light 444A from the first light source 15A exits the backlight 20 with a first angular distribution 445 as illustrated in FIG. 25D and the light from the second light source 15B exits the backlight 20 with a second angular distribution 447 as illustrated in FIG. 25D different from the first angular distribution 445. The first angular distribution 445 may be symmetrical about an axis 199 of symmetry of the backlight 20 and the second angular distribution 447 is asymmetrical about the same axis 199 of symmetry of the backlight 20. In a left-hand drive vehicle, the asymmetrical distribution 447 may be to the left of the axis 199 of symmetry of the backlight 20 and in a right-hand drive vehicle the asymmetrical distribution 447 may be to right of the axis 199 of symmetry of the backlight 20.

Waveguides 1A, 1B comprise surface relief features that are arranged to leak some of the guiding light either towards the rear reflector 3 or towards the light turning component 50. Each waveguide 1A, 1B comprise a surface relief 30 arranged on the first side 6A, 6B that may comprise prism surfaces 32, 33. Further the second sides 8A, 8B may further comprise surface relief 31 that may comprise elongate features or prism features as illustrated in FIGS. 28D-G hereinbelow. In operation the surface reliefs 30, 31 provide leakage of light 445, 447 from the waveguide 1A, 1B for redirecting by turning film 50.

Figure 29A:
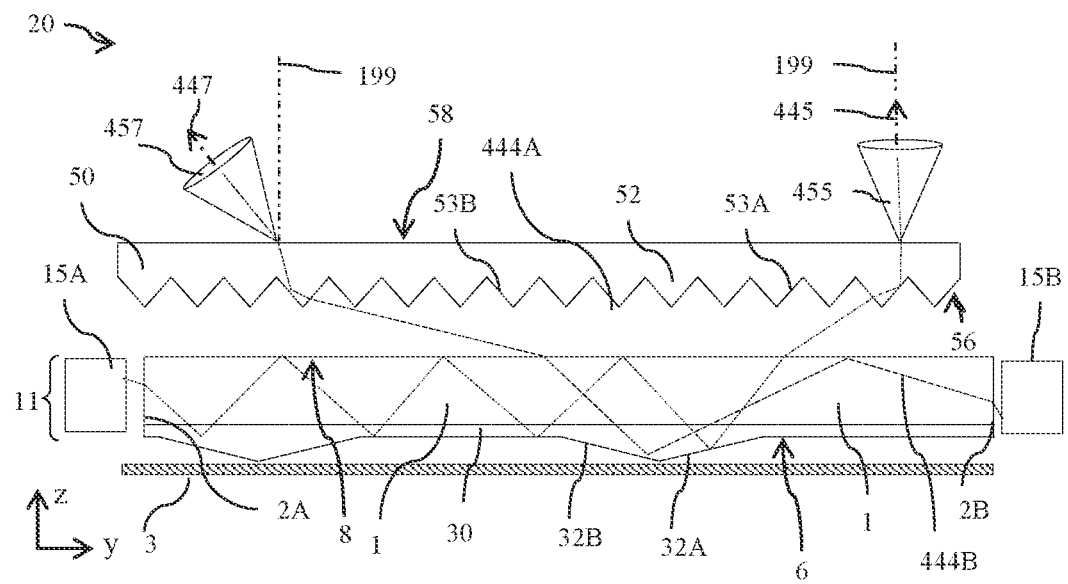
FIG. 29A is a schematic diagram illustrating a side view of a switchable backlight comprising a waveguide, first and second light sources at respective opposite input sides of the waveguide, a rear reflector and an optical turning film and outputting light beams for passenger and driver nominal directions.
Figure 29B:
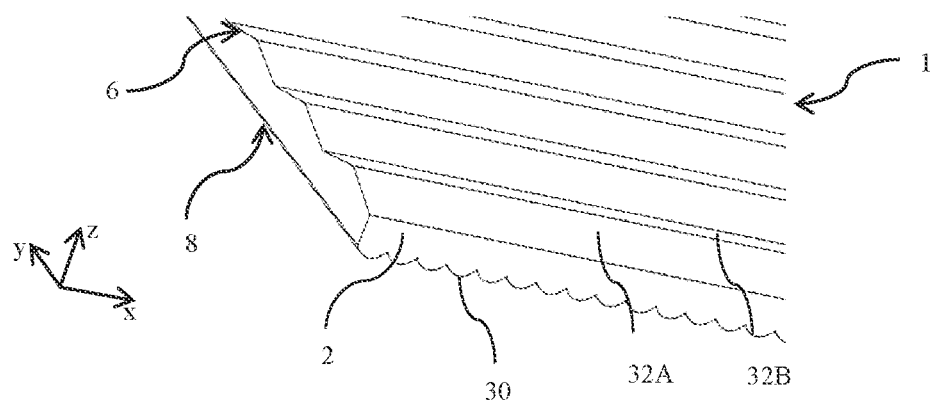
FIG. 29B and FIG. 29C are schematic diagrams illustrating perspective views of waveguides for use in the arrangement of FIG. 29A.
Figure 29C:
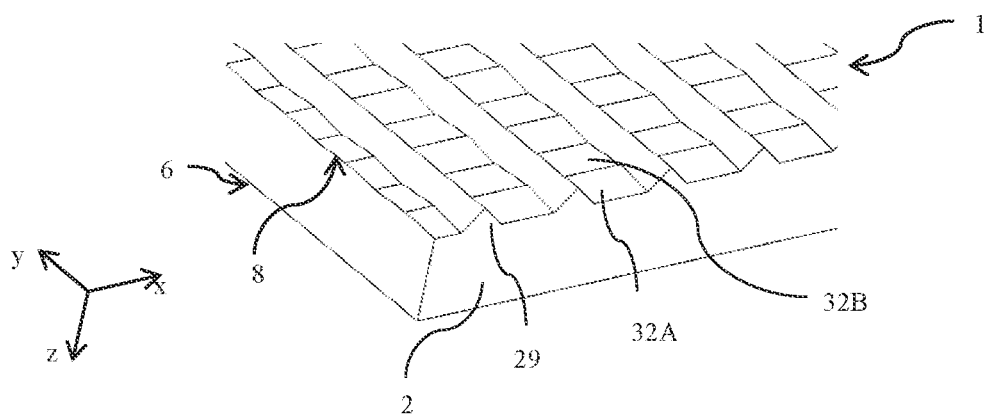

FIG. 29A is a schematic diagram illustrating a side view of a switchable backlight 20 comprising a waveguide 1, first and second light sources 15A, 15B at respective opposite input sides of the waveguide 1, a rear reflector 3 and an optical turning film 50 and outputting light beams for passenger 45 and driver 47 nominal directions; and FIGS. 29B-C are schematic diagrams illustrating perspective views of waveguides for use in the arrangement of FIG. 29A. Features of the embodiment of FIGS. 29A-C not discussed in further detail may be assumed to correspond to the features with equivalent reference numerals as discussed above, including any potential variations in the features.

The waveguide arrangement 11 comprises: a waveguide 1 extending across a plane, wherein the waveguide 1 is an optical waveguide, and comprising: first and second opposed light guiding surfaces 6, 8 arranged to guide light along the waveguide 1, the second light guiding surface 8 being arranged to guide light by total internal reflection, and first and second input ends 2A, 2B arranged between the first and second light guiding surfaces 6, 8 and extending in a lateral direction between the first and second light guiding surfaces 6, 8; wherein the at least one first light source ISA is arranged to input light 445 into the waveguide 1 through the first input end 2A and the at least one second light source 15B is arranged to input light 447 into the waveguide 1 through the second input end 2B, and the waveguide 1 is arranged to cause light from the at least one first light source 15A and the at least one second light source 15B to exit from the waveguide 1 through one of the first and second light guiding surfaces 6, 8 by breaking total internal reflection.

Figure 30A:
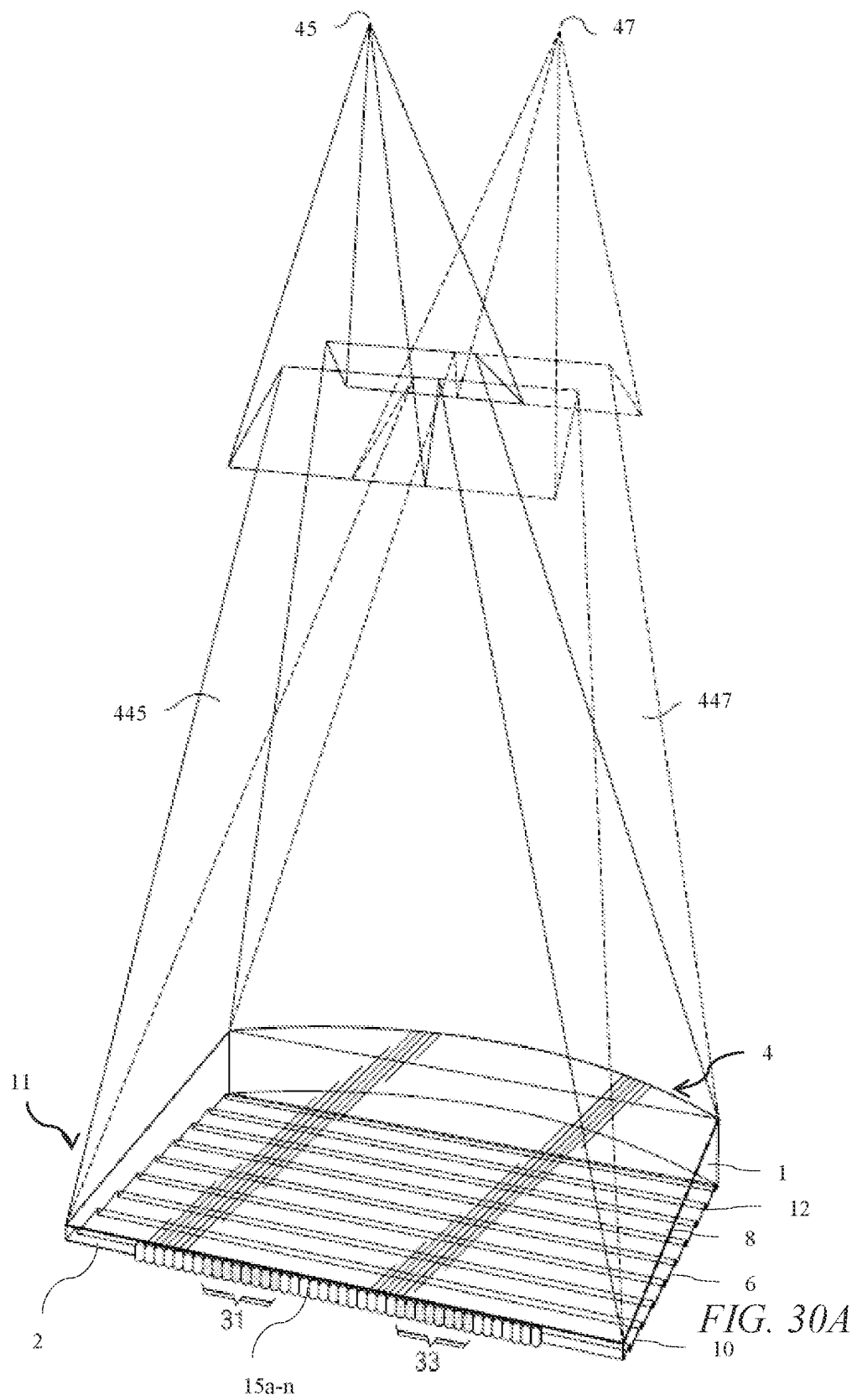
FIG. 30A is a schematic diagram illustrating a perspective side view of a steerable backlight comprising a stepped waveguide, and addressable light source array.
Figure 30B:
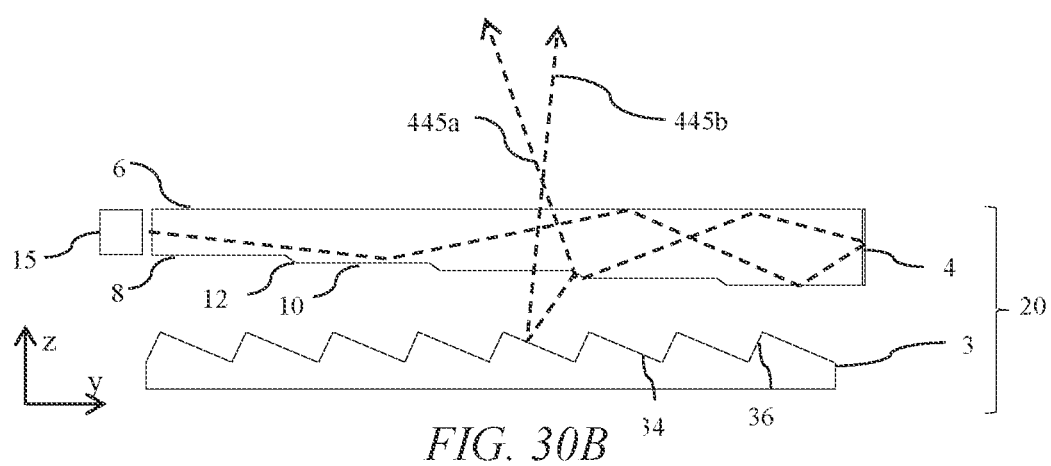
FIG. 30B is a schematic diagram illustrating a side view of a steerable backlight comprising a stepped waveguide, and addressable light source array and rear reflector.

FIG. 30A is a schematic diagram illustrating a perspective side view of a steerable backlight 20 comprising a waveguide arrangement 11 comprising a stepped waveguide 1, and addressable light source array 15a-n; and FIG. 30B is a schematic diagram illustrating a side view of a steerable backlight 20 comprising a stepped waveguide, and addressable light source array and rear reflector. Features of the embodiment of FIGS. 30A-B not discussed in further detail may be assumed to correspond to the features with equivalent reference numerals as discussed above, including any potential variations in the features.

Such a stepped waveguide is further described in U.S. Pat. No. 9,519,153 and in U.S. Pat. No. 10,054,732, both of which are herein incorporated by reference in their entireties.

Waveguide 1 comprises an input end 2, a reflective end 4 and first and second light guiding surfaces 6, 8 arranged between the input end 2 and reflective end 4. The second light guiding surface 8 may be a planar surface and the first light guiding surface 6 may comprise a stepped structure comprising steps 12 and intermediate regions 10 that may be planar.

In operation, light from at least some of light sources 15a-n is input at the input end 2 and guided substantially without loss to the reflective end 4. Reflected light rays are guided back towards the steps 12 by means of the surface 8, 10 at which point they are extracted from the waveguide after total internal reflection or by refraction. Considering FIG. 30A, light sources 15a-n in region 31 are directed towards driver 47 and light sources in region 33 are directed towards the passenger 45.

Considering FIG. 30B, refracted light rays 445b are incident on rear reflector 3 comprising reflective facets 34, 36 and directed towards passenger 45, similarly refracted light rays 447b (not shown) are directed towards driver 47. Advantageously output brightness is increased.

The light extraction features 12 may be curved and optical pupils 325, 327 may be provided towards passenger 45, and driver 47. Advantageously image uniformity may be increased.

Figure 30C:
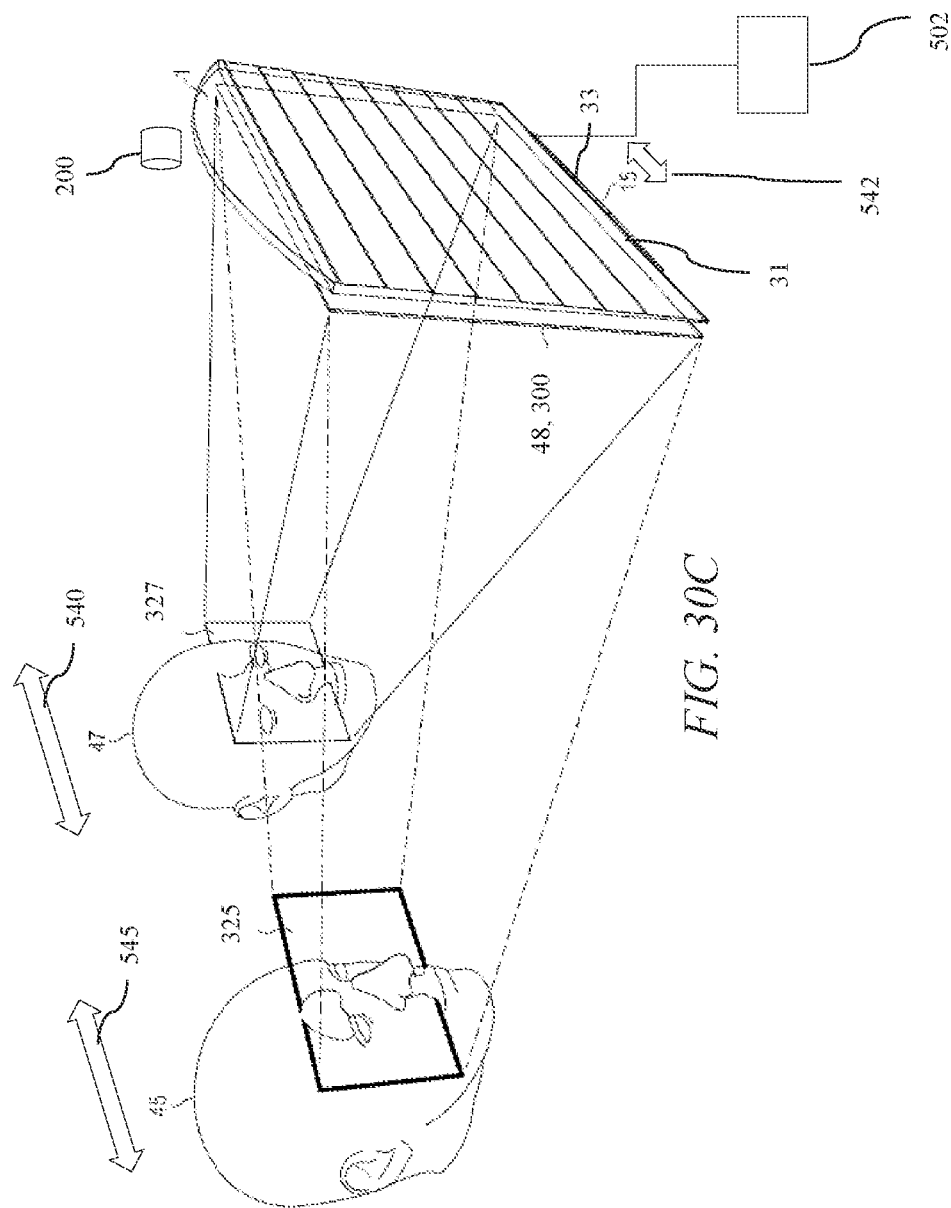
FIG. 30C is a schematic diagram illustrating a perspective rear view of a steerable backlight comprising a stepped waveguide, addressable light source array to illuminate a driver and passenger.

FIG. 30C is a schematic diagram illustrating a perspective rear view of a steerable backlight 20 comprising a stepped waveguide 1, addressable light source array 15, spatial light modulator 48 and polar control retarder 300 to illuminate a driver 47 and passenger 45. Features of the embodiment of FIG. 30C not discussed in further detail may be assumed to correspond to the features with equivalent reference numerals as discussed above, including any potential variations in the features.

In operation for a moving passenger 47 with movement of measured distance 545 from a reference location, the light sources 15a-n are controlled such that region 33 is adjusted to move location by distance 542 in correspondence to the distance of movement 540. The light sources 15 are controlled accordingly such that the input illuminated region 31 is moved by distance 542. Optical window 325 is then maintained at a location near to the passenger, and light leakage to window 327 is minimised. As described elsewhere herein, the polar control retarder 300 may similarly be controlled to achieve desirable luminance reduction at the driver 47 measured distance of movement 540 from a reference location. Advantageously luminance to passenger 45 is increased and security factor to driver 47 is increased.

In share mode operation, all of the light sources 15a-n may be operated to achieve wide angle operation, together with share mode operation of the polar control retarder 300, described elsewhere herein.

A thin and steerable backlight for a switchable privacy display with high image security may advantageously be achieved.

An alternative arrangement of a switchable backlight arrangement will now be described.

Figure 31A:
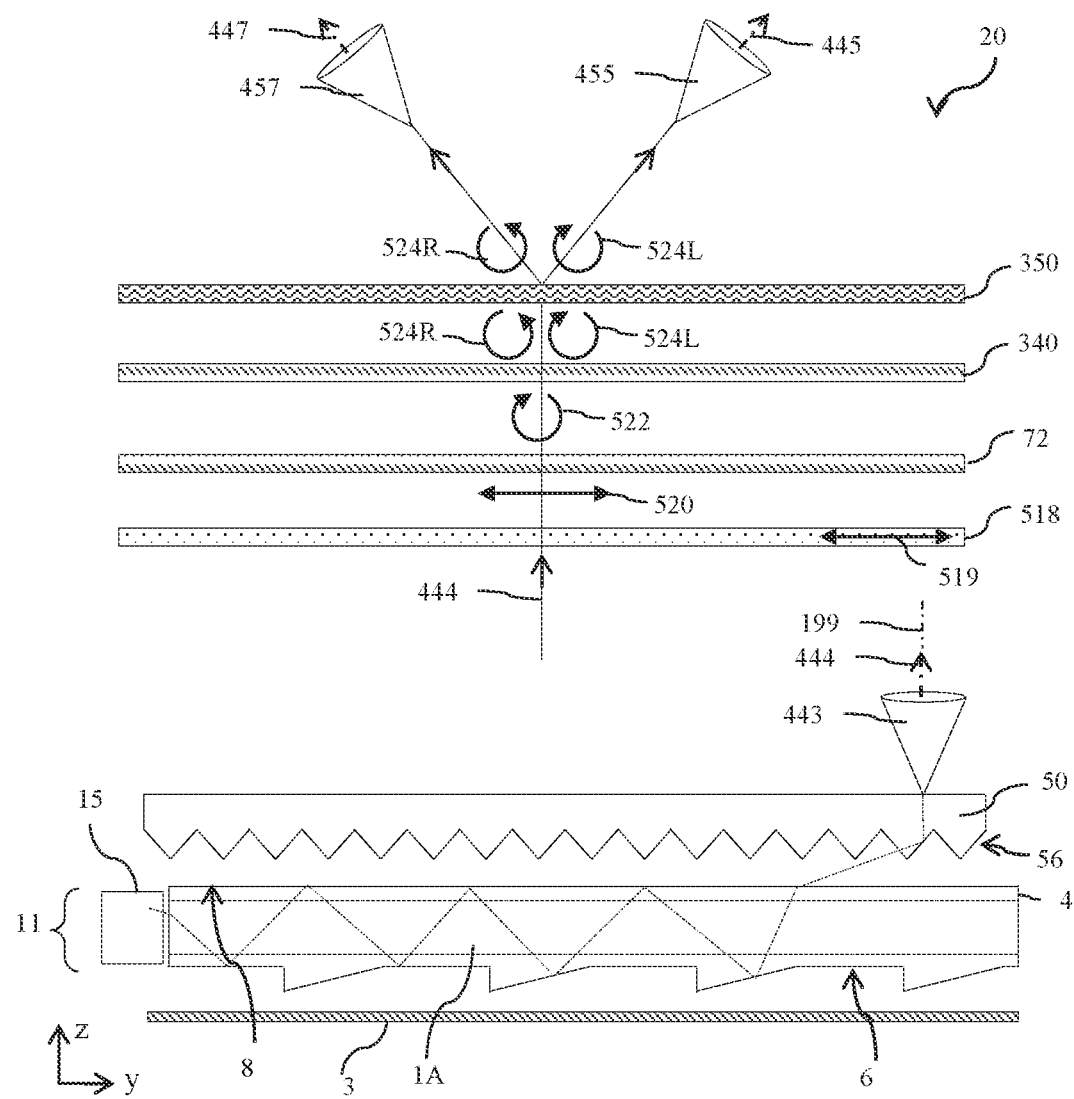
FIG. 31A is a schematic diagram illustrating a side view of a switchable backlight comprising a collimating waveguide arrangement, an optical turning film, a polarisation switching arrangement and a Pancharatnum-Berry deflector.
Figure 31B:
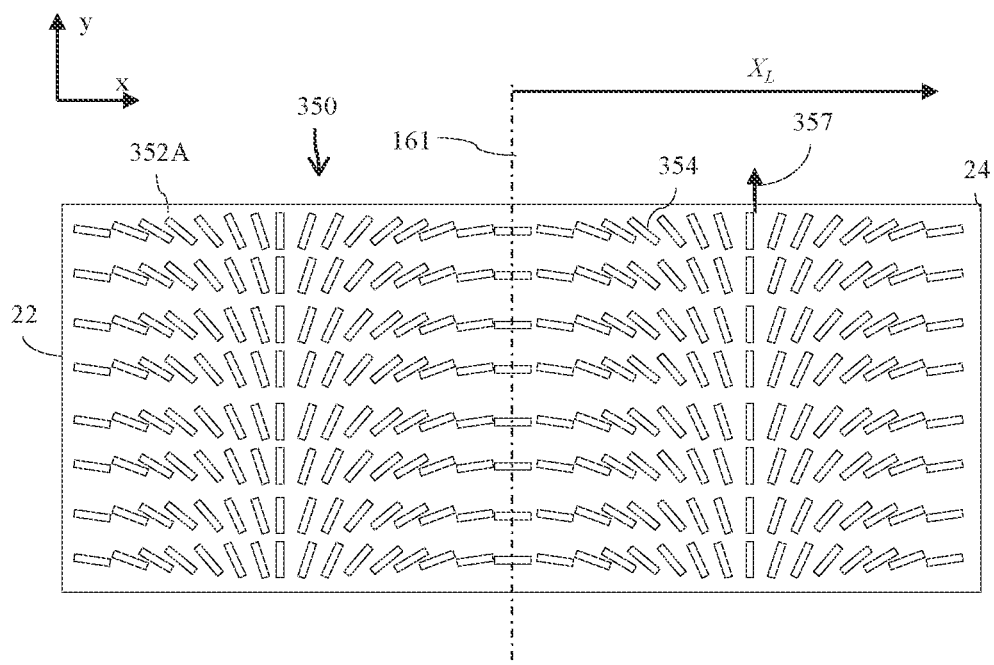
FIG. 31B is a schematic diagram illustrating in front view the optical structure of a Pancharatnam-Berry deflector.
Figure 31C:
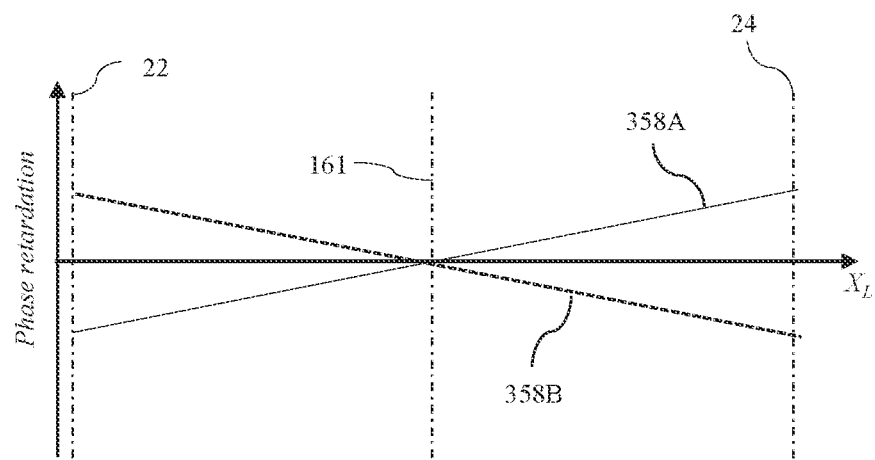
FIG. 31C is a schematic graph illustrating the variation of phase difference with lateral position for an illustrative Pancharatnam-Berry deflector of FIG. 31B.

FIG. 31A is a schematic diagram illustrating a side view of a switchable backlight comprising a collimating waveguide arrangement an optical turning film 50, a polarisation switching arrangement 340 and a Pancharatnum-Berry deflector 350; FIG. 31B is a schematic diagram illustrating in front view the optical structure of a Pancharatnam-Berry deflector 340; and FIG. 31C is a schematic graph illustrating the variation of phase retardance 358 with lateral position $X_L$ for an illustrative Pancharatnam-Berry deflector 350 of FIG. 31B, Features of the embodiment of FIGS. 31A-C not discussed in further detail may be assumed to correspond to the features with equivalent reference numerals as discussed above, including any potential variations in the features.

By way of comparison with FIG. 28A, the alternative embodiment of FIG. 31A comprises a single waveguide 1 illuminated by light sources 15 arranged to output light in cone 443 in direction 444 that may be along the optical axis 199. Advantageously the complexity and cost of the waveguide arrangement 11 is reduced. FIG. 31B illustrates an example of the alignment direction 357 of liquid crystal material 352 of the Pancharatnum-Berry deflector 350 and FIG. 31C illustrates how the phase retardance varies with distance $X_L$ across the lateral direction.

Light in direction 444 is incident on polariser 518 with electric vector transmission direction 519 to output linear polarisation state 520 that is converted to a right handed circular polarisation state 522 by retarder 72. Polarisation switch 340 may comprise a layer of liquid crystal material arranged between opposed electrodes, and may for example comprise a twisted nematic layer or may be a switchable retarder layer. Light output from the polarisation switch 340 has a polarisation state 524L that is the same as polarisation state 522 in a first phase of operation, and in a second phase of operation has the orthogonal polarisation state which is a right handed circular polarisation state 524R.

The deflection of the Panchartnum-Berry deflector 350 for the polarisation state 524L is different to the deflection of the Pancharatnum-Berry deflector 350 for the polarisation state 524R, to provide output directions 445, 447 respectively in the first and second phases of operation. Advantageously the polarisation switching arrangement 340 and Pancharatnum-Berry deflector 350 may be provided with low thickness.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device comprising:
 a spatial light modulator arranged to output spatially modulated light;
 a display polariser arranged on a side of the spatial light modulator, the display polariser being a linear polariser; and
 a view angle control arrangement comprising:
  an additional polariser arranged on the same side of the spatial light modulator as the display polariser, the additional polariser being a linear polariser; and
  at least one polar control retarder and a polarisation-switch retarder arranged between the display polariser and the additional polariser,
 wherein
 the polarisation-switch retarder is switchable between a first mode in which the polarisation-switch retarder is arranged to output a first polarisation state and a second mode in which the polarisation-switch retarder is arranged to output a second polarisation state orthogonal to the first polarisation state, and the view angle control arrangement and display polariser have a profile of transmission by angle having a local minimum in a first direction in the first mode and a local minimum in a second direction in the second mode.

2. A display device according to claim 1, further comprising a control system arranged to control the spatial light modulator and the polarisation-switch retarder, wherein the control system is arranged to operate in a dual view mode of operation in which the control system, in first temporal phases, controls the spatial light modulator to display a first image and switches the polarisation-switch retarder into the second mode, and, in second temporal phases that are time-multiplexed with the first temporal phases, controls the spatial light modulator to display a second image and switches the polarisation-switch retarder into the first mode.

3. A display device according to claim 2, wherein the control system is further arranged to operate in a share mode of operation in which the control system, in first temporal phases, controls the spatial light modulator to display a common image and switches the polarisation-switch retarder into the second mode, and, in second temporal phases that are time-multiplexed with the first temporal phases, controls the spatial light modulator to display the common image and switches the polarisation-switch retarder into the first mode.

4. A display device according to claim 2, wherein the control system is arranged to control the spatial light modulator and the polarisation-switch retarder in the first and second temporal phases in regions of the display device that are scanned across the display device.

5. A display device according to claim 1, wherein
the polarisation-switch retarder comprises a layer of liquid crystal material, and the display device further comprises:
two surface alignment layers disposed adjacent to the layer of liquid crystal material of the polarisation-switch retarder and on opposite sides thereof; and
an electrode arrangement arranged to apply voltages to the layer of liquid crystal material of the polarisation-switch retarder for switching the polarisation-switch retarder.

6. A display device according to claim 5, wherein the surface alignment layers disposed adjacent to the layer of liquid crystal material of the polarisation-switch retarder are each arranged to provide homogenous alignment in the adjacent liquid crystal material.

7. A display device according to claim 1, wherein the at least one polar control retarder comprises a passive polar control retarder.

8. A display device according to claim 7, wherein the passive polar control retarder comprises a layer of liquid crystal material that is cured.

9. A display device according to claim 8, wherein the layer of liquid crystal material of the passive polar control retarder has a homogenous alignment on one side thereof and has homeotropic alignment on the other side thereof.

10. A display device according to claim 1, wherein the at least one polar control retarder comprises a switchable liquid crystal retarder comprising a layer of liquid crystal material, and the display device further comprises:

two surface alignment layers disposed adjacent to the layer of liquid crystal material of the switchable liquid crystal retarder and on opposite sides thereof; and
an electrode arrangement arranged to apply voltages to the layer of liquid crystal material of the switchable liquid crystal retarder.

11. A display device according to claim 10, wherein one of the surface alignment layers disposed adjacent to the layer of liquid crystal material of the switchable liquid crystal retarder is arranged to provide homogenous alignment in the adjacent liquid crystal material, and the other of the surface alignment layers disposed adjacent to the layer of liquid crystal material of the switchable liquid crystal retarder is arranged to provide homeotropic alignment in the adjacent liquid crystal material.

12. A display device according to claim 10, wherein the layer of liquid crystal material of the switchable liquid crystal retarder has a twist.

13. A display device according to claim 12, wherein the twist is in a range from 60° to 120°, preferably in a range from 70° to 90°.

14. A display device according to claim 10, wherein at least one of the surface alignment layers disposed adjacent to the layer of liquid crystal material of the switchable liquid crystal retarder has a pretilt having a pretilt direction with a component in the plane of the layer of liquid crystal material that is at an acute non-zero angle to the electric vector transmission directions of at least one of the display polariser and the additional polariser in at least part of the display device.

15. A display device according to claim 1, wherein the at least one polar control retarder further comprises at least one passive correction retarder.

16. A display device according to claim 15, wherein at least one passive correction retarder has an optical axis in the plane of the passive correction retarder.

17. A display device according to claim 15, wherein at least one passive correction retarder has an optical axis orthogonal to the plane of the passive correction retarder.

18. A display device according to claim 1, wherein the view angle control arrangement further comprises at least one polarisation-rotation retarder arranged between the display polariser and the additional polariser and arranged to rotate the direction of the polarisation state passing therethrough.

19. A display device according to claim 1, wherein the first direction and the second direction are each inclined with respect to a direction normal to the plane of the display device.

20. A display device according to claim 1, wherein said display polariser is an output display polariser arranged on the output side of the spatial light modulator.

21. A display device according to claim 20, wherein the spatial light modulator comprises an emissive spatial light modulator arranged to emit the spatially modulated light.

22. A display device according to claim 20, wherein the spatial light modulator comprises a transmissive spatial light modulator and the display device further comprises a backlight arranged to illuminate the spatial light modulator.

23. A display device according to claim 1, wherein the spatial light modulator comprises a transmissive spatial light modulator and the display device further comprises a backlight arranged to illuminate the spatial light modulator and said display polariser is an input display polariser arranged on the input side of the spatial light modulator.

24. A display device according to claim 23, further comprising:
- an output display polariser arranged on the output side of the spatial light modulator;
- a further additional polariser arranged on the output side of the spatial light modulator, the further additional polariser being a linear polariser; and
- at least one further polar control retarder and a further polarisation-switch retarder arranged between the further additional polariser and the output display polariser.

25. A display device according to claim 1, further comprising:
- a further additional polariser arranged on the same side of the spatial light modulator as the additional polariser outside the additional polariser, the further additional polariser being a linear polariser; and
- at least one further polar control retarder and a further polarisation-switch retarder arranged between the additional polariser and the further additional polariser.

26. A display device according to claim 22, wherein the backlight comprises:
- at least one first light source arranged to provide input light;
- at least one second light source arranged to provide input light in an opposite direction from the at least one first light source;
- a waveguide arrangement comprising at least one waveguide, the waveguide arrangement being arranged to receive the input light from the at least one first light source and the at least one second light source and to cause light from the at least one first light source and the at least one second light source to exit from the waveguide arrangement by breaking total internal reflection; and
- an optical turning film component comprising:
  - an input surface arranged to receive the light exiting from a waveguide through a light guiding surface of the waveguide by breaking total internal reflection, the input surface extending across the plane; and
  - an output surface facing the input surface, wherein the input surface comprises an array of prismatic elements.

* * * * *